US009536113B2

(12) United States Patent
Isozaki et al.

(10) Patent No.: US 9,536,113 B2
(45) Date of Patent: *Jan. 3, 2017

(54) INFORMATION PROCESSING APPARATUS, INFORMATION PROCESSING SYSTEM, AND COMPUTER PROGRAM PRODUCT

(71) Applicant: Kabushiki Kaisha Toshiba, Minato-ku (JP)

(72) Inventors: Hiroshi Isozaki, Kawasaki (JP); Jun Kanai, Inagi (JP); Shintarou Sano, Kawasaki (JP); Shunsuke Sasaki, Shinjuku (JP); Toshiki Kizu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 103 days.

This patent is subject to a terminal disclaimer.

(21) Appl. No.: 14/482,036

(22) Filed: Sep. 10, 2014

(65) Prior Publication Data

US 2015/0089213 A1    Mar. 26, 2015

(30) Foreign Application Priority Data

Sep. 24, 2013   (JP) .................................. 2013-197395

(51) Int. Cl.
 *H04L 29/06*    (2006.01)
 *G06F 21/74*    (2013.01)
 *H04L 9/08*    (2006.01)
 *G06F 21/57*    (2013.01)

(52) U.S. Cl.
 CPC ............... *G06F 21/74* (2013.01); *G06F 21/57* (2013.01); *H04L 9/0891* (2013.01)

(58) Field of Classification Search
 None
 See application file for complete search history.

(56) References Cited

U.S. PATENT DOCUMENTS

| 7,263,718 B2 * | 8/2007 | O'Brien .................. G06F 21/53 726/14 |
| 7,401,230 B2 * | 7/2008 | Campbell ........... G06F 9/45537 703/21 |
| 8,473,754 B2 * | 6/2013 | Jones ...................... G06F 21/53 380/277 |

(Continued)

FOREIGN PATENT DOCUMENTS

| JP | 2007-226657 A | 9/2007 |
| JP | 2008-135004 A | 6/2008 |

(Continued)

*Primary Examiner* — Farid Homayounmehr
*Assistant Examiner* — Olanrewaju Bucknor
(74) *Attorney, Agent, or Firm* — Oblon, McClelland, Maier & Neustadt, L.L.P.

(57) ABSTRACT

According to an embodiment, an information processing apparatus includes a main processor, a secure operating system (OS) module, a non-secure OS module, a secure monitor memory setting module, a timer, and an address space controller. When receiving a notification of an interrupt from the timer, a secure monitor instructs the secure OS module to execute certain processing. The secure OS module is configured to execute certain processing instructed by the secure monitor and store data of a result of the processing in a first memory area.

10 Claims, 40 Drawing Sheets

(56) References Cited

U.S. PATENT DOCUMENTS

| | | | |
|---|---|---|---|
| 8,813,231 B2* | 8/2014 | Fanton | G06F 21/10 707/769 |
| 9,218,287 B2* | 12/2015 | Miyazaki | G06F 12/0804 |
| 9,235,705 B2* | 1/2016 | Freericks | G06F 21/54 |
| 2004/0153672 A1* | 8/2004 | Watt | G06F 9/3012 726/22 |
| 2006/0177068 A1* | 8/2006 | Hatakeyama | G06F 21/51 380/282 |
| 2007/0201821 A1 | 8/2007 | Sato et al. | |
| 2008/0127142 A1* | 5/2008 | Wrighton | G06F 21/53 717/148 |
| 2008/0155509 A1 | 6/2008 | Ohta et al. | |
| 2010/0189251 A1* | 7/2010 | Curren | G06F 21/6227 380/28 |
| 2011/0044451 A1* | 2/2011 | Anzai | G06F 21/51 380/45 |
| 2012/0036347 A1* | 2/2012 | Swanson | G06F 21/79 713/2 |
| 2012/0191899 A1* | 7/2012 | Zbiciak | G06F 13/366 711/103 |
| 2012/0198192 A1* | 8/2012 | Balasubramanian | H03K 19/0016 711/163 |
| 2012/0213488 A1 | 8/2012 | Sato et al. | |
| 2012/0254602 A1* | 10/2012 | Bhansali | G06F 21/575 713/2 |
| 2012/0331464 A1* | 12/2012 | Saito | G06F 9/5077 718/1 |
| 2014/0122902 A1 | 5/2014 | Isozaki et al. | |
| 2014/0123320 A1 | 5/2014 | Isozaki et al. | |

FOREIGN PATENT DOCUMENTS

| | | |
|---|---|---|
| JP | 2014-89644 A | 5/2014 |
| JP | 2014-89652 A | 5/2014 |
| JP | 2014-191509 A | 10/2014 |

* cited by examiner

FIG.4

|  |  | SECURE MODE | NON-SECURE MODE |
|---|---|---|---|
| SECURE AREA | READ OPERATION AND WRITE OPERATION ARE PROHIBITED | ACCESSIBLE TO READ AND WRITE | INACCESSIBLE TO READ AND WRITE |
| | READ OPERATION IS PERMITTED WRITE OPERATION IS PROHIBITED | ACCESSIBLE TO READ AND WRITE | READ OPERATION IS PERMITTED WRITE OPERATION IS PROHIBITED |
| NON-SECURE AREA | | ACCESSIBLE TO READ AND WRITE | ACCESSIBLE TO READ AND WRITE |

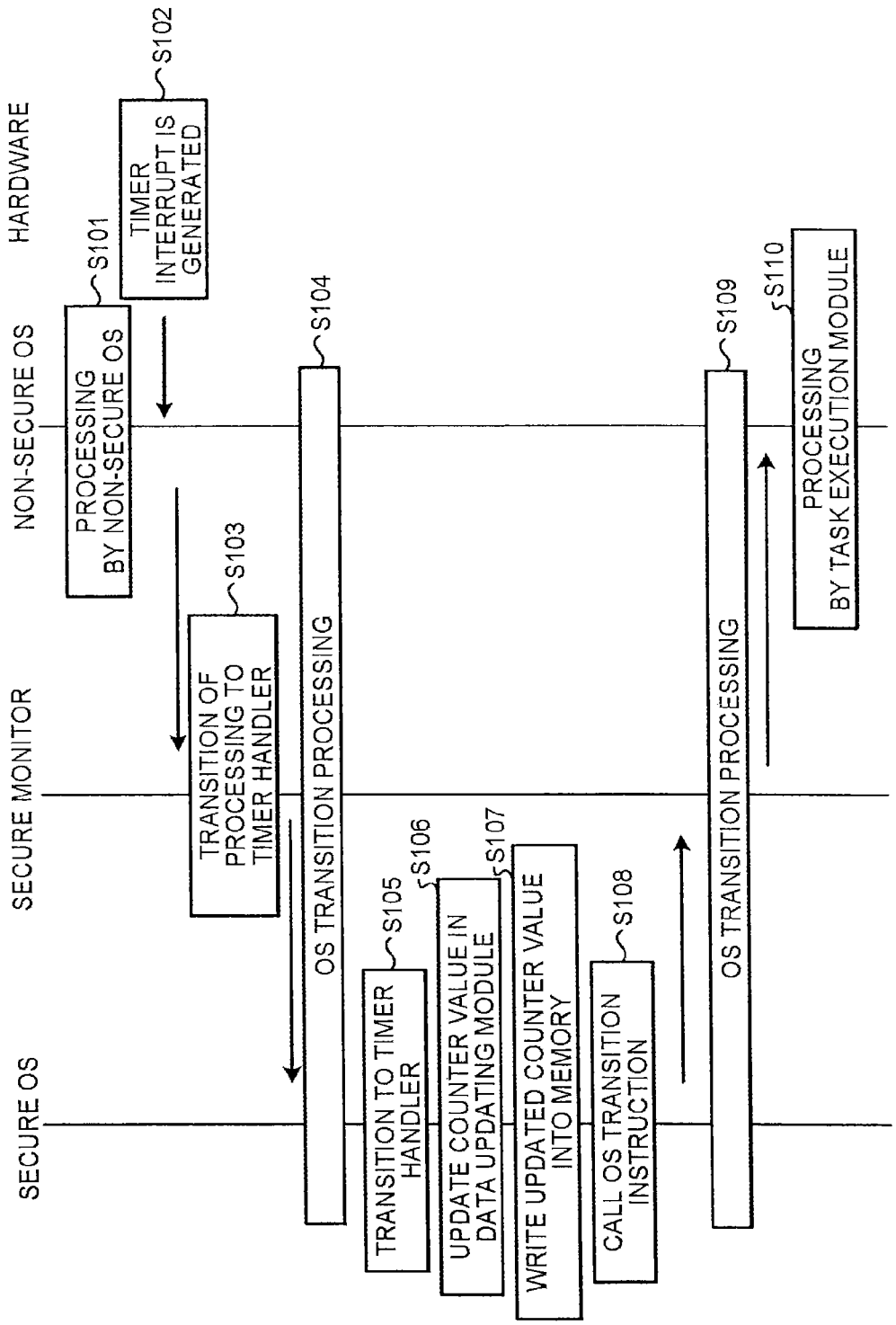

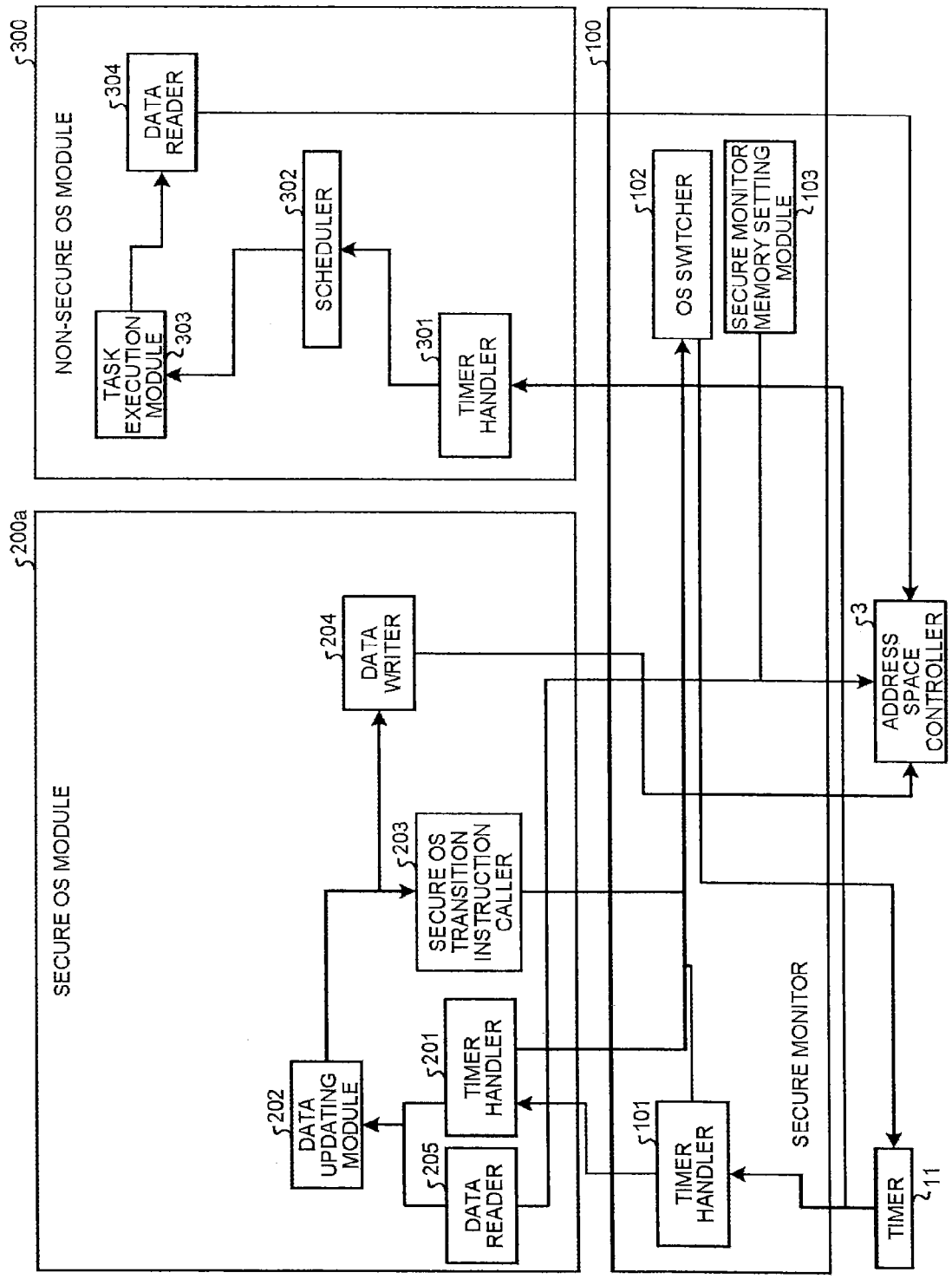

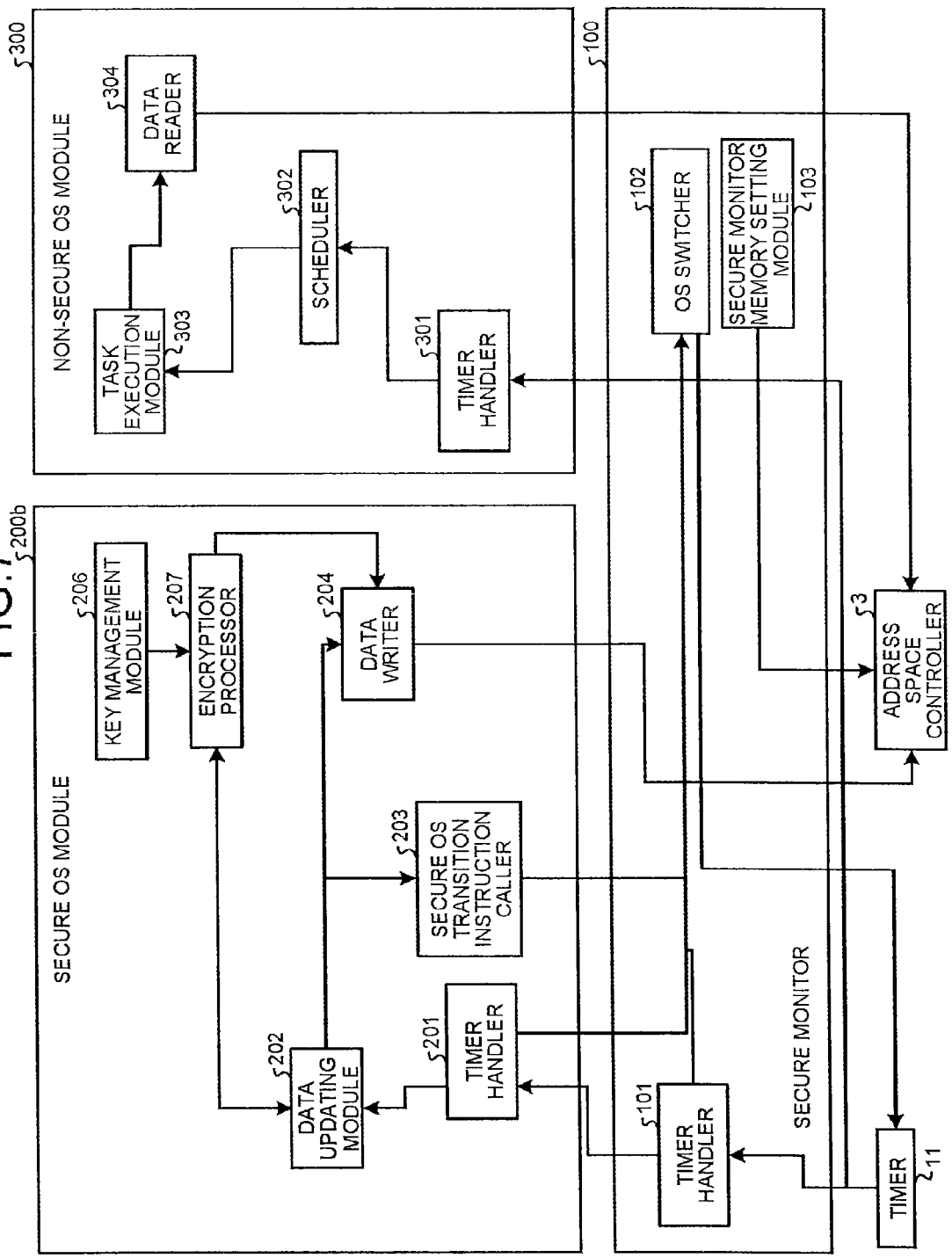

FIG.27

| | | SECURE MODE | NON-SECURE MODE | CALLING OF HANDLER |
|---|---|---|---|---|
| SECURE AREA | READ OPERATION AND WRITE OPERATION ARE PROHIBITED | ACCESSIBLE TO READ AND WRITE | INACCESSIBLE TO READ AND WRITE | NO |
| | READ OPERATION IS PERMITTED WRITE OPERATION IS PROHIBITED (HANDLER IS CALLED) | ACCESSIBLE TO READ AND WRITE | READ OPERATION IS PERMITTED WRITE OPERATION IS PROHIBITED | YES |
| | READ OPERATION IS PERMITTED WRITE OPERATION IS PROHIBITED (NO HANDLER IS CALLED) | ACCESSIBLE TO READ AND WRITE | READ OPERATION IS PERMITTED WRITE OPERATION IS PROHIBITED | NO |
| NON-SECURE AREA | | ACCESSIBLE TO READ AND WRITE | ACCESSIBLE TO READ AND WRITE | NO |

INFORMATION PROCESSING APPARATUS, INFORMATION PROCESSING SYSTEM, AND COMPUTER PROGRAM PRODUCT

CROSS-REFERENCE TO RELATED APPLICATION

This application is based upon and claims the benefit of priority from Japanese Patent Application No. 2013-197395, filed on Sep. 24, 2013; the entire contents of which are incorporated herein by reference.

FIELD

Embodiments described herein relate generally to an information processing apparatus, an information processing system, and a computer program product.

BACKGROUND

Systems implemented as software have been required to prevent secret information such as keys from being illegitimately analyzed by attackers and processing contents from being overwritten. To address such requirements, techniques have been provided that use mechanisms of access control of operating systems (OSs), obfuscate application programs, invalidate functions of debugger used for analyzing applications, or enhance the access control mechanisms in OSs.

The complete elimination of vulnerability of applications and OSs, however, is actually unachievable. Approaches using software have limitations. For general-purpose personal computers (PCs), approaches have been proposed in which OSs that execute processing to be protected and OSs that execute general-purpose processing are separated using virtual machines. In processors for embedded devices, it is not yet widely used that the hardware has a function to assist virtualization. Thus, it is difficult for the embedded processors having performances inferior to those of the PCs to achieve the same systems as the general-purpose PCs using the virtual machines.

As an example of the systems that address such cases in the embedded processors, a processor architecture is proposed in which a main processor has two modes, namely a secure mode and a non-secure mode. A program required to be protected from attacks such as tampering and analysis is executed in the secure mode while a general-purpose program is executed in the non-secure mode. In this architecture, the OSs, which are operating software for the processor to operate in the secure mode and in the non-secure mode, are individually provided, and processing to encrypt or decrypt data is executed by a secure OS running in the secure mode or by application software running on the secure OS. General-purpose processing such as reading data from a secondary storage is executed by a non-secure OS running in the non-secure mode or by application software running on the non-secure OS. In such a structure, processing is executed while performing the transition between the secure mode and the non-secure mode as appropriate.

In addition, the hardware-based access control mechanism to a memory space makes it impossible for a non-secure OS module to read or tamper with the secure OS. This structure can prevent the secure OS or data of applications running on the secure OS from being stolen or tampered with by software running in the non-secure mode, even if defects (bugs) are built in the non-secure OS module or applications running on the non-secure OS module and the defects are illegally used for the eavesdropping or the tampering. The mechanisms thus can prevent attacks that try to tamper with the processing to be protected or acquire the data to be protected.

Thus a mechanism is provided to separate the OSs and prevent the memory access in the non-secure mode as described above. In such a mechanism, the function operated in the secure mode such as encryption is often required to be explicitly called by a program running in the non-secure mode. Although the explicit calling is required, a function is not provided that periodically and forcibly stops the processing executed in the non-secure mode during the execution thereof, performs the transition of the processing in the secure mode, and generates or processes data in the secure mode. No specific way to achieve such a function is also clearly presented. In addition, no way is achieved to encrypt the data in the secure mode and provide the encrypted data to the non-secure OS.

BRIEF DESCRIPTION OF THE DRAWINGS

FIG. 4 is a schematic diagram illustrating an example in which memory area is accessible or inaccessible in the first embodiment;

FIG. 5 is a flowchart illustrating processing when a timer interrupt is generated in the first embodiment;

FIG. 6 is a block diagram of the software in a modification of the first embodiment;

FIG. 7 is a block diagram of software in a second embodiment;

FIG. 27 is a schematic diagram illustrating an example of access rights to the memory area in the fourth embodiment;

DETAILED DESCRIPTION

According to an embodiment, an information processing apparatus includes a main processor, an address space controller, a secure monitor memory setting module, a non-secure operating system (OS) module, a secure OS module, and a timer. The main processor is configured to be selectively switched between a secure mode and in a non-secure mode, and perform certain data processing in the selected mode. The address space controller is configured to set access rights to a main memory independently for each mode of the main processor. The access rights include read permission and write permission. The secure monitor memory setting module is configured to set, to the address space controller, a first memory area from which data is readable in both modes and into which data is writable only in the secure mode, a second memory area from which data is readable and into which data is writable in both modes, and a third memory area from which data is readable and into which data is writable only in the secure mode. The non-secure OS module is configured to run in the non-secure mode and is allocated in the second memory area. The secure OS module configured to run in the secure mode and is allocated in the third memory area. The timer is configured to generate an interrupt to the main processor at a certain period and notify a secure monitor of the interrupt. The secure monitor is configured to instruct the secure OS module to execute certain processing when receiving a notification of the interrupt from the timer. The secure OS module is configured to perform the certain processing instructed by the secure monitor and store data of a result of the processing in the first memory area.

First Embodiment

Figure 1:
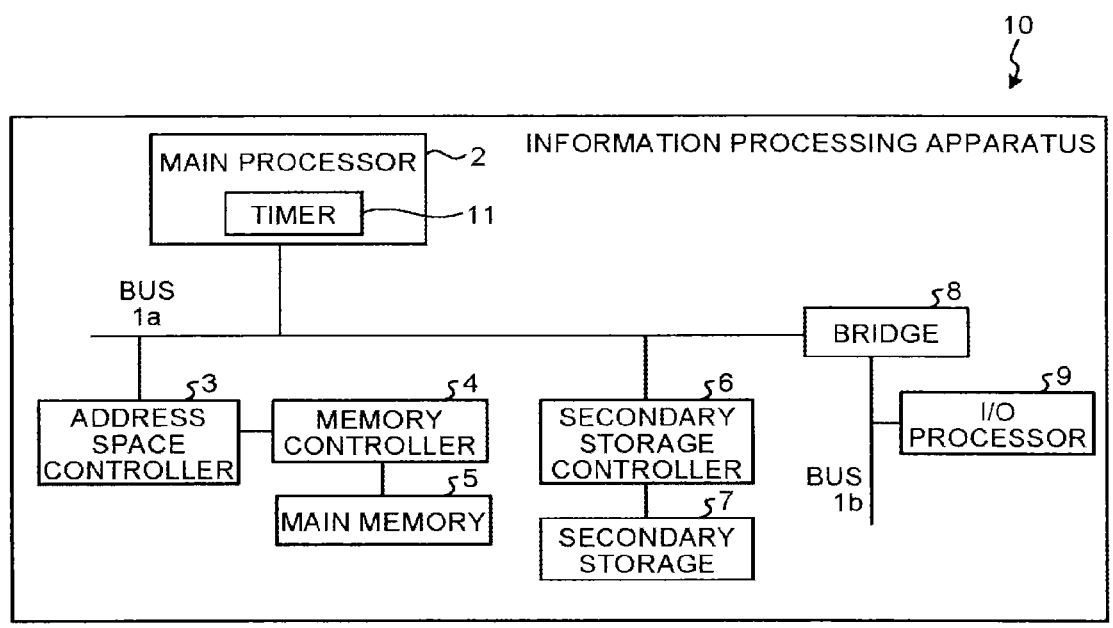
FIG. 1 is a hardware structure diagram of an information processing apparatus in a first embodiment.

The following describes a first embodiment in detail with reference to the accompanying drawings. FIG. 1 schematically illustrates a hardware structure of an information processing apparatus described in the first embodiment. Examples of the information processing apparatus include a digital television broadcasting receiver, a set top box (STB), a smartphone, and a surveillance camera.

The information processing apparatus 10 includes a main processor 2, an address space controller 3, a memory controller 4, a main memory 5, a secondary storage controller 6, a secondary storage 7, a bridge 8, and an input-output (I/O) processor 9. The main processor 2, the address space controller 3, the secondary storage controller 6, and the bridge 8 are connected to each other with a bus 1a. The I/O processor 9 and the bridge 8 are connected to each other with a bus 1b.

The main processor 2 sequentially processes instructions and data loaded from the main memory 5 and stores the processing results in the main memory 5. The main processor 2 is a general-purpose processor such as an ARM (registered trademark) Cortex A series processor. The main processor 2 has at least two exclusive states of a secure mode and a non-secure mode. The operating state of the main processor 2 is selectively switched between the secure mode and the non-secure mode by an instruction from software, e.g., a setting of a register. In other words, the operating software of the main processor 2 executes a program by alternately switching the secure mode and the non-secure mode as appropriate. The main processor 2 transmits the state information having at least one bit to the bus 1a. The state information indicates the current state (the secure mode or the non-secure mode). The respective components connected to the bus 1a can identify the current mode of the main processor 2 whether being in the secure mode or the non-secure mode by watching the state information transmitted to the bus 1a. As for a way to selectively switch the modes and execute the selected mode, a TrustZone (registered trademark) may be used that is a security function of the ARM processor.

The main processor 2 includes a timer 11. The timer 11 has a function to generate an interrupt at a certain period in accordance with a setting. The software running on the main processor 2 can periodically execute specific processing by handling the interrupt. The main processor 2 may include a plurality of timers 11. In this case, the respective timers 11 operate independently and individually generate interrupts at respective certain periods.

The main memory 5 is a general-purpose main memory. For example, a dynamic random access memory (DRAM) or a magnetic RAM (MRAM) can be used as the main memory 5. The memory controller 4 receives a read instruction (load instruction) or a write instruction (store instruction) for the main memory 5, and write data or read data, or controls refresh operation on the main memory 5, in accordance with the instruction from the main processor 2. When the main memory 5 is a DRAM, the memory controller 4 is a DRAM controller.

The address space controller 3 watches access from the main processor 2 to the main memory 5 and performs access control on each address range. The address space controller 3 sets access rights to the main memory 5 independently for each mode of the main processor 2. The access rights are a read permission and a write permission, for example. For example, control software running on the main processor 2 preliminarily sets, to the address space controller 3, the following exemplary setting as a procedure of initialization processing when the information processing apparatus 10 is booted. In the exemplary setting, a specific address area of the main memory 5 is accessible only when the main processor 2 is in the secure mode, while the specific address area is inaccessible when the main processor 2 is in the non-secure mode. When the main processor 2 accesses the specific address area, the address space controller 3 identifies the state of the main processor 2 whether being in the secure mode or in the non-secure mode on the basis of the state information transmitted to the bus 1a. When the main processor 2 is in the secure mode, the address space controller 3 permits the access while when the main processor 2 is in the non-secure mode, the address space controller 3 does not permit the access and transmits an exception signal (a fault signal or an abort signal) to the main processor 2 as an interrupt signal. How the address space controller 3 sets access rights to respective areas in the main memory 5 will be described later.

The secondary storage 7 is a non-volatile memory (storage) that operates at a lower speed than that of the main memory 5, but has a larger storage capacity than that of the main memory 5. For example, a magnetic disk or a flash memory can be used as the secondary storage 7. The secondary storage controller 6 receives a read instruction or a write instruction for the secondary storage 7 and the write data or the read data in accordance with the instruction from the main processor 2, and controls the writing of data in or the reading of data from the secondary storage 7. When the secondary storage 7 is a flash memory, the secondary storage controller 6 is a flash memory controller.

The bridge 8 is a bridge controller that connects the bus 1a and the bus 1b. The bus 1a is compliant with an advanced extensible interface (AXI) specification, for example, while the bus 1b is compliant with an advanced peripheral bus (APS) specification, for example. The I/O processor 9 is connected to an input-output device such as a mouse or a keyboard, and controls the input-output device.

When receiving input from a keyboard or a mouse, the I/O processor 9 transmits the input to the main processor 2 through the bridge 8 as an interrupt signal.

Figure 2:
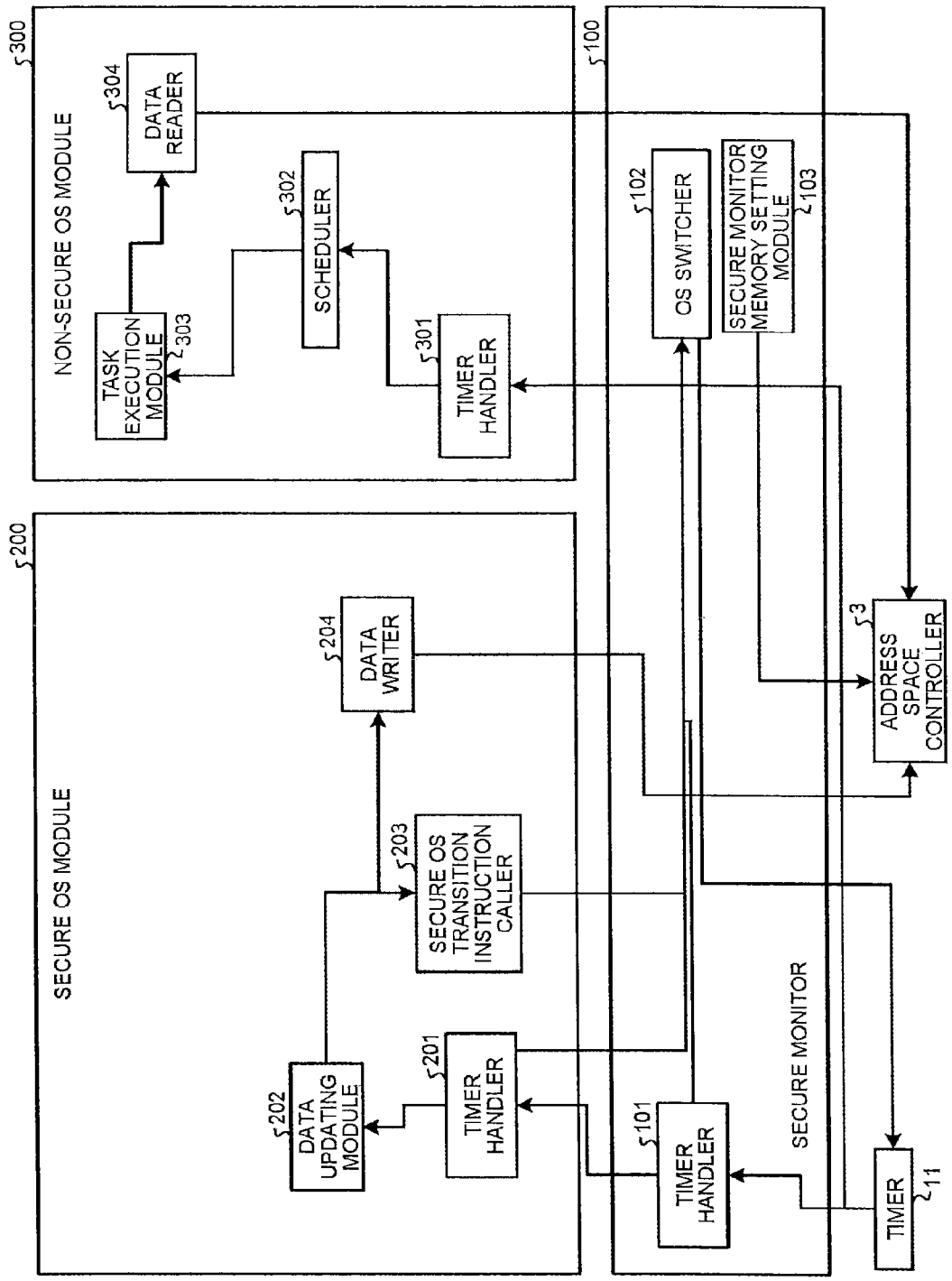
FIG. 2 is a block diagram of software in the first embodiment.

FIG. 2 illustrates an exemplary structure of software running on the main processor 2. As illustrated in FIG. 2, the software includes a secure monitor 100, a secure OS module 200, and a non-secure OS module 300. For the sake of easy explanation, the address space controller 3 and the timer 11, which are the hardware, though, are illustrated in FIG. 2. FIG. 2, however, essentially illustrates the software structure. In the following description, the secure monitor 100 and the secure OS module 200 are included in the structure as separated modules. The secure monitor 100 and the secure OS module 200 may be integrated as one module.

The main processor 2 executes the software by selectively switching the two states of the secure mode and the non-secure mode. The control software, that is, operating system (OS), that runs in the secure mode is the secure OS module 200 while the OS that runs in the non-secure mode is the non-secure OS module 300.

The secure monitor 100 switches the secure OS module 200 and the non-secure OS module 300. The secure monitor 100 loads the secure OS module 200 and the non-secure OS module 300 and executes either one of them as a procedure of the initialization processing at the booting of the information processing apparatus 10.

The secure OS module 200 runs on the main processor 2 in the secure mode. The non-secure OS module 300 runs on the main processor 2 in the non-secure mode. The non-secure OS module 300 is a general-purpose OS such as a Linux (registered trademark) OS, for example.

The secure monitor 100 includes an OS switcher 102, a secure monitor memory setting module 103, and a timer handler 101. The OS switcher 102 selectively switches the operating state of the main processor 2 between the secure mode and the non-secure mode. The operating state is switched when the secure OS module 200 or the non-secure OS module 300 executes an explicit switching instruction or when an interrupt signal from the timer 11 or an external hardware module is received, for example. The explicit switching instruction is a secure monitor call (SMC) instruction when the main processor 2 is an ARM Cortex A series processor.

When the secure OS module 200 executes the explicit switching instruction, the main processor 2 performs the transition of the processing from the secure OS module 200 to the OS switcher 102 of the secure monitor 100. The OS switcher 102 switches the mode of the main processor 2 from the non-secure mode to the secure mode and switches the processing from the secure OS module 200 to the non-secure OS module 300. When receiving the explicit switching instruction from the non-secure OS module 300, the main processor 2 performs the transition of the processing from the non-secure OS module 300 to the OS switcher 102 of the secure monitor 100. The OS switcher 102 then switches the mode of the main processor 2 from the non-secure mode to the secure mode and the transition of the processing to the secure OS module 200 is performed.

When switching the OSs, the OS switcher 102 stores the state (context) of the OS before being switched in the main memory 5 so as to enable the OS before being switched to restore to the state before being switched. For example, when the OS is switched from the non-secure OS module 300 to the secure OS module 200, the OS switcher 102 saves a value of registers used by the non-secure OS module 300, i.e., the context, in a certain memory area managed by the secure monitor 100, and performs the transition of the processing to the secure OS module 200. The OS switcher 102 restores the saved context of the non-secure OS module 300 to the register when the OS is switched from the secure OS module 200 to the non-secure OS module 300. Likewise, when the OS is switched from the secure OS module 200 to the non-secure OS module 300, the OS switcher 102 saves the context used by the secure OS module 200 and restores the saved context of the secure OS module 200 when the OS is switched from the non-secure OS module 300 to the secure OS module 200. When the transition is performed from the secure OS module 200 to the non-secure OS module 300, it is preferable that the OS switcher 102 clears a value of the registers used by the secure OS module 200 in order to prevent the state executed by the secure OS module 200 from being read by the non-secure OS module 300, which reads the value of the registers after the transition to the non-secure OS module 300.

When the modes are switched in accordance with the interrupt signal from the timer 11 or the external module, the OS switcher 102 of the secure monitor 100 preliminarily determines that the transition of the processing to either mode is performed and which handler is executed when the exception (interrupt) occurs as a procedure of the initialization processing at the booting of the information processing apparatus 10, and sets the determination result to the origin that generates the interrupt. For example, the following processing is performed at the booting. When the exception signal is transmitted from the address space controller 3 to the main processor 2, an interrupt handler of the secure OS module 200 is executed in the case that the main processor 2 is in the secure mode while, in the case that the main processor 2 is in the non-secure mode, an interrupt handler of the non-secure OS module 300 is executed by forcibly switching the modes. In the same manner, the OS switcher 102 is set such as which handler to call in accordance with the mode when the timer interrupt is generated. The setting of the interrupt handler when the timer interrupt is generated will be described later.

The secure monitor memory setting module 103 sets areas in the main memory 5 and sets the access control settings to the respective areas. The area may be set by designating a starting address and the length of the area, or designating a starting address and an ending address, for example. The timer handler 101 is a processing module that executes the main processor 2 when the timer 11 generates the interrupt. The timer handler 101 instructs the OS switcher 102 to perform the transition of the state from the non-secure mode to the secure mode, and calls a timer handler 201 of the secure OS module 200 after the completion of the transition. The OS switcher 102 designates that the timer handler 101 of the secure monitor 100 is executed when the timer 11 generates the interrupt as a procedure of the initialization processing at the booting of the information processing apparatus 10.

The secure OS module 200 includes the timer handler 201, a data updating module 202, a data writer 204, and a secure OS transition instruction caller 203. The timer handler 201 is a processing module that is called when the timer 11 generates the interrupt. The timer handler 201 notifies the data updating module 202 of the generation of the timer interrupt.

The data updating module 202 manages, by itself, a counter value (updated data) using a register of the main processor 2, for example. When receiving a notification of a generation of the timer interrupt from the timer handler 201, the data updating module 202 updates the counter value (e.g., increments the counter value by one). The data updating module 202 then instructs the data writer 204 to write the updated value into the main memory 5. After the counter value is written into the main memory 5, the data updating module 202 causes the secure OS transition instruction caller 203 to be executed. The data writer 204 writes the counter value managed by the data updating module 202 into an updated data area in the main memory 5 in accordance with the instruction from the data updating module 202.

In this embodiment, the writing of data into or the reading data from the main memory 5 are described as the write and the read operations in the same manner as the processing for the secondary storage. The write and the read operations can be described as the load and the store operations.

The secure OS transition instruction caller 203 executes an OS switching instruction in the main processor 2. As described above, when the OS switching instruction is executed in the main processor 2, the main processor 2 performs the transition of the processing to the OS switcher 102 of the secure monitor 100. The OS switcher 102 switches the operating state of the main processor 2 from the non-secure mode to the secure mode, as described above.

The non-secure OS module 300 includes a timer handler 301, a scheduler 302, a task execution module 303, and a data reader 304. The timer handler 301 is a processing module that is called when the timer 11 generates the interrupt. The timer handler 301 calls the scheduler 302. The scheduler 302 determines which task is to be executed out of various tasks (jobs) executed by the non-secure OS module 300. The scheduler 302 calls the task execution module 303 depending on the priority of the task.

The task execution module 303 is a processing module that executes the task using the counter value written by the data updating module 202 into the main memory 5. When requested to execute the task in accordance with the order of processing, the task execution module 303 instructs the data reader 304 to acquire the counter value. The data reader 304 reads the counter value from the updated data area in the main memory 5 in accordance with the instruction from the task execution module 303, and passes the value to the task execution module 303.

Figure 3:
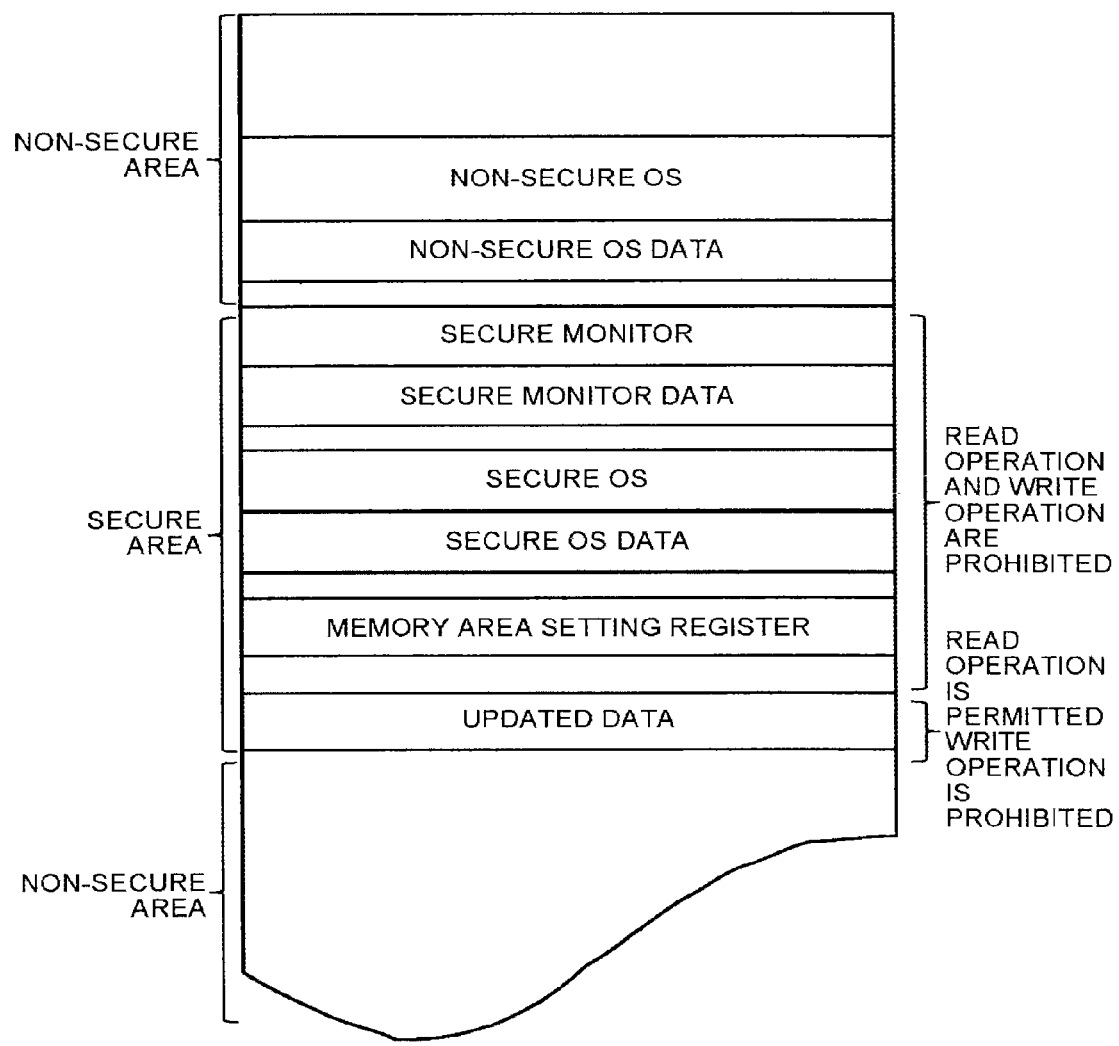
FIG. 3 is a schematic diagram illustrating an example of segmentation of a memory area in the first embodiment.

FIG. 3 illustrates an example of the segmentation of the memory area of the main memory 5, which is done by the secure monitor memory setting module 103. The setting of the segmentation is performed by the secure monitor memory setting module 103 as part of the processing at the booting of the information processing apparatus. In the memory area of the main memory 5, a non-secure area, a secure area, and a common area are set.

In the non-secure area, the non-secure OS (an OS execution image of the non-secure OS) and data for the non-secure OS are stored. In the secure area, a secure monitor (an OS execution image of the secure monitor), data for the secure monitor, the secure OS (an OS execution image of the secure OS), data for the secure OS, a memory area setting register, and the updated data, which will be described later, are stored.

The OS execution image is a binary image for executing the OS. The data for OS is various types of data (including the context) used by the OS. The areas interposed between the respective areas described above are non-secure areas unless otherwise explicitly described. The respective areas may be arranged such that no interposed areas are provided. In the secure area, both of read and write operations are permitted when the main processor 2 is in the secure mode. The secure area is classified into two areas as follows: one area in which both of read and write operations are prohibited and the other area in which only read operation is permitted (write operation is prohibited) when the main processor 2 is in the non-secure mode and accesses the main memory 5. In the area in which both of read and write in the non-secure mode are prohibited in the secure area, the secure monitor (the OS execution image of the secure monitor), data for the secure monitor, the secure OS (the OS execution image of the secure OS), data for the secure OS, and the memory area setting register are allocated. The updated data (a first memory area) is allocated to the area in which only read in the non-secure mode is permitted.

FIG. 4 illustrates which memory area is accessible or inaccessible in the main memory 5. The setting of the access control is performed by the secure monitor memory setting module 103 as part of the initialization processing at the booting of the information processing apparatus 10. As illustrated in FIG. 4, when the main processor 2 is in the secure mode, software running on the main processor 2 can access, for read and write operations, both of the secure area and the non-secure area of the main memory 5. In other words, the secure OS module 200 can access all of the secure and the non-secure areas of the main memory 5. When the main processor 2 is in the non-secure mode, the area designated as the area in which read and write operations are prohibited is inaccessible for read and write operations, and only read operation is permitted to the area designated as the area in which read operation is permitted, but write operation is prohibited in the secure area of the main memory 5. The non-secure area is accessible for read and write operations. Access here means the read or write operation performed on the main memory 5.

The access control to the main memory 5 is achieved as follows: the memory controller 4 receives, from the main processor 2, a signal indicating whether the current mode is the secure mode or the non-secure mode and grasps the state of the main processor 2 from the signal. The memory controller 4 determines which memory area is accessible when the main processor 2 accesses the main memory 5 on the basis of the grasped state.

The setting is made on the address space controller 3 such that the address space controller 3 performs the access control as illustrated in FIG. 4. The setting is made through the memory area setting register. As illustrated in FIG. 3, the memory area setting register is allocated in the secure area. The memory area setting register, thus, can be set only by the secure OS module 200 or the secure monitor 100. In other words, the access control to the main memory 5 by the address space controller 3 can be protected from being set by the non-secure OS module 300.

FIG. 5 illustrates a flowchart of an example of processing operation of the main processor 2 when the timer interrupt is generated. It is assumed that the secure monitor 100, the secure OS module 200, and the non-secure OS module 300 have completed the processing at the booting including the initialization processing. Furthermore, it is assumed that the main processor 2 is in the non-secure mode and the non-secure OS module 300 is executed in the initial state of the flowchart for the sake of easy explanation.

The transition of the processing to either mode when the timer interrupt is generated is preliminarily set to the OS switcher 102. For example, the setting is made on the timer 11 to perform the transition of the processing to the timer handler 101 of the secure monitor 100 when the timer interrupt is generated. When the main processor 2 includes the multiple timers 11, the OS switcher 102 may use two timers 11 and may set one timer 11 to generate an FIQ interrupt and the other timer 11 to generate an IRQ interrupt. For example, one timer 11 (a timer 11A) is set to generate the FIQ interrupt at a period of M milliseconds while the other timer 11 (a timer 11B) is set to generate the IRQ interrupt at a period of N milliseconds. In addition, the OS switcher 102 makes the setting such that the transition of the processing to the timer handler 101 of the secure monitor 100 is performed when the timer 11 generates the FIQ interrupt. Likewise, the OS switcher 102 makes the setting such that the transition of the processing to the timer handler 301 of the non-secure OS module 300 is performed when the timer 11 generates the IRQ interrupt.

As a result of the setting, when the timer 11A generates the interrupt during the execution of the non-secure OS module 300, the transition of the processing to the timer handler 101 of the secure monitor 100 is performed. The timer handler 101 of the secure monitor 100 instructs the OS switcher 102 to perform the transition of the mode and the OS, and thereafter calls the timer handler 201 of the secure OS module 200. When the timer 11B generates the interrupt during the execution of the non-secure OS module 300, the transition of the processing to the timer handler 301 of the non-secure OS module 300 is performed. In this case, the processing of the transition between OSs (also referred to as the OS transition processing) is not performed because the non-secure OS module 300 is executed before the timer interrupt is generated.

FIG. 5 illustrates a case where the timer 11A generates the timer interrupt. The main processor 2 currently executes the non-secure OS module 300 (step S101). Once the timer interrupt is generated (step S102), the main processor 2 performs the transition of the processing to the timer handler 101 of the secure monitor 100 (step S103). The timer handler 101 performs the OS transition processing using the OS switcher 102 (step S104). In this case, the transition from the non-secure mode to the secure mode is performed, the context of the non-secure OS module 300 is stored, the context of the secure OS module 200 is restored, and the secure OS module 200 is executed. The timer handler 201 of the secure OS module 200 is executed (step S105).

The timer handler 201 of the secure OS module 200 notifies the data updating module 202 of the generation of the interrupt. The data updating module 202 updates the counter value (updated data) (step S106). The data updating module 202 calls the data writer 204 and causes the data writer 204 to write the updated counter value into the main memory 5 (step S107). The secure OS transition instruction caller 203 calls an OS transition instruction (step S108). In accordance with the OS transition instruction, the main processor 2 performs the transition of the processing to the OS switcher 102 of the secure monitor 100 (step S109). The OS switcher 102 stores the context of the secure OS module 200 and restores the context of the non-secure OS module 300 and executes the non-secure OS module 300. Thereafter, the task execution module 303 of the non-secure OS module 300 reads the counter value from the updated data area of the main memory 5 (step S110). The counter value can be read by the non-secure OS module 300 because read operation is permitted to the updated data area.

FIG. 6 illustrates an exemplary structure of the software that runs on the main processor 2 when the counter value is not retained by the register of the main processor 2 but retained by the main memory 5. The structure illustrated in FIG. 6 differs from that illustrated in FIG. 2 in that a secure OS module 200a further includes a data reader 205. The data reader 205 is a processing module that reads the counter value from the updated data area in the secure area of the main memory 5. The updated data area is included in the secure area and this processing is performed in the secure mode, thereby making it possible to perform the read access normally. The data updating module 202 reads the counter value from the updated data area of the main memory 5, updates the read counter value, and thereafter writes the updated value into the updated data area of the main memory 5.

The following describes how the counter value is used and how the counter value is attacked. An application is assumed in which the counter value is used as a timer of a stopwatch to limit a time period of viewing pay content such as a movie to a certain time period. A content viewing application running on the non-secure OS reads a counter value at a time X and starts playbacking the content. The content viewing application running on the non-secure OS can know an elapsed time from the start of the playback by reading the counter value at a time Y. As a result, it can be achieved that the playback of the content is permitted only for N minutes (N=Y−X) from the start of the playback of the content.

One of the ways to use such a system in an unauthorized manner may be to overwrite the counter value. For example, when a time N elapses from the start of the playback of content (let the counter value be A at that time) and if the counter value is overwritten with A whereas the correct counter value is A+N, the content viewing application determines that the time has not reached the time limit and continues to playback the content. A mechanism that prevents overwriting with an incorrect value using a mechanism such as file access control by the OS may be employed as one way. However, when the non-secure OS has vulnerability such as bugs, an illegal attack can be done in which an attacker resets the counter value by exploiting the vulnerability, for example.

In the structure illustrated in FIG. 6, the non-secure OS module 300 running in the non-secure mode is permitted to perform read access but is prohibited to perform write access to the updated data area. Thus, the non-secure OS module 300 cannot perform write operation to the updated data area even if the non-secure OS module 300 is tampered with. As a result, the non-secure OS module 300 cannot reset the counter value.

The counter value is updated at the timing when the timer interrupt is generated. The setting, such as intervals for generating the timer interrupt, for the timer 11 is made by the OS switcher 102. The setting for the timer 11 can be prevented from being made by the non-secure OS module 300 by allocating the address of the register for the setting in the secure area. Thus, the setting for the timer 11 cannot be changed by the non-secure OS module 300. As a result, the interrupt generated by the timer 11 can be reliably notified to the secure OS through the secure monitor 100 even if the non-secure OS module 300 is tampered with. The timer 11 periodically performs notification of the interrupt in accordance with a period set by the OS switcher 102. In accordance with the interrupt, even though the non-secure OS module 300 is in processing operation, the non-secure OS module 300 is temporarily stopped and the secure OS module 200a is executed. As a result, the secure OS module 200a can periodically perform processing regardless of the state of the non-secure OS module 300.

In the first embodiment, the processing to update the counter value is described as an example of the processing performed by the secure OS module 200 periodically. The point of the embodiment is that the secure OS module 200 performs periodical processing independent of the non-secure OS module 300. The periodical processing is thus not limited to the updating of the counter value. In the embodiment, the secure OS module 200 writes the counter value into the secure area, to which the non-secure OS module 300 can perform read access. This read processing is, however, dispensable.

Second Embodiment

A second embodiment is described below. In the first embodiment, the main processor 2 has two exclusive states of the secure mode and the non-secure mode, and executes the OS executed in the secure mode (the secure OS module 200) and the OS executed in the non-secure mode (the non-secure OS module 300) by alternately switching the OSs. In addition, when the timer 11 generates the timer interrupt, the processing of the non-secure OS module 300 can be temporarily stopped and the processing of the secure OS module 200 can be executed. In the first embodiment, the secure OS module 200 outputs the updated counter value in a plain text to the area of the main memory 5 in common with the non-secure OS module 300 without encrypting the value. In the second embodiment, the secure OS module 200 encrypts the counter value and outputs the encrypted counter value to the area of the main memory 5.

FIG. 7 illustrates an exemplary structure of the software running on the main processor 2 of the information processing apparatus 10 in the second embodiment. The hardware has the same structure as that of the first embodiment. The structure illustrated in FIG. 7 differs from that illustrated in FIG. 2 in that a secure OS module 200b further includes a key management module 206 and an encryption processor 207.

The encryption processor 207 is a processing module that encrypts the counter value updated by the data updating module 202 in accordance with an encryption algorithm using a key kept by the key management module 206. The key management module 206 allocates the key in the area in which the read access and the write access in the non-secure mode are prohibited in the secure area of the main memory 5 to manage the key. As for the encryption algorithm, a well-known algorithm may be used, such as an advanced encryption standard (AES) algorithm, a data encryption standard (DES) algorithm, or a Rivest-Shamir-Adleman (RSA) algorithm. For example, a public key algorithm or a common key algorithm can be used.

The key management module 206 is a processing module that keeps the key used by the encryption processor 207 for encrypting the counter value. The data updating module 202 encrypts the updated counter value using the encryption processor 207. The data updating module 202 then instructs the data writer 204 to write the encrypted data into the main memory 5. After the encrypted counter value is written into the main memory 5, the data updating module 202 executes the secure OS transition instruction caller 203.

The secure monitor memory setting module 103 segments the memory area of the main memory 5 in the same manner as that illustrated in FIG. 3. In FIG. 3, the data writer 204 of the secure OS module 200 writes the updated data in a plain text into the secure area, in which read operation is permitted but write operation is prohibited. In the second embodiment, the encrypted updated data is written into the secure area, in which read operation is permitted and write operation is permitted. The counter value is encrypted in the second embodiment unlike the first embodiment. The encrypted counter value thus makes it possible to prevent the non-secure OS from being tampered with or makes it impossible for an illegal program running on the non-secure OS to acquire the counter value in a plain text.

Figure 8:
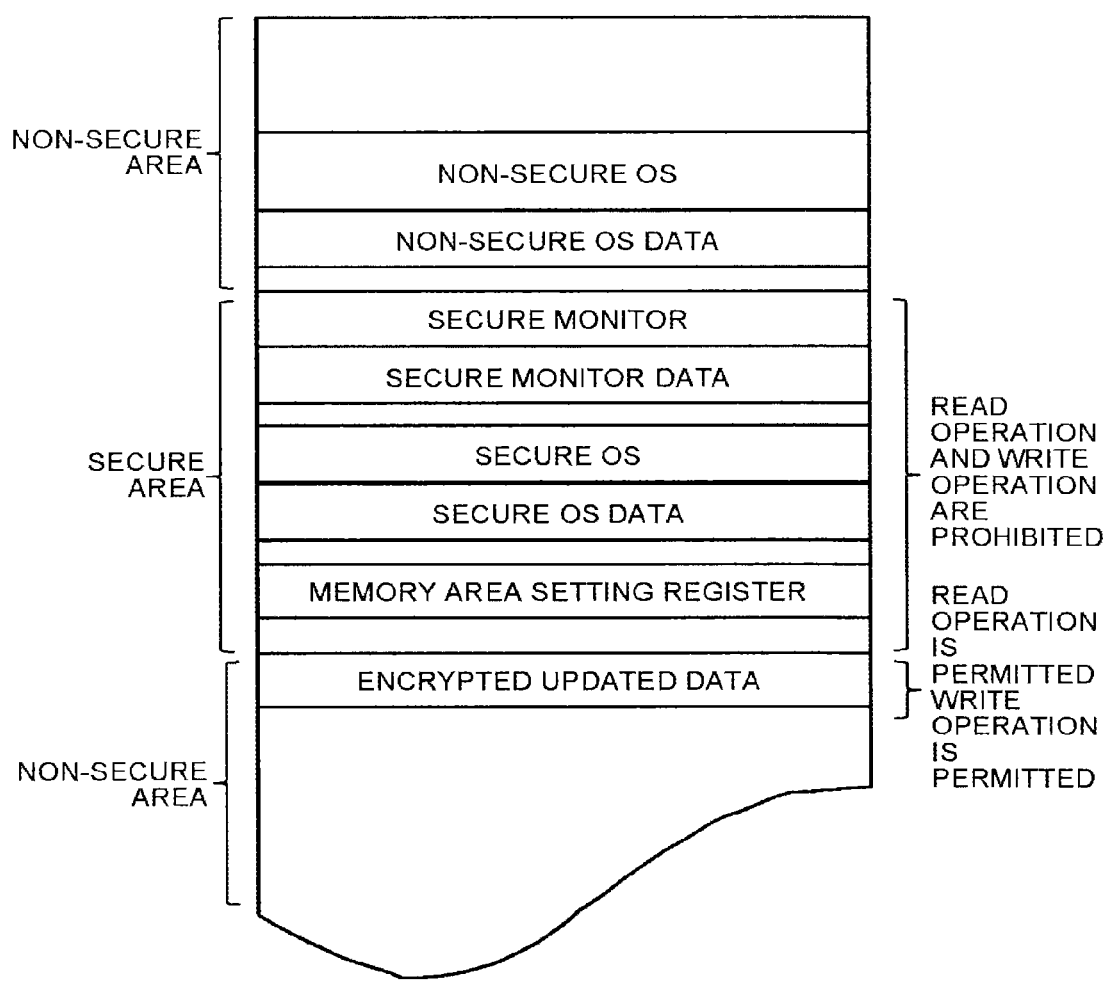
FIG. 8 is a schematic diagram illustrating an example of the segmentation of the memory area in the second embodiment.

The memory area of the main memory 5 may be structured as illustrated in FIG. 8. The structure illustrated in FIG. 8 differs from that illustrated in FIG. 3 in that the updated data is allocated in the non-secure area. The data writer 204 of the secure OS module 200b writes the encrypted counter value into the non-secure area of the main memory 5. As illustrated in FIG. 4, the read access and the write access to the non-secure area in the non-secure mode are permitted. An illegitimate program running on the non-secure OS or the secure OS can tamper with the value of the encrypted counter value. The counter value is, however, encrypted in the second embodiment unlike the first embodiment. Even if the non-secure OS is tampered with or an illegal program running on the non-secure CS tries to modify the value of the encrypted counter value, the updated data can be destroyed but the encrypted counter value cannot be modified to an intended value because the non-secure OS or the illegal program does not have the correct key.

Figure 9:
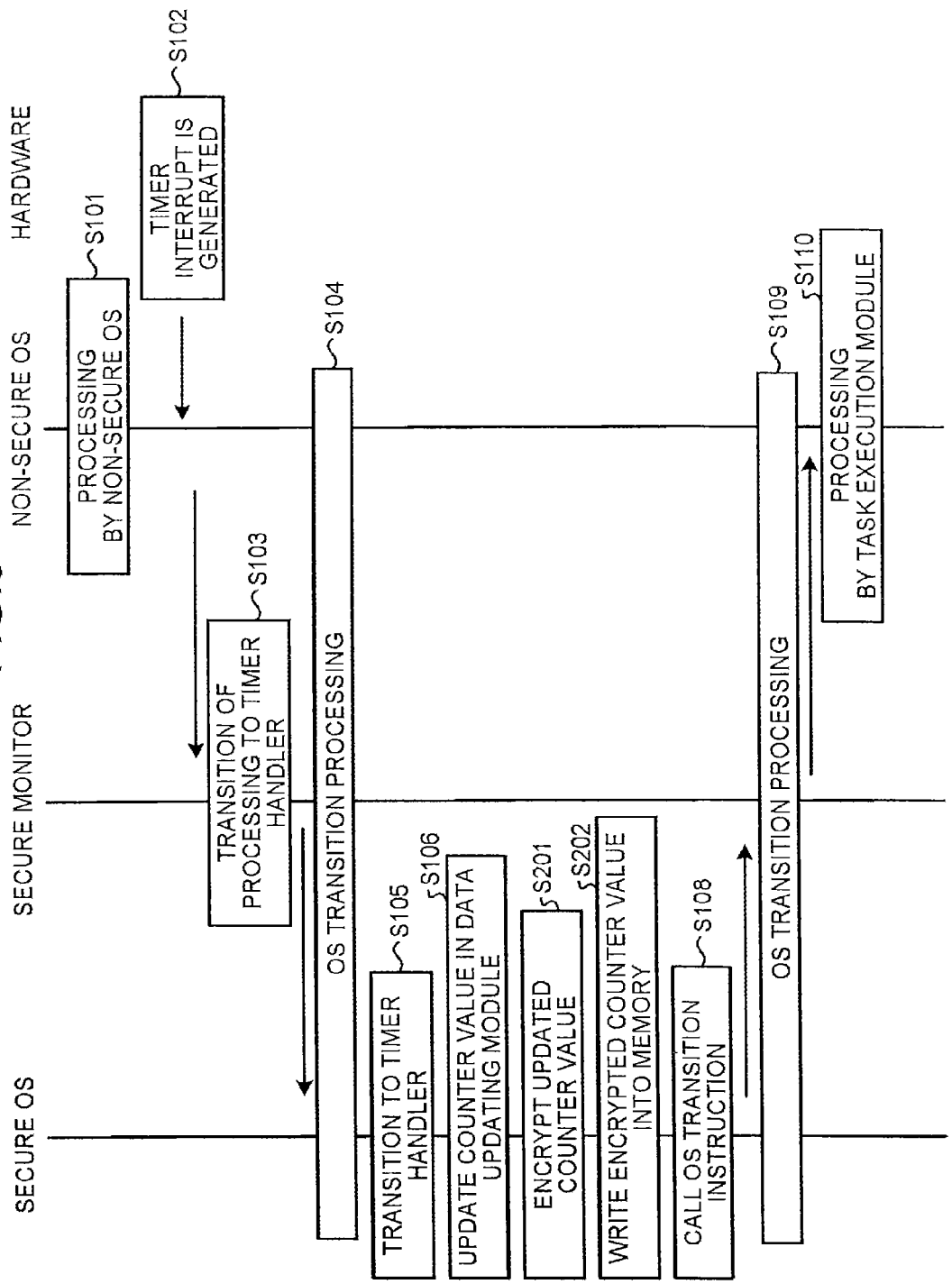
FIG. 9 is a flowchart when the timer interrupt is generated in the second embodiment.

FIG. 9 illustrates a flowchart of an example of processing operation of the main processor 2 when the timer interrupt is generated in the second embodiment. The flowchart illustrated in FIG. 9 differs from that illustrated in FIG. 5 in that the counter value is encrypted (step S201) and the encrypted counter value is written into the main memory 5 (step S202). In the second embodiment, the data updating module 202 updates the counter value. The encryption processor 207 encrypts the counter value (step S201). The data writer 204 outputs the encrypted counter value to the non-secure area of the main memory 5 (step S202). Thereafter, the secure OS transition instruction caller 203 is executed and the OS transition processing is performed.

Figure 10:
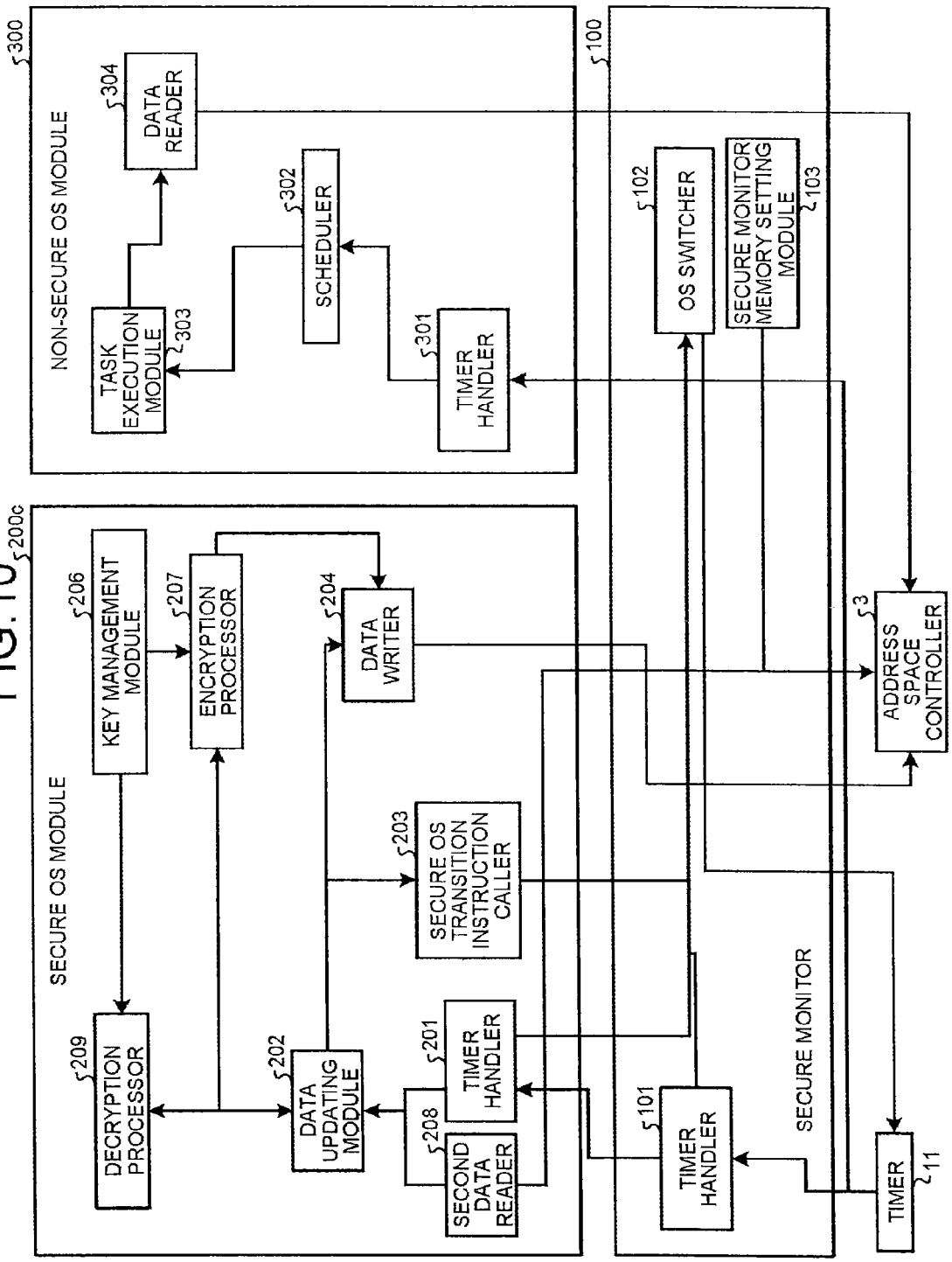
FIG. 10 is a block diagram of the software in a modification of the second embodiment.

In the structure illustrated in FIG. 7, the data updating module 202 retains the counter value. The counter value may be retained by the main memory 5 instead of the data updating module 202. The structure in this case is illustrated in FIG. 10. The structure illustrated in FIG. 10 differs from that illustrated in FIG. 7 in that a second data reader 208 and a decryption processor 209 are further included. The second data reader 208 is a processing module that reads the encrypted counter value from the updated data area in the non-secure area of the main memory 5. The updated data area is allocated in the non-secure area and this processing is performed in the secure mode, thereby making it possible to perform the read access normally.

The decryption processor 209 is a processing module that decrypts the encrypted counter value acquired by the second data reader 208 in accordance with an encryption algorithm using a key kept by the key management module 206. When the encryption algorithm is the common key system, the decryption is performed using the same key used for encrypting the counter value. When the encryption algorithm is the public key system, the counter value is encrypted with a public key managed by the key management module 206 and the decryption processor 209 decrypts the encrypted counter value with a secret key corresponding to the public key. The algorithm is the same as the one used by the encryption processor 207. As described above, the second data reader 208 reads the encrypted counter value from the updated data area in the non-secure area of the main memory 5. The counter value may be managed in the area in which data for the secure OS is stored (also referred to as the secure OS data area). In this case, the data updating module 202 instructs the data writer 204 to write the encrypted counter value into the updated data area of the main memory 5 and also instructs the data writer 204 to write the counter value in a plain text into the secure OS data area of the main memory 5. The timer handler 201 of a secure OS module 200c reads the counter value in a plain text from the secure OS data area of the main memory 5 and passes the read counter value to the data updating module 202. In this way, the current counter value may be managed in the secure OS data area.

Figure 11:
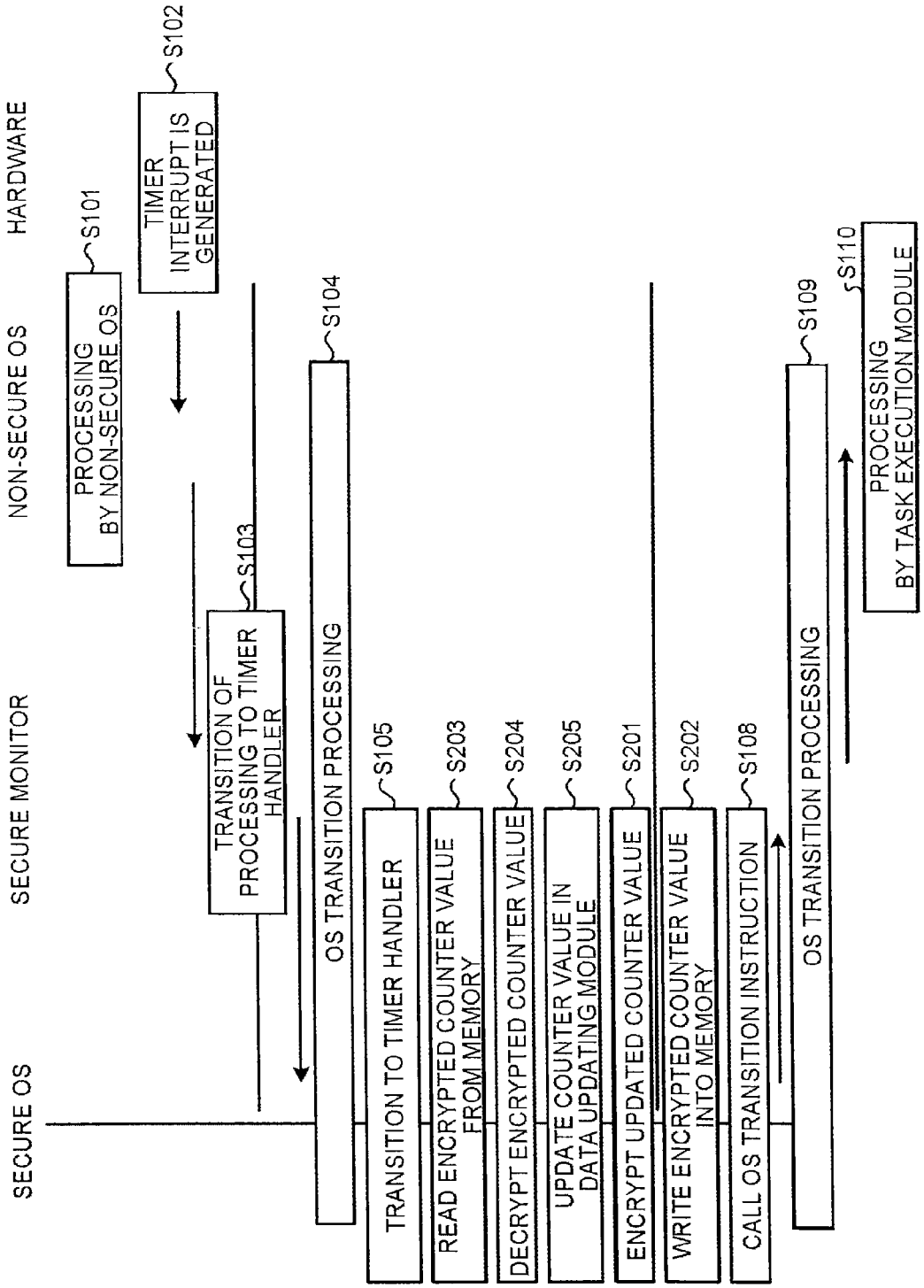
FIG. 11 is a flowchart illustrating processing when the timer interrupt is generated in the modification of the second embodiment.

FIG. 11 illustrates a flowchart of an example of processing operation of the main processor 2 when the timer interrupt is generated. The procedure from step S101 to step S105 at which the transition of the processing to the timer handler 201 of the secure OS module 200c is performed, is the same as that of the flowchart in FIG. 9. Thereafter, the second data reader 208 reads the encrypted counter value from the non-secure area (step S203). The decryption processor 209 decrypts the encrypted counter value (step S204). The data updating module 202 updates the counter value in a plain text (step S205). The procedure after the processing at step S205 is the same as that of the flowchart in FIG. 9.

The structure makes it unnecessary for the data updating module 202 to manage the counter value, thereby making it possible to simplify the processing performed by the data updating module 202.

Figure 12:
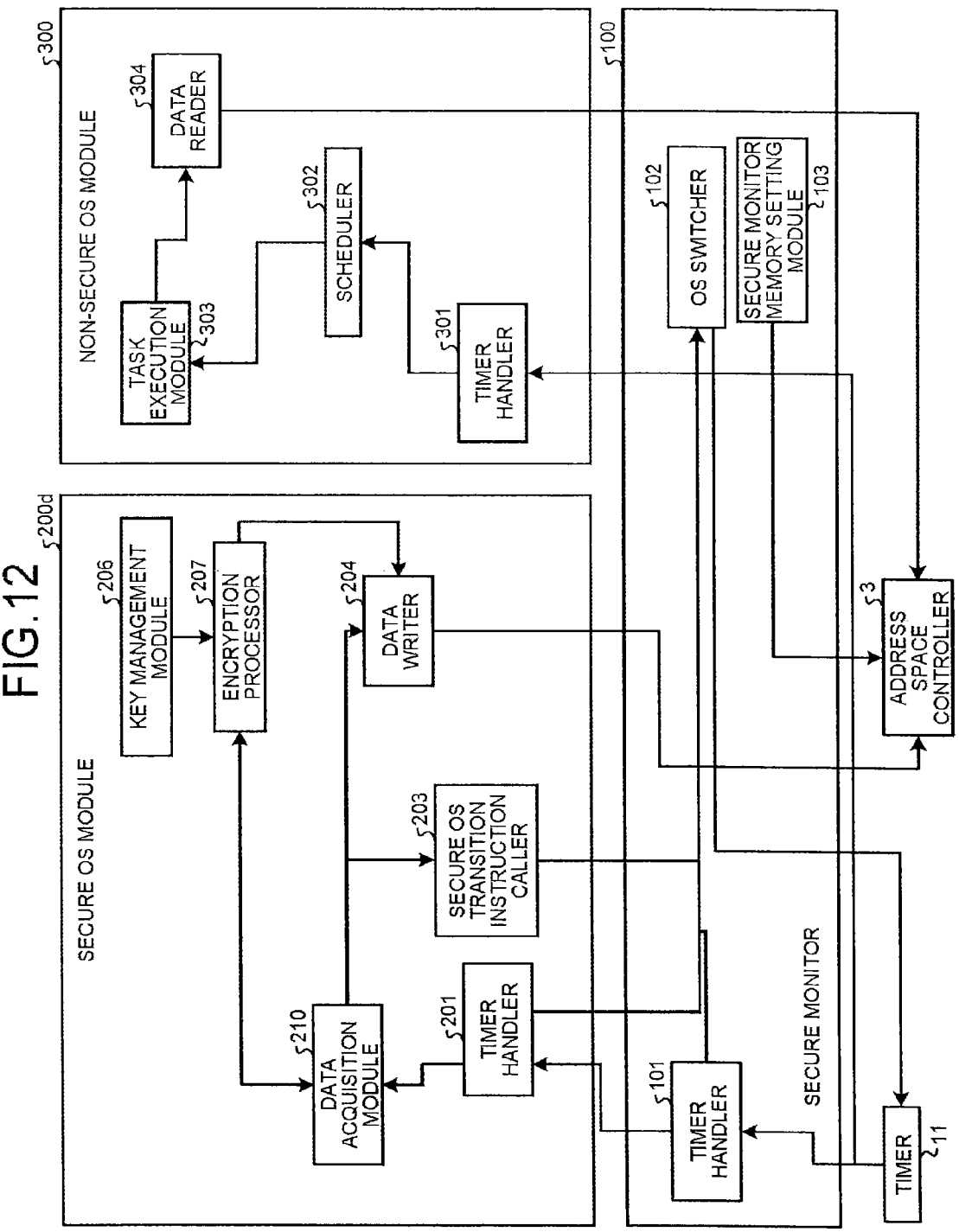
FIG. 12 is a block diagram of the software in another modification of the second embodiment.

FIG. 12 illustrates another example of the information processing apparatus 10 in the second embodiment. The structure illustrated in FIG. 12 differs from that illustrated in FIG. 7 in that a data acquisition module 210 is included instead of the data updating module 202. In the description above, the counter value is data that the secure OS has in shared with the non-secure OS. In FIG. 12, data is newly acquired.

For example, when the information processing apparatus 10 is a sensing apparatus such as a thermometer, a hygrometer, a rain gage, or a seismometer, the data acquisition module 210 acquires data from a sensor. When the information processing apparatus 10 is not the sensing apparatus but is an apparatus that acquires information from the sensing apparatus through a network, the data acquisition module 210 acquires data from the sensing apparatus through the network. The encryption processor 207 encrypts the data acquired by the data acquisition module 210 and outputs the encrypted data to the main memory 5. The processing after the output of the encrypted data is the same as that performed by the structure illustrated in FIG. 7. The data acquisition module 210 is periodically executed by the timer 11 even though the non-secure OS module 300 executes the processing, thereby making it possible to periodically acquire data. The data acquired from the sensing apparatus is encrypted and passed to the non-secure OS module 300. An illegitimate program running on the non-secure OS, thus, cannot acquire a value in a plain text. Even if the illegitimate program tries to modify the value of the encrypted value, the value cannot be modified to an intended value because the non-secure OS or the illegitimate program does not have the correct key.

Figure 13:
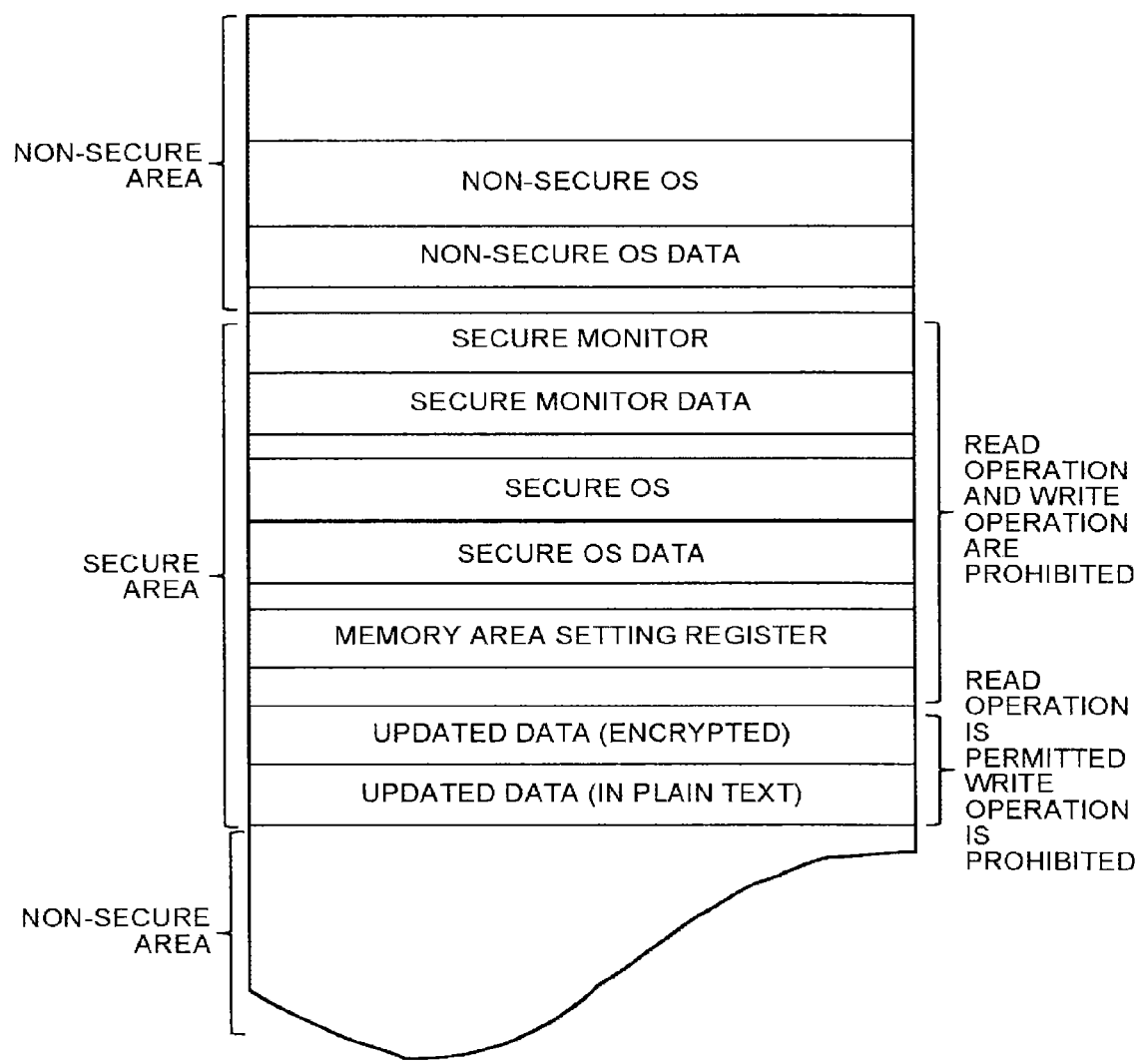
FIG. 13 is a schematic diagram illustrating an example of the segmentation of the memory area in the other modification of the second embodiment.

In FIGS. 7 and 10, the data updating module 202 outputs only the counter value encrypted by the encryption processor 207 to the main memory 5. Both of the encrypted counter value and the counter value in a plain text, i.e., the counter value before being encrypted, may be output to the main memory 5. FIG. 13 illustrates an example of the segmentation of the memory area of the main memory 5, which segmentation is done by the secure monitor memory setting module 103, in this case.

Figure 14:
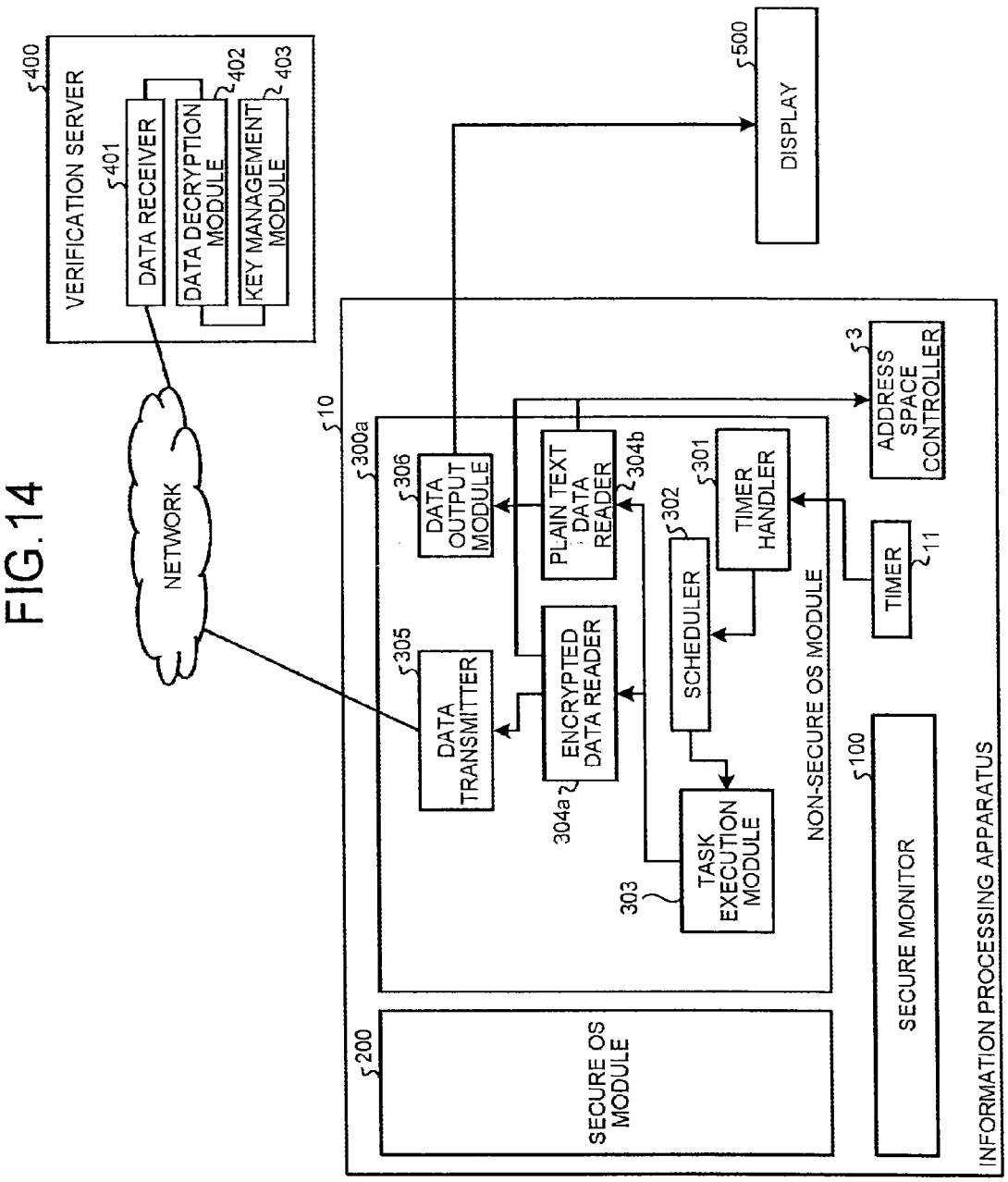
FIG. 14 is a block diagram of the software in another modification of the second embodiment.

As illustrated in FIG. 13, the data writer 204 of the secure OS module 200d writes both of the encrypted counter value and the counter value in a plain text into the secure area in which read operation is permitted and write operation is prohibited of the main memory 5. An example of the uses on the basis of the segmentation may be a case where the information processing apparatus 10 provides the counter value for two uses as follows: one is for display use in which the counter value is used for being displayed to a user and the other for processing use in which the encrypted counter value is transmitted to a server that processes the encrypted counter value. FIG. 14 illustrates the overall structure of the system in this case.

The structure illustrated in FIG. 14 differs from the non-secure OS module 300 illustrated in FIGS. 7 and 10 in that a non-secure OS module 300a includes an encrypted data reader 304a, a data transmitter 305, a plain text data reader 304b, and a data output module 306. The information processing apparatus 10 is coupled to a verification server 400 through a network such as the Internet. The information processing apparatus 10 is coupled to a display 500.

The display 500 is a monitor device that displays the data transmitted from the information processing apparatus 10. The display 500 is coupled to the information processing apparatus 10 through a display interface such as a digital visual interface (DVI) or a high-definition multimedia interface (HDMI)(registered trademark). When the information processing apparatus 10 is provided with a built-in data display device, this display 500 is dispensable.

The encrypted data reader 304a reads the encrypted counter value from the main memory 5. The data transmitter 305 connects to the verification server 400 by performing communication processing such as a transmission control protocol/internet protocol (TCP/IP) and transmits the encrypted counter value to the verification server 400. The plain text data reader 304b reads the counter value in a plain text from the main memory 5. The data output module 306 outputs the counter value in a plain text to the display 500.

The verification server 400 includes a data receiver 401, a key management module 403, and a data decryption module 402. The data receiver 401 connects to the information processing apparatus 10 by performing communication processing such as the TCP/IP and receives the encrypted counter value from the information processing apparatus 10. The key management module 403 is a processing module that manages a key used for decrypting the received encrypted counter value. The key management module 403 stores therein the key (decryption key) corresponding to a key (encryption key) stored in the key management module 206 of the information processing apparatus 10. The data decryption module 402 is a processing module that decrypts the encrypted counter value received by the data receiver 401 using the key stored in the key management module 403. In the second embodiment, the information processing apparatus 10 encrypts the counter value using the encryption processor 207, but the information processing apparatus 10 may perform signature processing on the counter value instead. In this case, the data decryption module 402 performs signature verification processing. Specifically, the key management module 403 of the verification server 400 may manage a verification key corresponding to a signature key stored in the key management module 206 of the information processing apparatus 10 and the data decryption module 402 may perform processing to verify the signature added to the counter value.

Such a structure is particularly useful in a case where the information processing apparatus 10 is used as a measuring instrument such as a smart meter that measures power consumption. The smart meter has a function to display the current power consumption and an accumulated power consumption in the same manner as that of a conventional measuring instrument (power meter). Displaying the current power consumption (power consumption data) to a user is used for enhancing the user's consciousness about power-saving. The power consumption data used for being displayed is allowed to be reset by the user's intention at the start of each month, for example. In addition to the function described above, the smart meter transmits the power consumption to a server, which is coupled to the smart meter through a network, using a communication function. The data transmitted to the server is used for charging a fee to the user. If the data to be transmitted to the server is tampered with by being reset in the information processing apparatus 10, a value smaller than the actual power consumption is notified to the server regardless of the fact that the user actually consumes power, thereby making it impossible to charge a correct fee to the user. The power consumption reflects the user's life style and thus can be regarded as personal information. When transmitted through the network, the power consumption data is preferably protected such that no content is known by a third party other than the user and the server. The power consumption data transmitted to the server is, thus, preferably encrypted or subjected to the signature processing so as to be prevented from being tampered with.

As described above, there may be two ways of use of the same data depending on the purpose of use. That is, outputting the data in plain text or outputting the data after encryption. The structure described above can achieve these purposes. In the example illustrated in FIG. 13, the data writer 204 of a secure OS module 200d outputs the encrypted updated data and the updated data in a plain text to the secure area in which read operation is permitted and write operation is prohibited. The point herein is that both of the encrypted counter value and the counter value in a plain text are output to the main memory 5. The data writer 204 of the secure OS module 200 may output either one or both of the values to the non-secure area.

Figure 15:
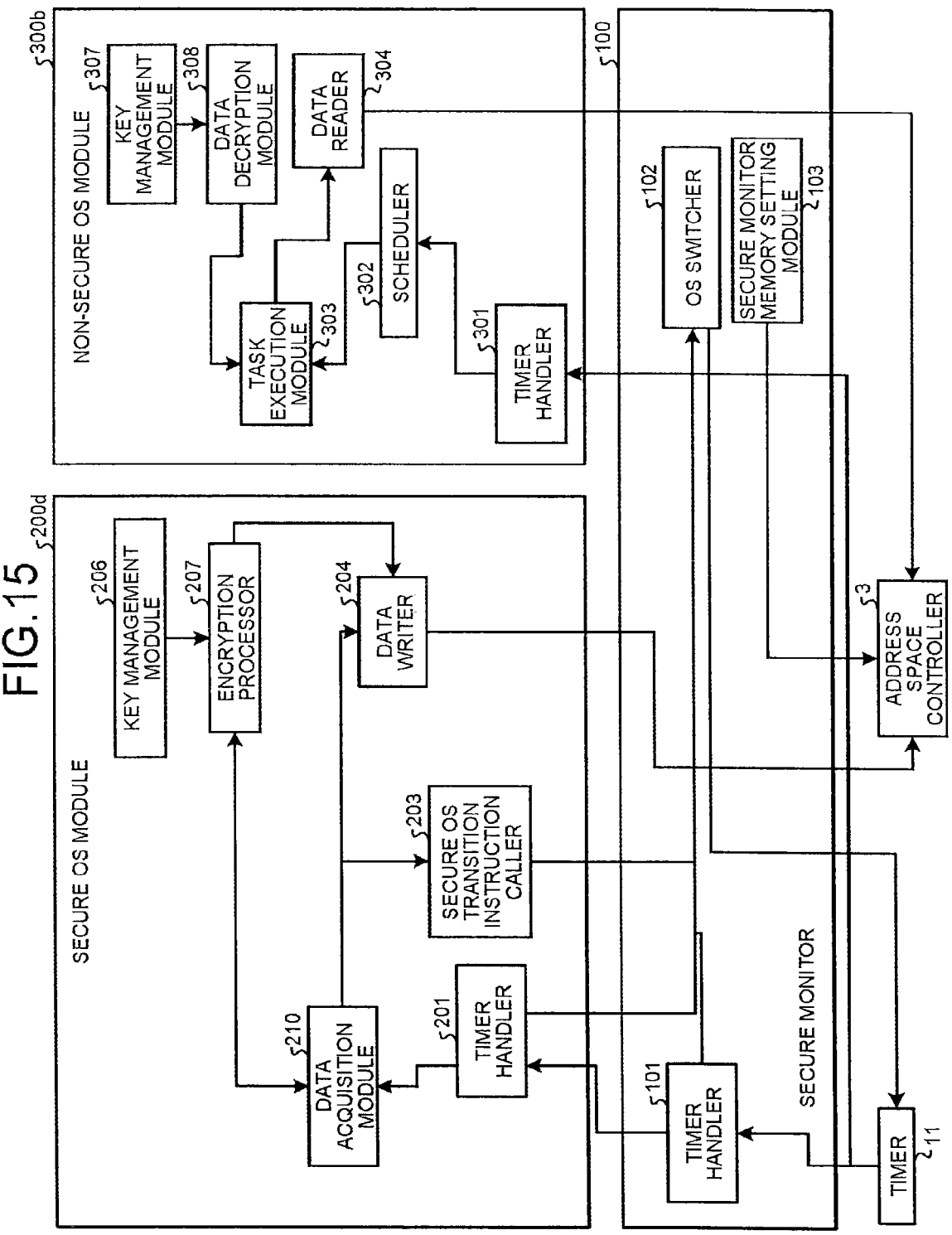
FIG. 15 is a block diagram of the software in another modification of the second embodiment.

In the structures illustrated in FIGS. 12 and 14, the counter value is not decrypted by the non-secure OS. The counter value, however, may be decrypted by the non-secure OS. FIG. 15 illustrates the structure of the system in this case. The structure illustrated in FIG. 15 differs from that illustrated in FIG. 12 in that a key management module 307 and a data decryption module 308 are included.

The key management module 307 is a processing module that manages a key used for decrypting the encrypted counter value read from the main memory 5. The key management module 307 stores therein the key (decryption key) corresponding to the key (encryption key) stored in the key management module 206 of the secure OS module 200d.

The data decryption module 308 is a processing module that decrypts the encrypted counter value read by the data reader 304 using the key stored in the key management module 307. In the structure, the task execution module 303 can use the decrypted counter value. The key management module 307 and the data decryption module 308 preferably protect the key and the value using means such as obfuscation so as to prevent the key used for decrypting the encrypted counter value and the counter value from being easily acquired by an attacker in an unauthorized manner.

Figure 16:
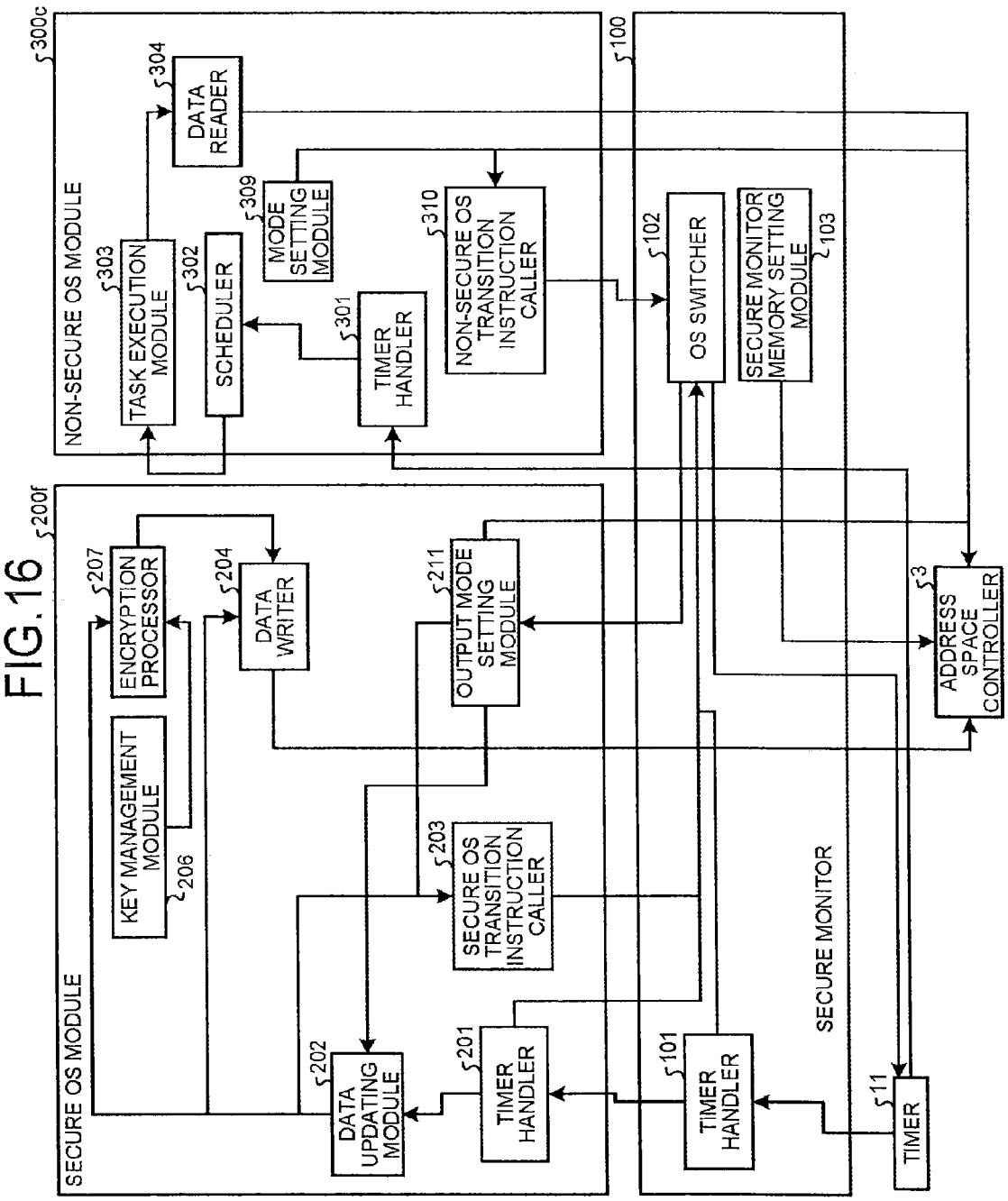
FIG. 16 is a block diagram of the software in another modification of the second embodiment.

In the above description, the output of the counter value is limited to the output in a plain text (FIG. 2), the output in the encrypted text (FIG. 7), and both outputs in a plain text and in the encrypted text (FIG. 12). The output of the counter value, however, may be designated by the non-secure OS. FIG. 16 illustrates the structure of the information processing apparatus 10 in this case. The structure illustrated in FIG. 16 differs from that illustrated in FIG. 12 in that a secure OS module 200f further includes an output mode setting module 211, and a non-secure OS module 300c further includes a mode setting module 309 and a non-secure OS transition instruction caller 310.

The mode setting module 309 of the non-secure OS module 300c is a processing module that designates whether the counter value is encrypted and output to the main memory 5, the counter value in a plain text is output to the main memory 5 without any change, or both of the encrypted counter value and the counter value in a plain text are output to the main memory 5. This notification may be performed through the main memory 5. Specifically, the mode setting module 309 writes information indicating how the counter value is output (output manner notification data) into the main memory 5. The mode setting module 309 requests the non-secure OS transition instruction caller 310 to perform the transition to the secure mode.

Figure 17:
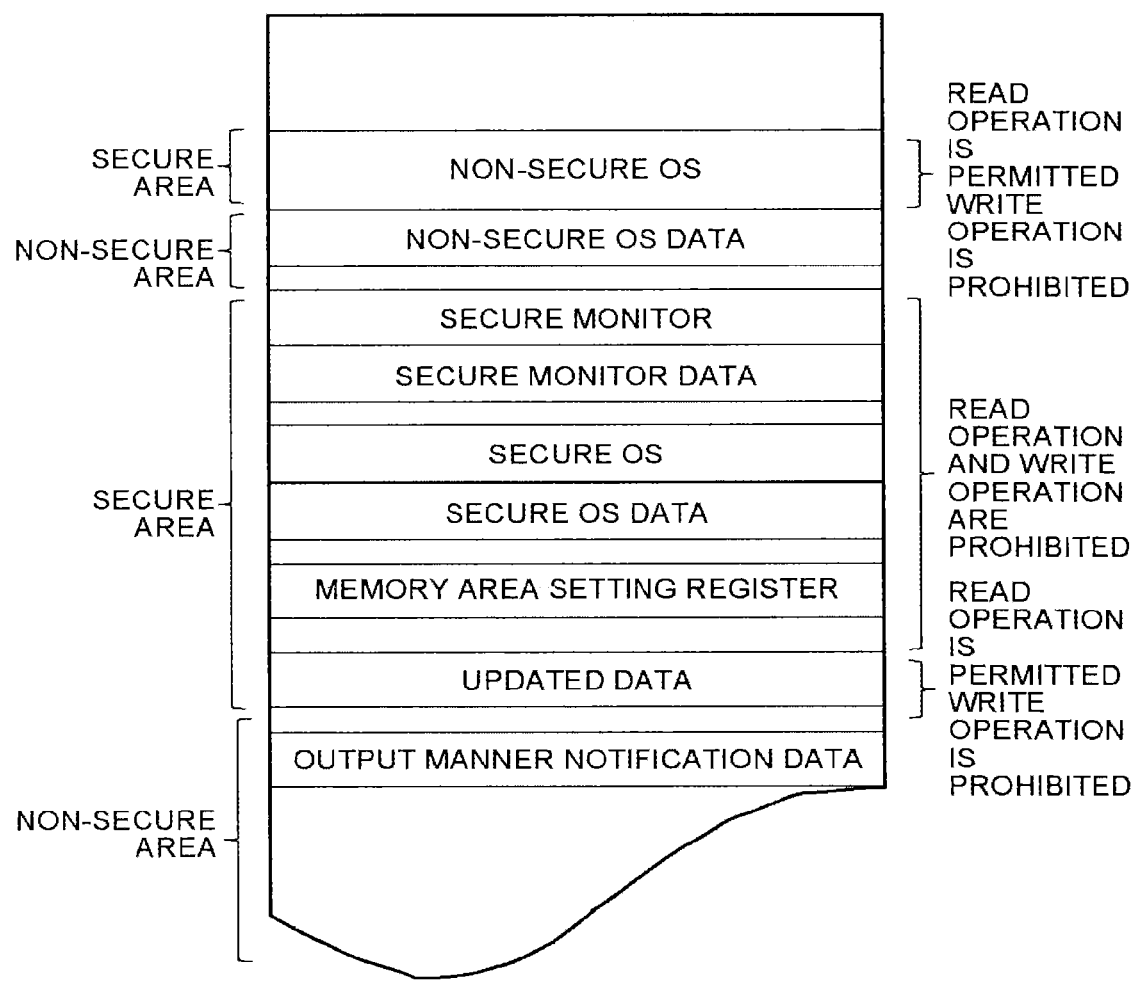
FIG. 17 is a schematic diagram illustrating an example of the segmentation of the memory area in the other modification of the second embodiment.

FIG. 17 illustrates an example of the segmentation of the memory area of the main memory 5, which segmentation is done by the secure monitor memory setting module 103. The mode setting module 309 is executed on the non-secure OS running in the non-secure mode. As illustrated in FIG. 17, the area into which the output manner notification data is written (also referred to as the output manner notification data area) is set in the non-secure area. Hence, the mode setting module 309 can write the output manner notification data into the main memory 5 normally.

The non-secure OS transition instruction caller 310 is a processing module that executes an OS switching instruction in the main processor 2. As described above, when the OS switching instruction is executed in the main processor 2, the main processor 2 performs the transition of the processing to the OS switcher 102 of the secure monitor 100. The OS switcher 102 switches the operating state of the main processor 2 from the non-secure mode to the secure mode, as described above.

The output mode setting module 211 is a processing module that determines whether the counter value is encrypted using the encryption module and output to the data writer 204, the counter value in a plain text is output to the data writer 204 without any change, or both of the encrypted counter value and the counter value in a plain text are output to the data writer 204 on the basis of the value written into the output manner notification data of the main memory 5, and notifies the data updating module 202 of the determined output manner. The data updating module 202 performs, in accordance with the notification from the output mode setting module 211, one of the following output manners: only the counter value in a plain text is output to the data writer 204, only the encrypted counter value is output to the data writer 204, and both of the encrypted counter value and the counter value in a plain text are output to the data writer 204.

Figure 18:
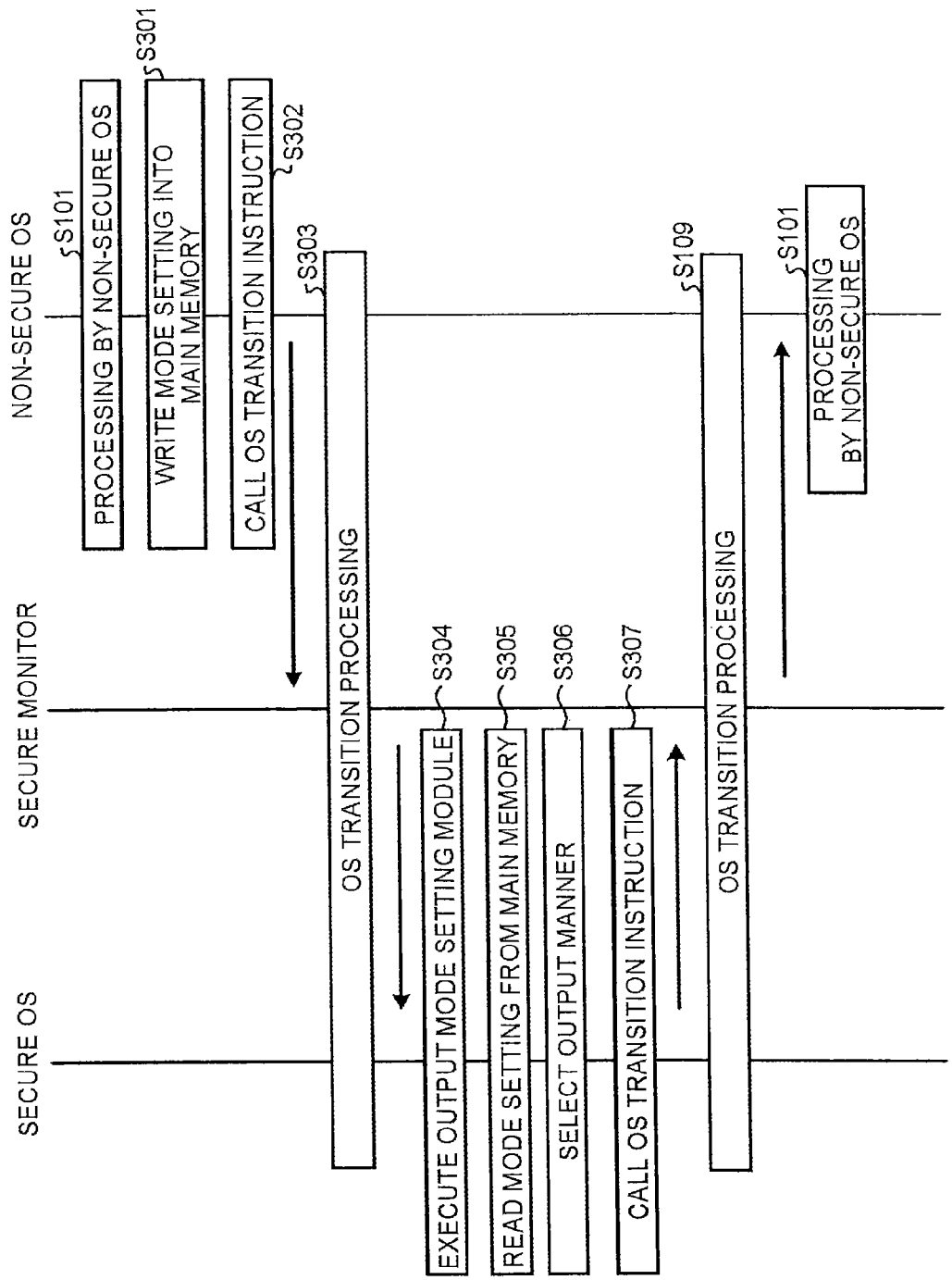
FIG. 18 is a flowchart illustrating processing by a main processor when the timer interrupt is generated in the other modification of the second embodiment.

FIG. 18 illustrates an exemplary flowchart of processing operation of the main processor 2 when the mode setting module 309 designates the output manner. During the running of the non-secure OS, the mode setting module 309 selects the output manner of the counter value and writes the selection result into the output manner notification data area of the main memory 5 (step S301). The main processor 2 is instructed to execute the OS transition processing using the non-secure OS transition instruction caller 310 (step S302).

The main processor 2 transfers the processing to the OS switcher 102 of the secure monitor 100. The OS switcher 102 executes the OS transition processing (step S303). The mode setting module 309 is recognized as the calling origin, and the output mode setting module 211 of the secure OS module 200f is executed (step S304). The output mode setting module 211 reads the value of the output manner notification data area and identifies the output manner of the counter value (step S305). The output mode setting module 211 notifies the data updating module 202 of the output manner. The data updating module 202 selects the designated output manner and outputs the value of the counter value to the main memory 5 (step S306). The output mode setting module 211 calls the secure OS transition instruction caller 203 of the secure OS module 200f and the OS switching instruction is executed in the main processor 2 (step S307). After the processing at step S307, the processing is performed in the same manner as that for transition from the secure OS to the non-secure OS illustrated in FIG. 11, for example.

In the second embodiment, the mode setting module 309 selects one of the three output manners. The output manner may be selected out of the two output manners, one of which is the output of only the encrypted counter value and the other of which is the output of both of the encrypted counter value and the counter value in a plain text. Thus, the manner to output the counter value in a plain text to the output mode setting module 211 cannot be selected. Alternatively, the output manner may be limited to the selection of only the output of the counter value in a plain text.

In the second embodiment, the mode setting module is included in the non-secure OS module 300. The mode setting module, however, may be included in the secure monitor 100. In this case, the non-secure OS transition instruction caller 310 is not required. The mode setting module may notify an output device setting module of which output manner is being selected as a procedure of the initialization processing at the booting of the information processing apparatus 10.

Third Embodiment

In the first and the second embodiments, the setting of the address space controller 3 that performs the control on access from the main processor 2 to the main memory 5 is made as a procedure of the initialization processing at the booting of the information processing apparatus 10. In a third embodiment, the control on the access from a non-secure OS module 300d to the main memory 5 is set during the running of the information processing apparatus 10.

Figure 19:
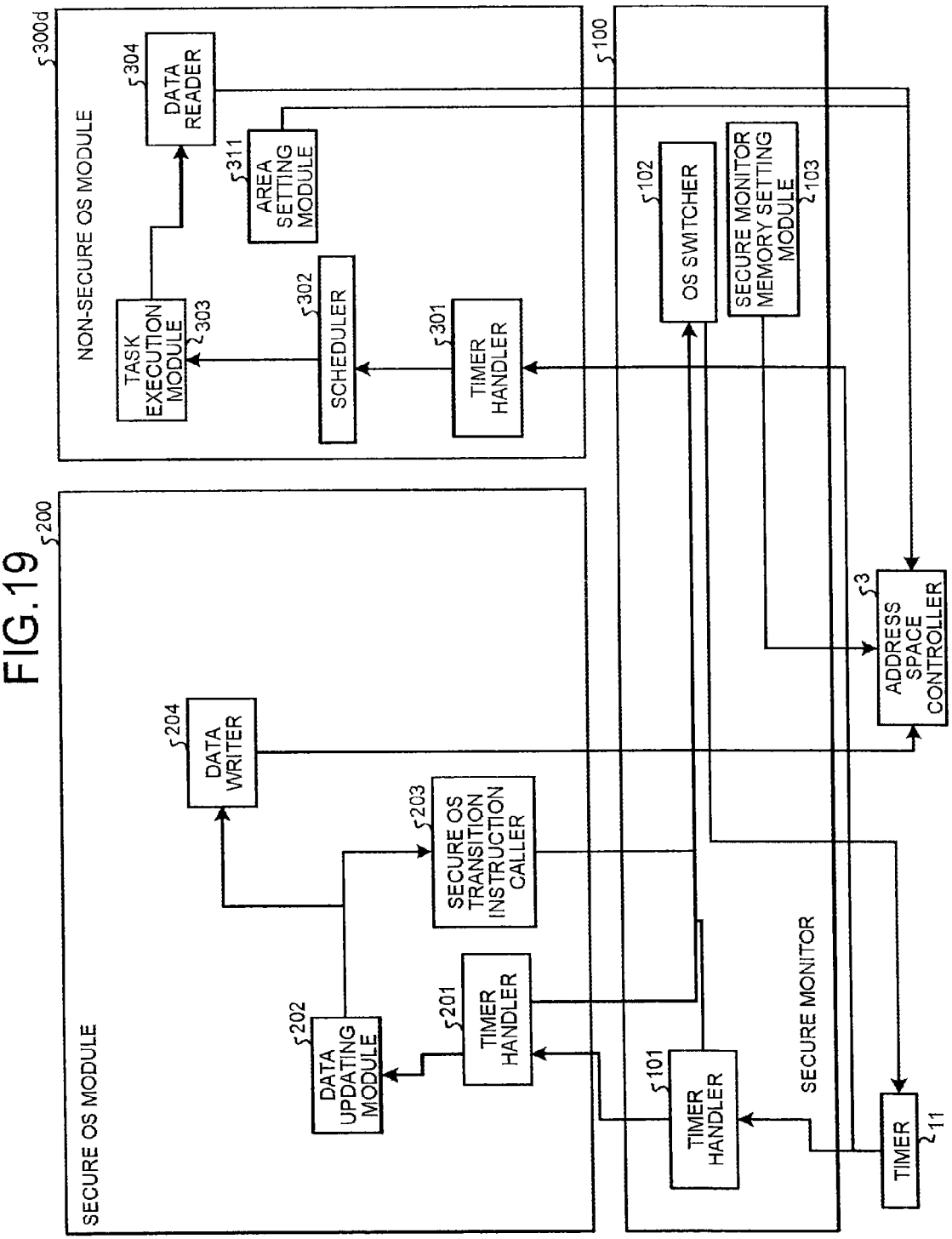
FIG. 19 is a block diagram of software in a third embodiment.

FIG. 19 illustrates an exemplary structure of the software running on the main processor 2 of the information processing apparatus 10 in the third embodiment. The hardware has the same structure as that of the first embodiment. The structure illustrated in FIG. 19 differs from that illustrated in FIG. 2 in that the non-secure OS module 300d further includes an area setting module 311. The area setting module 311 of the non-secure OS module 300d is a processing module that sets, to the address space controller 3, which access right is set to which memory area.

Figure 20:
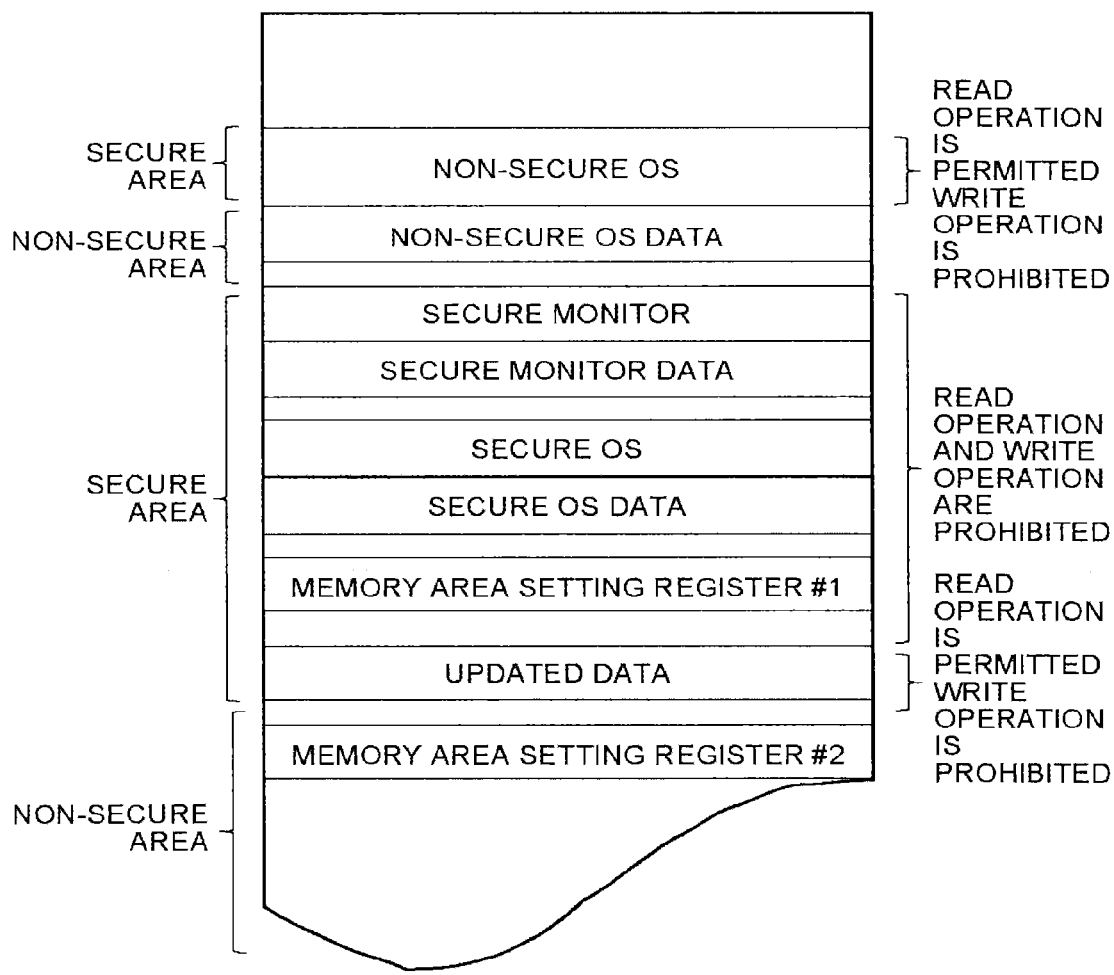
FIG. 20 is a schematic diagram illustrating an example of the segmentation of the memory area in the third embodiment.

FIG. 20 illustrates an example of the segmentation of the memory area of the main memory 5 after the area setting module 311 sets the access right setting to the address space controller 3. Immediately after the booting of the information processing apparatus 10, the memory area of the main memory 5 is set as illustrated in FIG. 3. The area setting module 311 of the non-secure OS module 300d sets the main memory 5 as illustrated in FIG. 20. As illustrated in FIG. 20, the area in which the non-secure OS module 300d is allocated is designated as the secure area.

Furthermore, in FIG. 20, memory setting registers are allocated in two areas. The reasons are as follows. The memory area needs to be divided into the following two areas: an area (non-secure area) in which the access right setting can be changed by the non-secure OS, and an area (secure area) in which the access right setting cannot be changed by the non-secure OS. For example, the area in which the secure monitor 100 and the secure OS module 200 are allocated needs to be set as the secure area, in which read operation and write operation by the non-secure OS are prohibited, in order to prevent the secure monitor 100 and the secure OS module 200 from being tampered with by the non-secure OS. If the area is set, by the area setting module 311 of the non-secure OS module 300d to the area in which write operation is permitted after the booting of the information processing apparatus 10, the secure monitor 100 and the secure OS module 200 may be tampered with by the non-secure OS module 300. The area, thus, needs to be set as the area in which the access right setting cannot be changed by the area setting module 311 of the non-secure OS module 300d. A memory area setting register #1 is the register that makes the setting of the access right on the area in which the secure monitor 100 and the secure OS module 200 are allocated. When the setting of the memory area setting register #1 is changed, the access right to the area in which the secure monitor 100 and the secure OS module 200 are allocated is changed. The setting of the access right for the memory area setting register #1 is made by the secure monitor memory setting module 103 as part of the initialization processing at the booting of the information processing apparatus 10 in the same manner as the first and the second embodiments. The memory area setting register #1 is allocated in the secure area. Thus, the non-secure OS cannot change the value of the memory area setting register #1.

Immediately after the booting of the information processing apparatus 10, the area in which the non-secure OS module 300d is allocated is set as the non-secure area, as illustrated in FIG. 3. When the area is set, by the area setting module 311, as the secure area in which write operation is prohibited, such a setting is effective in the following exemplary case. If bugs causing the non-secure OS to have vulnerability are included in the non-secure OS and the non-secure OS module 300d is infected by malware that tampers with the memory area of the non-secure OS module 300d, the setting can prevent the memory area from being rewritten by the malware. The data area of the non-secure OS cannot be set as the area in which write operation is prohibited because the OS running in the non-secure mode, i.e., the non-secure OS module 300d, needs to perform read and write access on the data area. The setting of the code area of the non-secure OS to the area in which write operation is prohibited causes no problem. Generally, the non-secure OS module 300 manages which area of the main memory 5 is set as the code area or the data area of the non-secure OS module 300. Thus, after the booting of the non-secure OS in the information processing apparatus 10, the non-secure OS may set only the code area thereof as the area in which read operation is permitted and write operation is prohibited on the basis of the information managed by itself. The area for the non-secure OS module 300d needs to be set as the area in which the access right setting can be changed. The setting is made by the area setting module 311 of the non-secure OS module 300d. A memory area register #2 is the register that makes the setting of the access right on the area for the non-secure OS module 300d. When the setting of the memory area setting register #2 is changed, the access right to the area for the non-secure OS module 300d is changed. In order to prevent the content of the memory area setting register #2 from being overwritten such that write operation is permitted after the memory area setting register #2 is set by the non-secure OS module 300d such that write operation is prohibited, the non-secure OS module 300d may set the setting such that write operation by the non-secure OS module 300d on the memory setting register #2 is prohibited.

Figure 21:
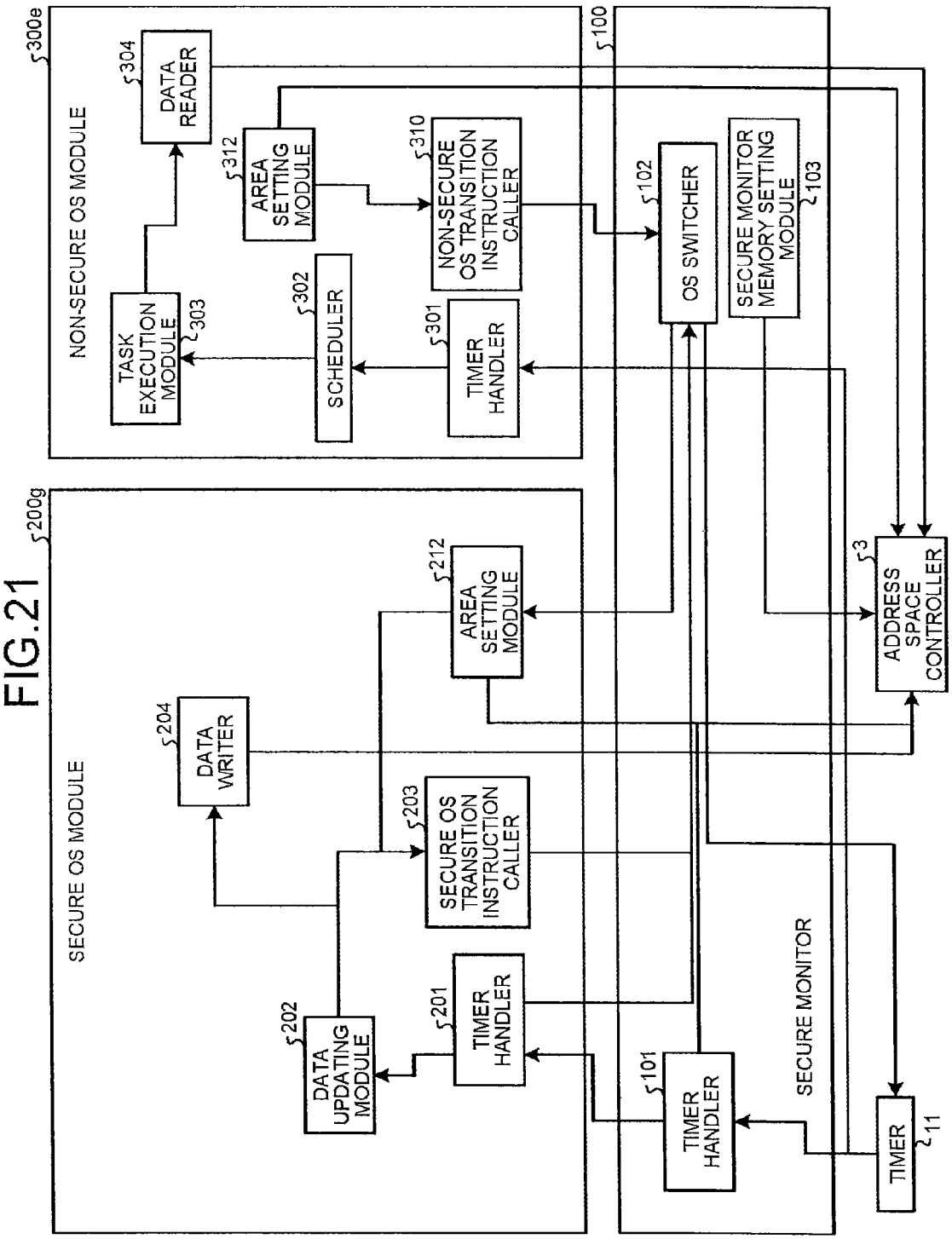
FIG. 21 is a block diagram of the software in a modification of the third embodiment.

FIG. 21 illustrates another example of the structure of FIG. 19. The structure illustrated in FIG. 21 differs from that illustrated in FIG. 19 in that a non-secure OS module 300e includes the non-secure OS transition instruction caller 310 and an area designation module 312 instead of the area setting module 311, and a secure OS module 200g further includes an area setting module 212.

In the structure illustrated in FIG. 19, the area setting module 311 of the non-secure OS module 300d directly sets the access right to the memory area for the non-secure OS module 300d to the address space controller 3. In the structure illustrated in FIG. 21, the non-secure OS module 300e notifies the area setting module 212 of the secure OS module 200g of which access right to be set. The area setting module 212 of the secure OS module 200g sets the access right setting to the address space controller 3. The non-secure OS module 300e does not directly set the access right setting to the address space controller 3.

The area designation module 312 is a processing module that sets which access right is set to which memory area. This setting may be made through the main memory 5. Specifically, the area designation module 312 writes information indicating the designation of the memory area and the setting of the access right (access control information) into the main memory 5. The area designation module 312 requests the non-secure OS transition instruction caller 310 to perform the transition to the secure mode.

The non-secure OS transition instruction caller 310 is a processing module that executes an OS switching instruction in the main processor 2. As described above, when the OS switching instruction is executed in the main processor 2, the main processor 2 performs the transition of the processing to the OS switcher 102 of the secure monitor 100. The OS switcher 102 switches the operating state of the main processor 2 from the non-secure mode to the secure mode, as described above.

The area setting module 212 reads the access control information written in the main memory 5 and sets the setting to the address space controller 3.

Figure 22:
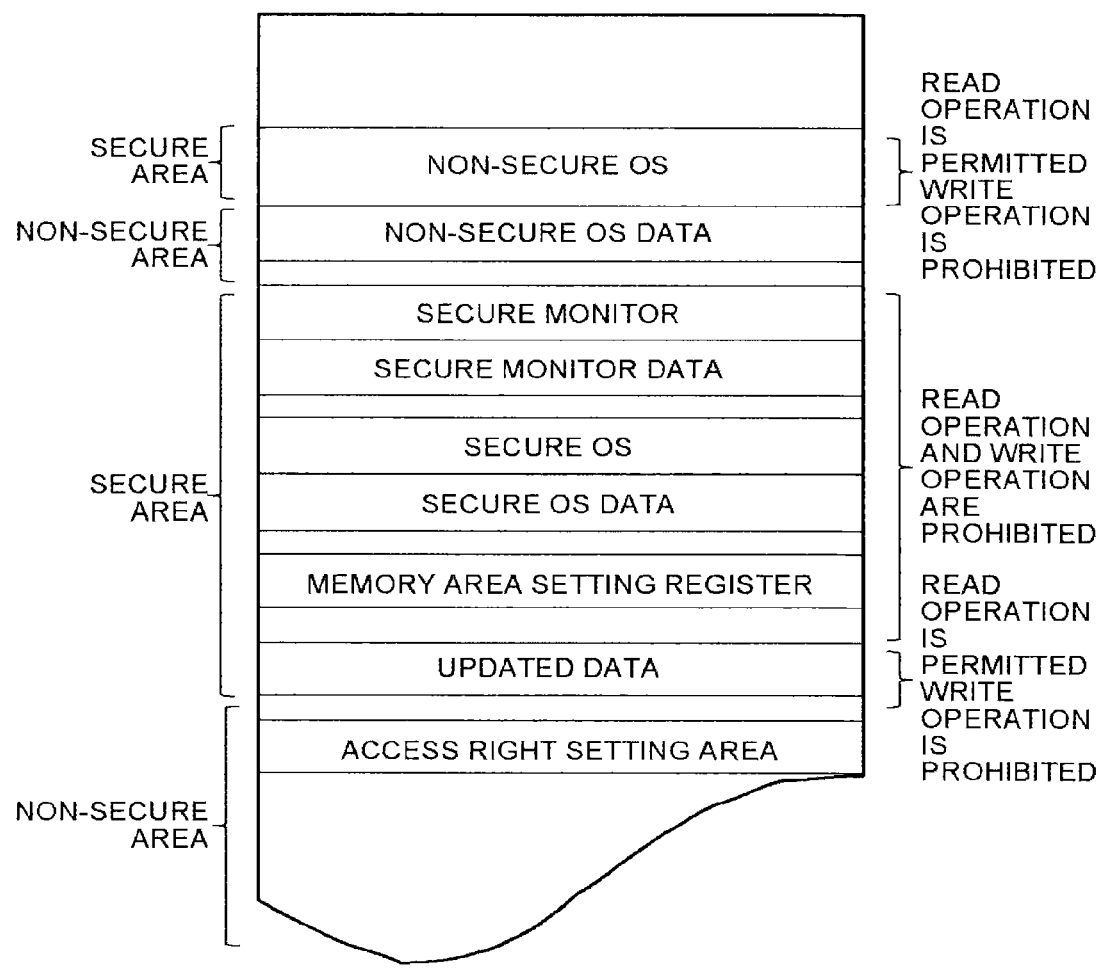
FIG. 22 is a schematic diagram illustrating an example of the segmentation of the memory area in the modification of the third embodiment.

FIG. 22 illustrates an example of the segmentation of the memory area of the main memory 5 after the area setting module 212 sets the access rights setting to the address space controller 3. Immediately after the booting of the information processing apparatus 10, the memory area of the main memory 5 is set as illustrated in FIG. 3. The area setting module 212 sets the access right setting as illustrated in FIG. 22. Specifically, the area in which the non-secure OS module 300e is allocated is designated as the secure area in which read operation is permitted and write operation is prohibited in the same manner as that in FIG. 20. An access right setting area is defined as the non-secure area. The area setting module 212 of the secure OS module 200g reads the access control information written by the area designation module 312 from the access right setting area, and sets the access right setting to the address space controller 3 through the memory area setting register. More specifically, the area setting module 212 checks the access control information and identifies the area in which the access right is to be changed (also referred to as the change target area) and the access right to be newly set to the area. When the change target area is the area for the non-secure OS module 300e or the non-secure area, the change in setting is permitted while when the change target area is the area for the secure monitor 100 or the secure OS module 200g, the change in setting is prohibited. The area setting module 212 may check the access right and perform the following setting. When the non-secure OS area is changed, by the area designation module 312, from the non-secure area to the secure area in which write operation is prohibited and read operation is permitted, the change back of the non-secure OS area to the non-secure area from the secure area is prohibited. This setting makes it possible to prevent that an illegitimate program running on the non-secure OS attacks to cancel the secure area and change back to the non-secure area after the change from the non-secure area to the secure area.

Figure 23:
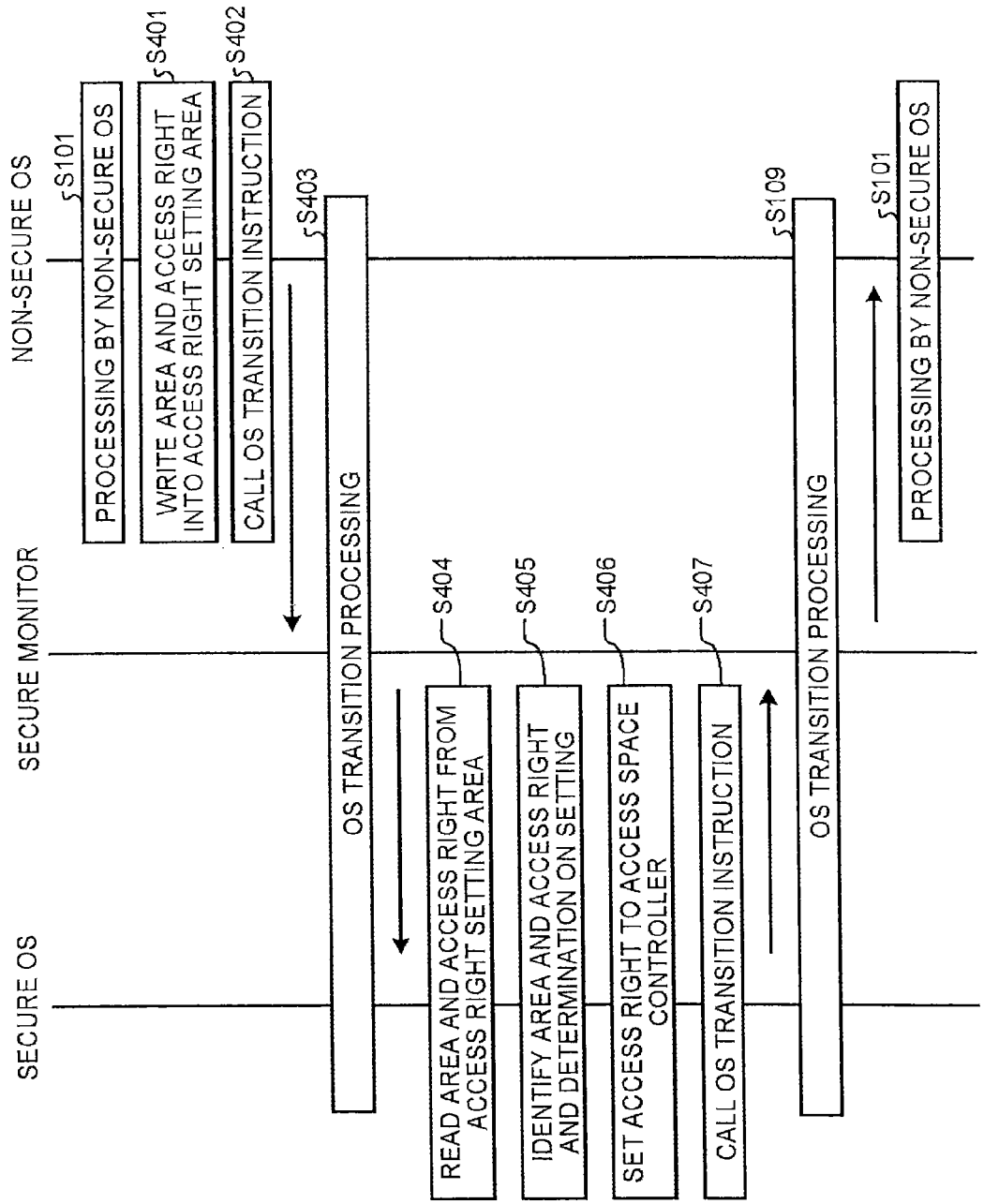
FIG. 23 is a flowchart illustrating processing by a main processor in the modification of the third embodiment.

FIG. 23 illustrates an exemplary flowchart of processing operation by the main processor 2 when the area designation module 312 designates the access right set to the address space controller 3. The area designation module 312 writes data that designates the area and the access right into the access right setting area such that the area in which the non-secure OS module 300e is allocated is designated as the secure area in which read operation is permitted and write operation is prohibited (step S401). The write operation is normally performed because the access right setting area is designated as the non-secure area. The main processor 2 is instructed to execute the OS transition processing using the non-secure OS transition instruction caller 310 (step S402).

The main processor 2 transfers the processing to the OS switcher 102 of the secure monitor 100. The OS switcher 102 executes the OS transition processing (step S403). The area designation module 312 is recognized as the calling origin, and the area setting module 212 of the secure OS module 200g is executed. The area setting module 212 reads, from the access right setting area, the area to which the access right is set and the information about the access right set to the area (step S404). It is determined whether the setting is permitted (step S405). If the setting is prohibited, e.g., the area for the secure OS module 200g is set as the non-secure area, the processing ends. If the setting is permitted, the setting is made to the address space controller 3 (step S406). The setting of the access right is made through the memory area setting register. The area setting module 212 calls the secure OS transition instruction caller 203 of the secure OS module 200g and the OS switching instruction is executed in the main processor 2 (step S407). After the processing at step S407, the processing is performed in the same manner as that for transition from the secure OS to the non-secure OS illustrated in FIG. 11, for example.

The third embodiment enables the setting of the access right to control the access from the main processor 2 to the main memory 5 to be made after the booting of the information processing apparatus 10. The structure that sets the access right before the booting of the information processing apparatus 10 needs to preliminarily grasp which program (the operating system and the secure monitor) is allocated in which area of the main memory 5 and appropriately set the access right in accordance with the arrangement. Particularly, the image size of the non-secure OS may be changed after the updating, for example. The area to which the access right is set, thus, needs to be appropriately set in accordance with the updated size of the non-secure OS. The third embodiment enables the access right to be set by the non-secure OS after the booting of the information processing apparatus 10 and the non-secure OS grasps the image size thereof, thereby making it possible for appropriate setting of the access right to be readily made in accordance with the updating of the non-secure OS.

Fourth Embodiment

In the conventional technique, the main processor has two modes of the secure mode and the non-secure mode, and the access control mechanism to the memory space by the hardware prevents the area for the secure mode from being read or tampered with in the non-secure mode. In the first to the third embodiments, the setting is made by which write access to a specific area of the main memory 5 in the non-secure mode is prohibited after the information processing apparatus 10 is booted. The conventional technique, however, does not clarify the operation and the detailed countermeasures when the software (non-secure OS module 300) running in the non-secure mode writes data into the area in which write operation is prohibited or reads data from the area in which read operation is prohibited after the setting of the access right to the main memory 5 is made.

In a fourth embodiment, the operation of a secure OS module 200i is described when the access is made in the non-secure mode to the memory area designated as the area in which the access in the non-secure mode is prohibited. In the case that the access is made to the memory area designated as the area in which the access in the non-secure mode is prohibited, it is very beneficial if the cause of the violation of the access right to the main memory 5 is investigated and actions can be taken in the secure mode before the processing is performed in the non-secure mode, making it possible to help the investigation of the cause of malfunction on the non-secure OS and stop the execution of an illegitimate application causing the occurrence of the malfunction.

There are two cases of the violation of the access right. In one case, the software (non-secure OS) running in the non-secure mode performs read operation on the area set as the area in which read operation in the non-secure mode is prohibited. In the other case, the software (non-secure OS) running in the non-secure mode performs write operation on the area set as the area in which write operation in the non-secure mode is prohibited. The following describes the case where write access is made in the non-secure mode to the area designated as the area in which write operation is prohibited of the main memory 5, for simple explanation.

Figure 24:
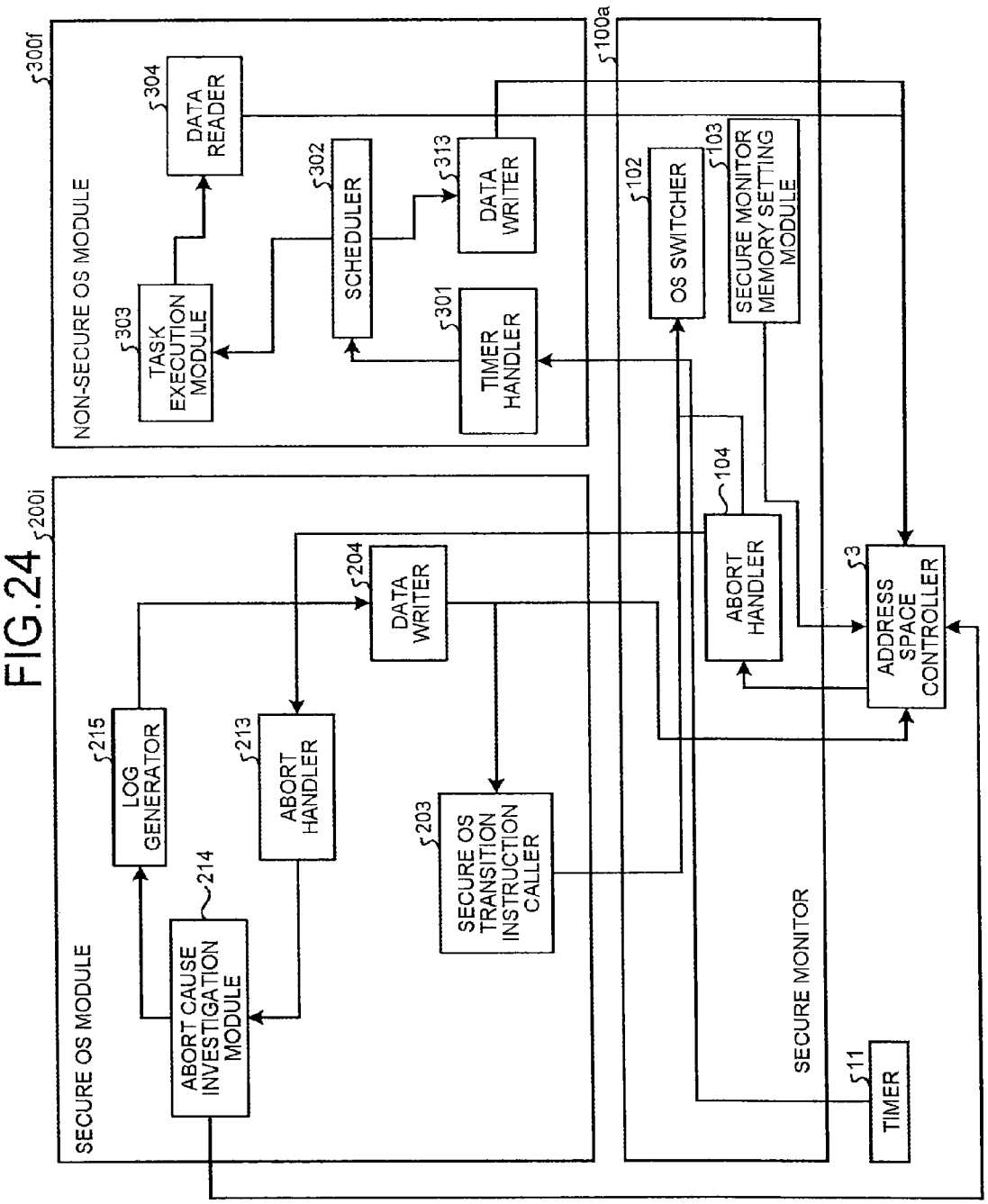
FIG. 24 is a block diagram of software in a fourth embodiment.

FIG. 24 illustrates an exemplary structure of the software running on the main processor 2. The hardware has the same structure as that of the first embodiment. As illustrated in FIG. 24, the software includes a secure monitor 100a, the secure OS module 200i, and a non-secure OS module 300f. The secure monitor 100a includes an abort handler 104, the OS switcher 102, and the secure monitor memory setting module 103. The OS switcher 102 and the secure monitor memory setting module 103 have the same functions of those described with reference to FIG. 2. The non-secure OS module 300f includes the timer handler 301, the scheduler 302, the task execution module 303, the data reader 304, and a data writer 313. The timer handler 301, the scheduler 302, the task execution module 303, and the data reader 304 have the same functions as those described with reference to FIG. 2. The secure OS module 200i includes the secure OS transition instruction caller 203, the data writer 204, an abort handler 213, an abort cause investigation module 214, and a log generator 215. The secure OS transition instruction caller 203 and the data writer 204 have the same functions as those described with reference to FIG. 2.

The address space controller 3 is a processing module that generates an abort exception when the software (non-secure OS) running in the non-secure mode performs data access to the area designated as the area in which access in the non-secure mode is prohibited of the main memory 5.

The abort handler 104 of the secure monitor 100a is a processing module that is called by the address space controller 3 when an instruction is made to write data in the non-secure mode to the area designated as the area in which write operation in the non-secure mode is prohibited, i.e., when a data abort exception is generated. When detecting the generation of the data abort exception from the address space controller 3, the main processor 2 performs the transition of the processing to the abort handler 104 of the secure monitor 100a.

The data writer 313 of the non-secure OS module 300f is a processing module that writes data into the area designated as the area in which write operation in the non-secure mode is prohibited of the main memory 5. The abort handler 213 of the secure OS module 200i is a processing module that is called by the abort handler 104 of the secure monitor 100a.

The abort cause investigation module 214 is a processing module that identifies the cause of a data abort exception when the data abort exception is generated and instructs the log generator 215 to record the cause as a log. The log generator 215 is a processing module that outputs the record of the log to the main memory 5 in order to record the cause of the data abort exception as the log in accordance with the instruction from the abort cause investigation module 214.

Figure 25:
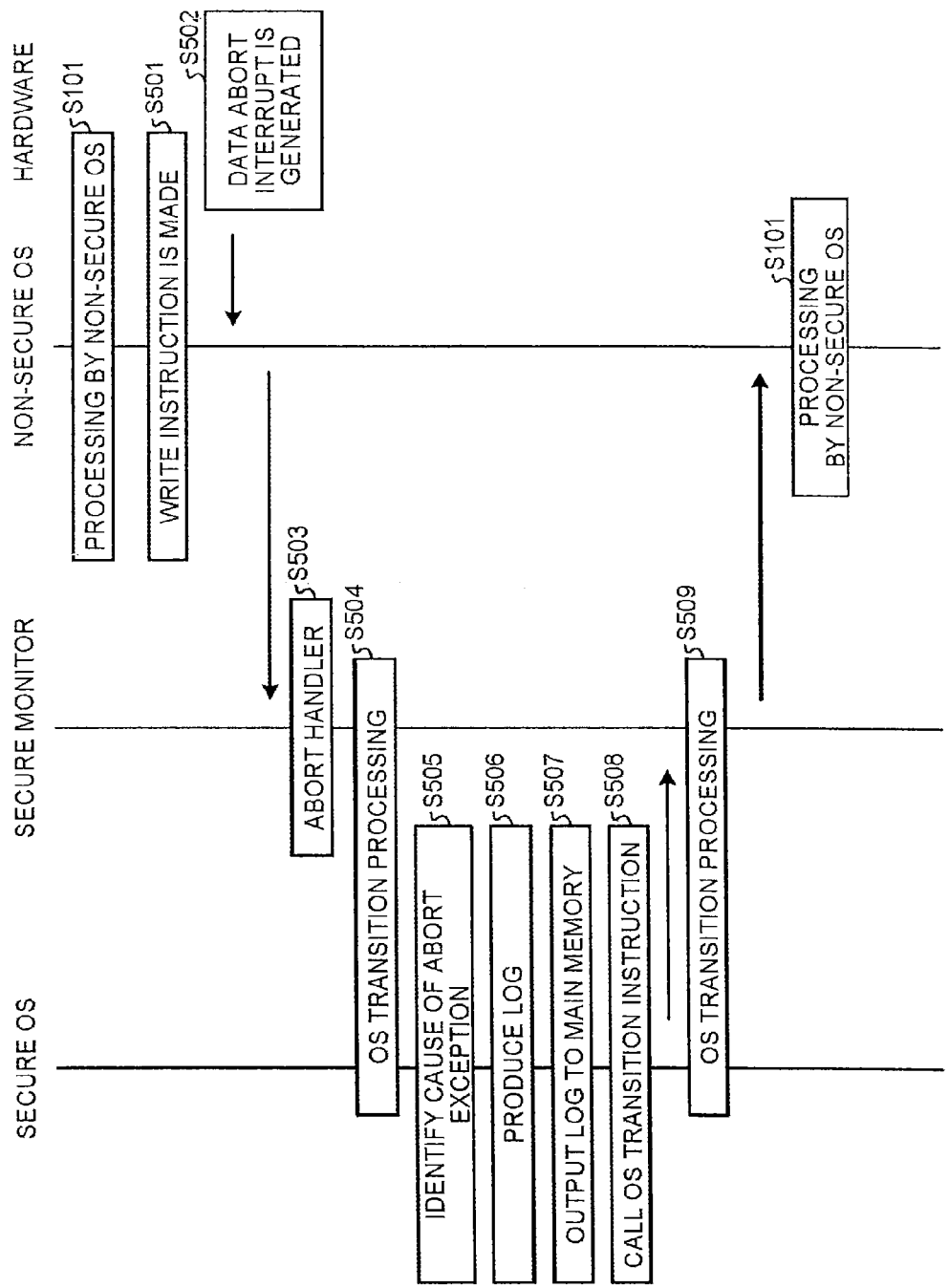
FIG. 25 is a flowchart illustrating processing when an interrupt is generated in the fourth embodiment.

FIG. 25 is an exemplary flowchart of a processing operation by the main processor 2 when an instruction is made in the non-secure mode to write data into the area designated as the area in which write operation in the non-secure mode is prohibited. The non-secure OS running in the non-secure mode tries to write data into the area (e.g., the area in which the code of the secure monitor is allocated (secure monitor area) in FIG. 3) of the main memory 5, the area being designated as the area in which write operation in the non-secure mode is prohibited (step S501). This write operation may be due to bugs in the non-secure OS or may be due to an incorrect write instruction that is issued by the non-secure OS tampered with by an attacker and tries to tamper with the secure monitor or the secure OS.

The address space controller 3 detects the violation of the access right and generates the data abort exception. When the data abort exception is generated, the main processor 2 performs the transition of the processing to the abort handler 104 of the secure monitor 100a (step S502). The secure monitor memory setting module 103 preliminarily makes a setting such that the address space controller 3 calls the abort handler 104 of the secure monitor 100a when the address space controller 3 detects a violation of the access right. This setting is made as a procedure of the initialization processing at the booting of the information processing apparatus 10. The abort handler 104 of the secure monitor 100a calls the OS switcher 102 (step S503), causes the OS switcher 102 to switch the mode of the main processor 2 from the non-secure mode to the secure mode to perform the transition from the non-secure OS to the secure OS, and calls the abort handler 213 of the secure OS module 200i (step S504).

The abort handler 213 calls the abort cause investigation module 214. The abort cause investigation module 214 investigates in which area and by which instruction the abort exception occurs on the basis of the value of the register of the main processor 2 and the scanning result of the memory area around the area in which the abort exception occurred (step S505). For example, the abort cause investigation module 214 reads the value of the register of the main processor 2, e.g., the value of the program counter (the address of the instruction executed by the main processor 2) and identifies the instruction causing the occurrence of the abort exception from the address or the addresses before and after the address. For example, it is investigated that the abort exception occurred because a write instruction was tried to be executed, in accordance with an instruction A, to an address X at which write operation is prohibited or that the abort exception occurred because a read instruction was tried to be executed, in accordance with an instruction A', to an address Y at which read operation is prohibited. The abort cause investigation module 214 then transmits, to the log generator 215, the instruction causing the occurrence of the abort exception, the address to which the access was tried to be made, and information about attribute information attached to the instruction (step S506). The log generator 215 outputs the received information to the main memory 5 (step S507).

The data writer 204 calls the secure OS transition instruction caller 203 of the secure OS module 200i (step S508) and the OS switching instruction is executed in the main processor 2 (step S509). After the processing at step S509, the processing is performed in the same manner as that for the transition from the secure OS to the non-secure OS illustrated in FIG. 11, for example.

Figure 26:
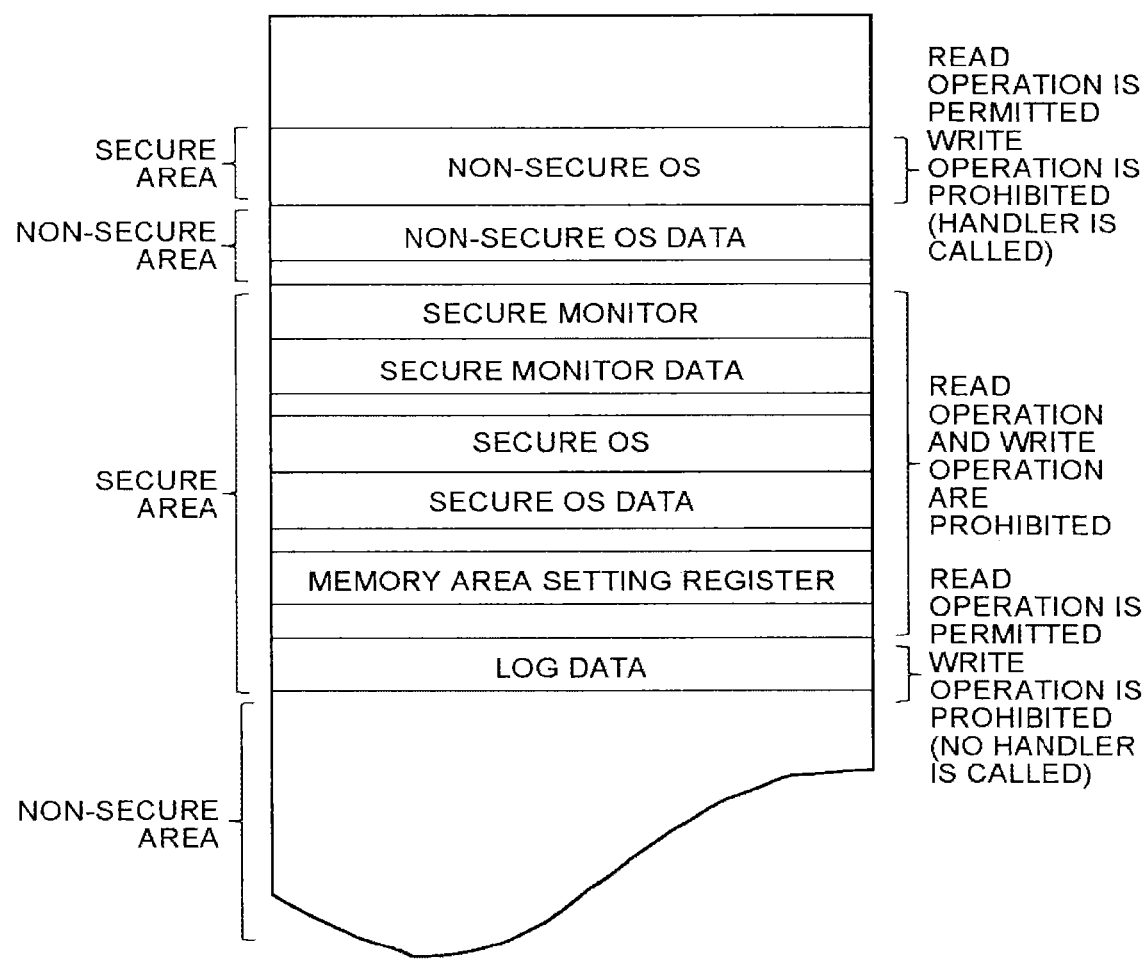
FIG. 26 is a schematic diagram illustrating an example of the segmentation of the memory area in the fourth embodiment.

When access is made in the non-secure mode to the area in which the access in the non-secure mode is prohibited, the secure OS module 200i is not always required to output all of the log information to the main memory 5. FIG. 26 illustrates an example of the segmentation of the memory area of the main memory 5 in this case.

In the example illustrated in FIG. 26, when the write access is made in the non-secure mode to the area in which the non-secure OS module 300f is allocated, the abort handler 213 of the secure OS module 200i is called. When the write instruction is made in the non-secure mode to the updated data area, the area in which the secure monitor is stored, or the area in which the secure OS is stored, the abort handler 213 of the secure OS module 200i is not called. FIG. 27 illustrates the setting of the access right in this case.

Figure 28:
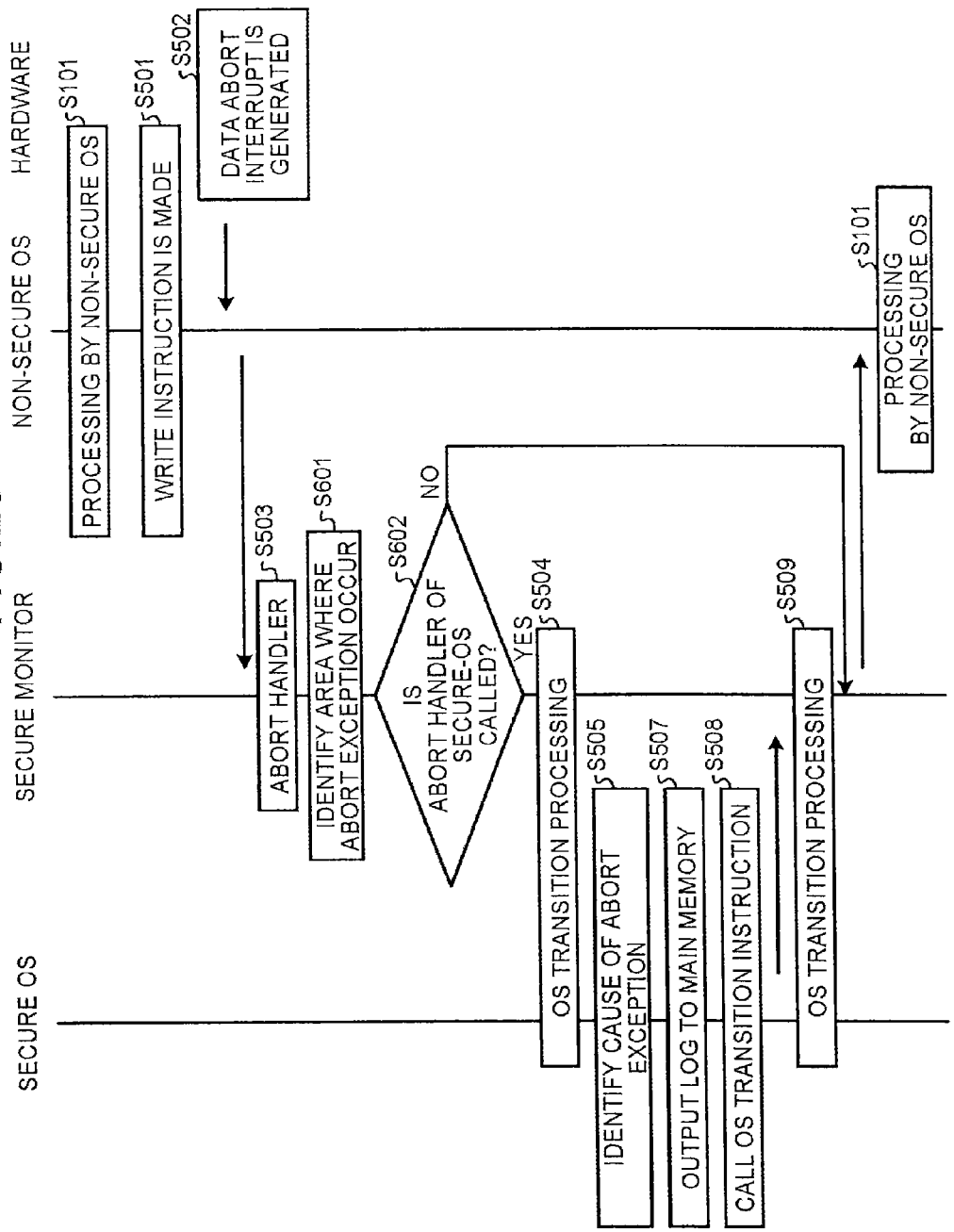
FIG. 28 is a flowchart illustrating processing when the interrupt is generated in a modification of the fourth embodiment.

FIG. 28 is an exemplary flowchart of a processing operation of the main processor 2 when it is determined whether the abort handler 213 of the secure OS module 200i is called in accordance with the area of the main memory 5, to which the access is made in the non-secure mode.

The processing from step S101 to step S502 at which the address space controller 3 detects the violation of the access right and generates the abort exception and step S503 at which the address space controller 3 calls the abort handler 104 of the secure monitor 100a is the same as that illustrated in FIG. 25. The abort handler 104 of the secure monitor 100a investigates in which area of the main memory 5 the abort exception occurred (step S601). The abort handler 104 determines whether the abort handler 213 of the secure OS module 200i is to be called in accordance with the identified area in which the abort exception occurred (step S602). If the identified area is the updated data area, the area in which the secure monitor 100a is stored or the area in which the secure OS is stored, the abort handler 104 returns the processing to the non-secure OS module 300f without performing the processing after step S602. If the identified area is the area in which the non-secure OS module 300f is allocated, the OS transition processing is performed, and thereafter the processing is performed in the same manner as that illustrated in FIG. 25.

An advantage of the structure in which the log is produced only when write operation is performed on the area in which non-secure OS module 300f is allocated is that the log is used for debugging the non-secure OS module 300f. As illustrated in FIG. 27, the write access in the non-secure mode is prohibited to the area in which the non-secure OS module 300f is allocated. However, the non-secure OS module 300f may be modified, if not by an unauthorized access by an attacker, but by the non-secure OS itself overwriting its code area and dynamically changing the processing content after being booted. This includes cases where the non-secure OS module 300f has a self-modifying function as a normal function thereof and where installation of a driver is permitted that overwrites the code area of the non-secure OS. When the non-secure OS module 300f has such a structure and a developer makes the setting of the access right on the main memory 5 as the structure illustrated in FIG. 27 and executes the non-secure OS module 300f in a development stage, the non-secure OS performs processing on the assumption that the memory area managed by itself is originally changeable (can be overwritten). Thus, when the processing fails, the non-secure OS stops by determining that an unpredictable event has occurred. The addresses and instructions that the non-secure OS tries to access are recorded by the log generator 215 of the secure OS module 200i in a log data area of the main memory 5. As a result, the developer of the non-secure OS can know what caused the non-secure OS to stop.

The same structure can detect the tampering performed on the non-secure OS and keep a record. When the self-modifying function is deleted from the non-secure OS module 300f or the installation of the software that overwrites the code area of the non-secure OS is prohibited, no overwrite of the non-secure OS module 300f occurs and no abort exception occurs. Even when the non-secure OS module 300f has the self-modifying function or the installation of the driver that overwrites the code area of the non-secure OS is permitted, if the investigation is completed about which area is to be overwritten, the area is preliminarily set as the area in which read operation and write operation are permitted, i.e., as the non-secure area. In this case too, no abort exception occurs. Regardless of the fact described above, when a program running in the non-secure mode performs write operation on the area in which the non-secure OS module 300f is stored and in which the write access in the non-secure mode is prohibited, the write operation can be considered as an illegitimate write operation. The production of the log only when the write operation is performed on the area in which the non-secure OS module 300f is stored, makes it possible to keep a record that the non-secure OS module 300f executes an illegitimate program.

Figure 29:
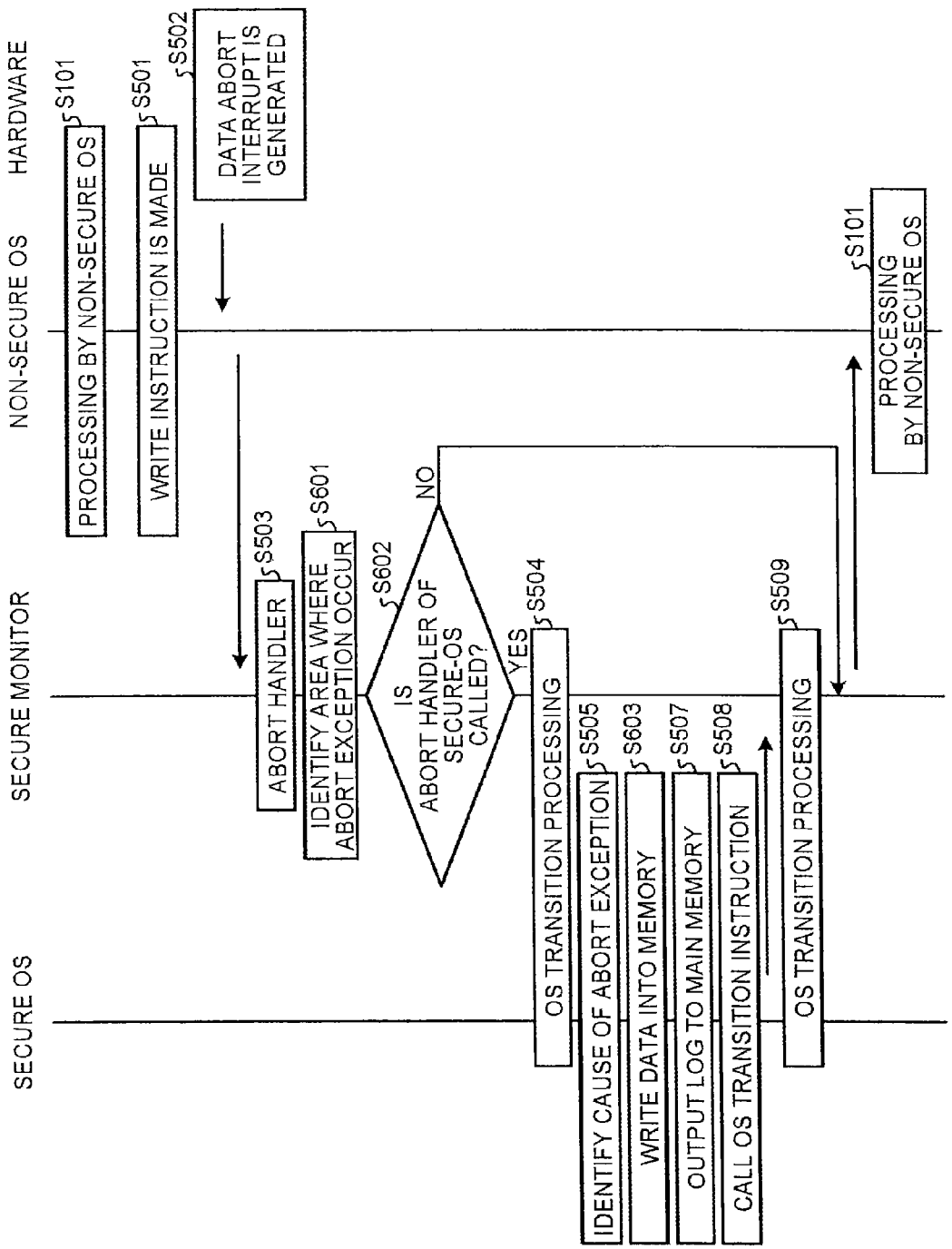
FIG. 29 is a flowchart illustrating processing when the interrupt is generated in another modification of the fourth embodiment.

In the same manner, when the write operation is performed on the code area of the non-secure OS module 300f, in which write operation in the non-secure mode is prohibited, the write operation on a specific area may be permitted. FIG. 29 is an exemplary flowchart of a processing operation of the main processor 2 in this case. The following is preliminarily registered in the abort cause investigation module 214 of the secure OS module 200i as the setting when the write operation is performed on the code area of the non-secure OS module 300f: when the write instruction is performed on an area in main memory 5, whether data is written into the area or not written into the area. This setting processing is performed as part of the processing at the booting of the information processing apparatus.

When the writing operation is performed on the code area of the non-secure OS module 300f, the abort cause investigation module 214 investigates in which area and by which instruction the abort exception occurs on the basis of the value of the register of the main processor 2 and the scanning result of the memory area around the area in which the abort exception occurs (step S505). If the abort cause investigation module 214 determines that the area is the area in which write operation is preliminarily permitted, the data is written into the main memory 5 by the data writer 204 of the secure OS module 200i (step S603). The writing of the data is not performed by the non-secure OS module 300f but is actually performed by the secure OS module 200i. The processing after the processing at step S603 is the same as that in FIG. 28. In this case, the log generator 215 is not always required to write the log information into the main memory 5.

This processing makes it look like the data is actually written by the non-secure OS module 300f, thereby making it possible to achieve that the non-secure OS module 300f has the self-modifying function or the installation of the driver that overwrites the code area of the non-secure OS module 300f is permitted. On the other hand, the overwriting of the area other than a certain area in the code area of the non-secure OS module 300f is prohibited. This makes it possible to prevent that an illegitimate program running on the non-secure OS attacks to overwrite the code area of the non-secure OS module 300f.

Figure 30:
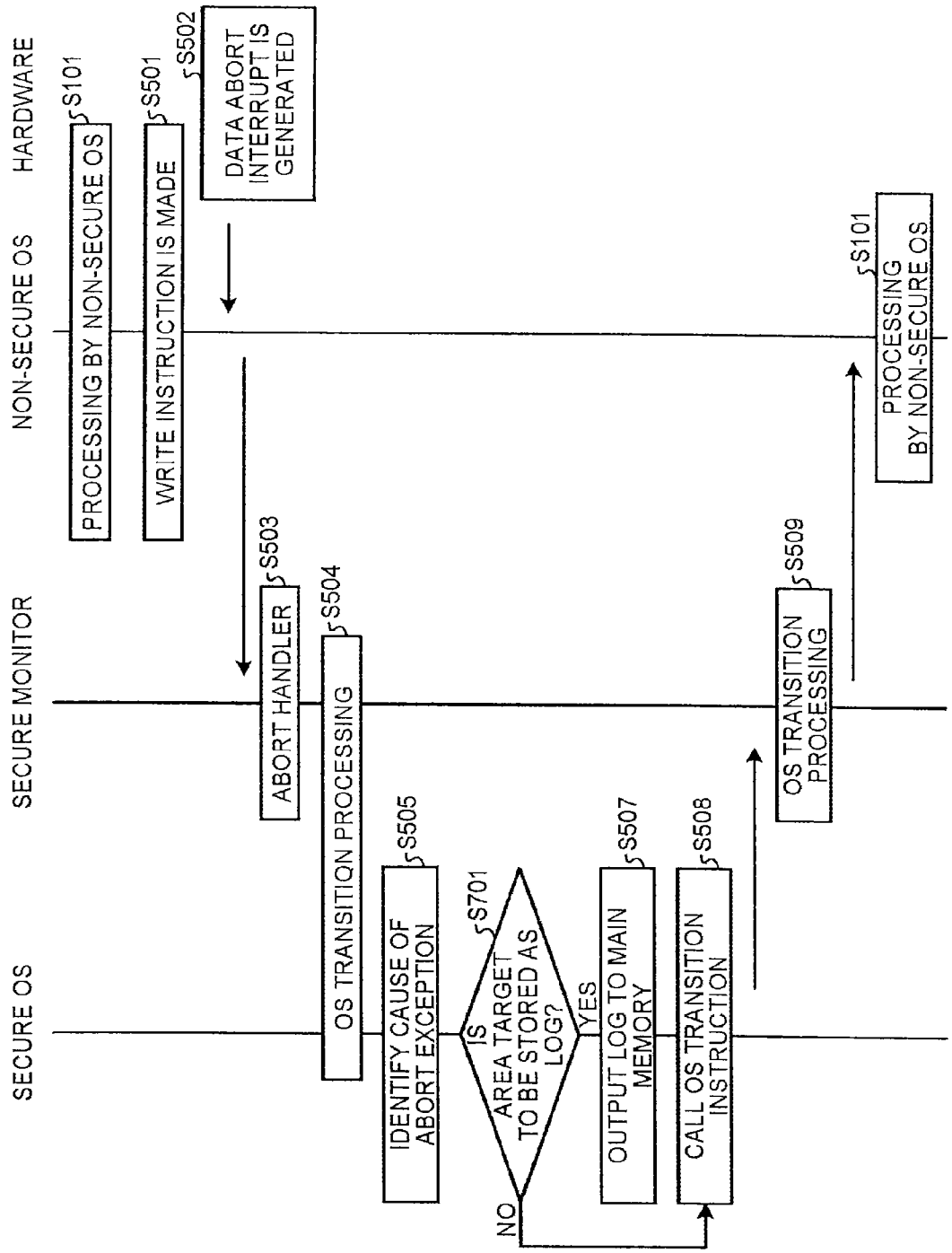
FIG. 30 is a flowchart illustrating processing when the interrupt is generated in another modification of the fourth embodiment.

The log generator 215 may determine whether the log generator 215 outputs the log information to the main memory 5 depending on the investigation result of the abort cause investigation module 214. FIG. 30 is an exemplary flowchart of a processing operation of the main processor 2 in this case. The abort cause investigation module 214 investigates the cause of the occurrence of the abort exception and notifies the log generator 215 of the address where the abort exception occurs and instruction that causes the occurrence of the abort exception (step S505). The log generator 215 determines whether the area is the target to be stored as the log from the notified address and determines whether the log generator 215 writes the log into the main memory 5 (step S701). In other words, the log generator 215 does not transmit all of the abort exceptions to the data writer 204 but performs filtering.

The structure described above makes it possible to achieve that no log is collected when the access is made to the area in which the access is originally prohibited due to bugs in the non-secure OS, while a log is recorded when the access is made by the non-secure OS as an attack.

In the above, a way is described in which the log generator 215 records the investigation result collected by the abort cause investigation module 214. The fourth embodiment is not limited to recording the investigation result collected by the abort cause investigation module 214 as the log. On the basis of the investigation result, the operation of the non-secure OS may be changed. Specifically, a structure may be employed that stops the process (application) of the non-secure OS causing the occurrence of the abort exception.

Figure 31:
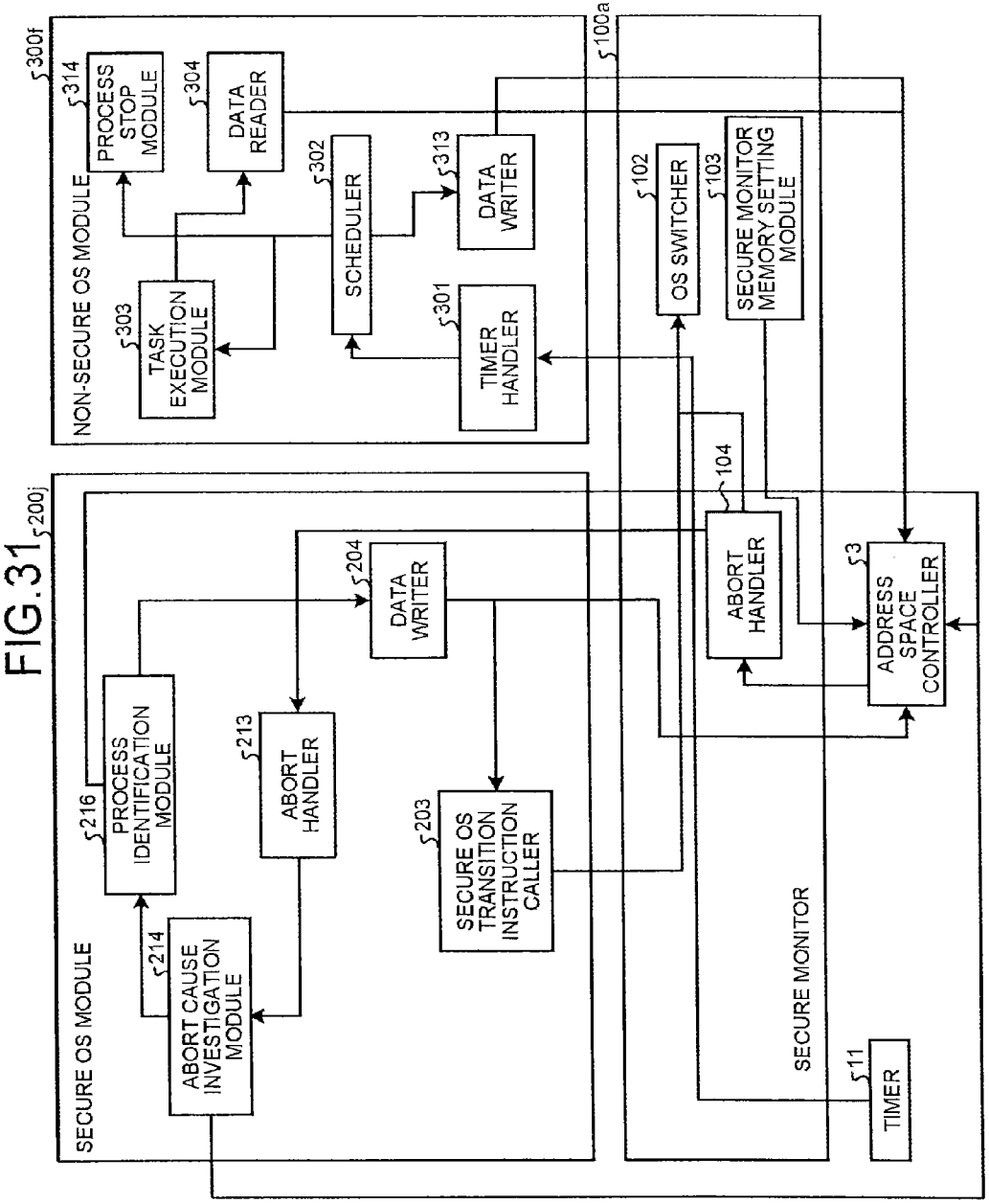
FIG. 31 is a block diagram of the software in another modification of the fourth embodiment.

FIG. 31 illustrates an exemplary structure of the software running on the main processor 2 when the process of the non-secure OS causing the occurrence of the abort exception is stopped. The structure illustrated in FIG. 31 differs from that illustrated in FIG. 24 in that a secure OS module 200j includes a process identification module 216 instead of the log generator 215 and the non-secure OS module 300f further includes a process stop module 314.

The process identification module 216 is a processing module that identifies the process causing the occurrence of the abort exception out of the processes having been executed by the non-secure OS module 300f from the instruction, which causes the occurrence of the abort exception, and the address of the instruction that are collected by the abort cause investigation module 214. The process stop module 314 is a processing module that stops the process identified by the process identification module 216.

Figure 32:
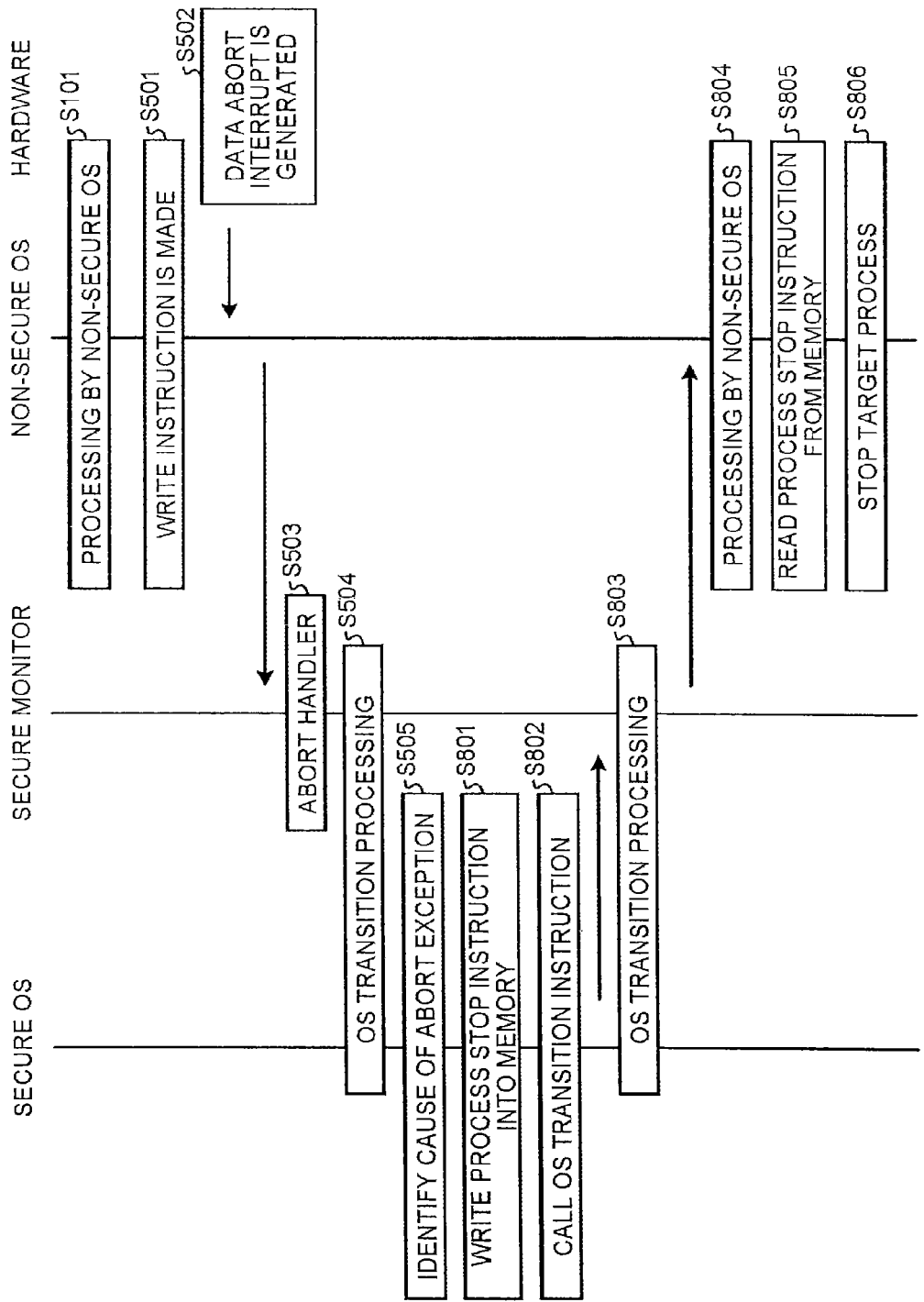
FIG. 32 is a flowchart illustrating processing when the interrupt is generated in the other modification of the fourth embodiment.

FIG. 32 is an exemplary flowchart of a processing operation by the main processor 2 when an instruction is made in the non-secure mode to write data into the area designated as the area in which write operation in the non-secure mode is prohibited. The processing from step S101 to step S505 at which the abort cause investigation module 214 collects the investigation result is the same as that illustrated in FIG. 25.

Thereafter, the process identification module 216 investigates which process of the non-secure OS module 300f causes the occurrence of the abort exception from the main memory 5 besides the information collected by the abort cause investigation module 214, and writes process information such as a process ID into the main memory 5 (step S801). Then, the secure OS transition instruction caller 203 is called (step S802) and the OS transition processing is performed (step S803). After the transition to the non-secure OS (step S804), the process step module 314 of the non-secure OS module 300f reads the process information about the process to be stopped from the main memory 5 (step S805), and then stops the process (step S806).

Figure 33:
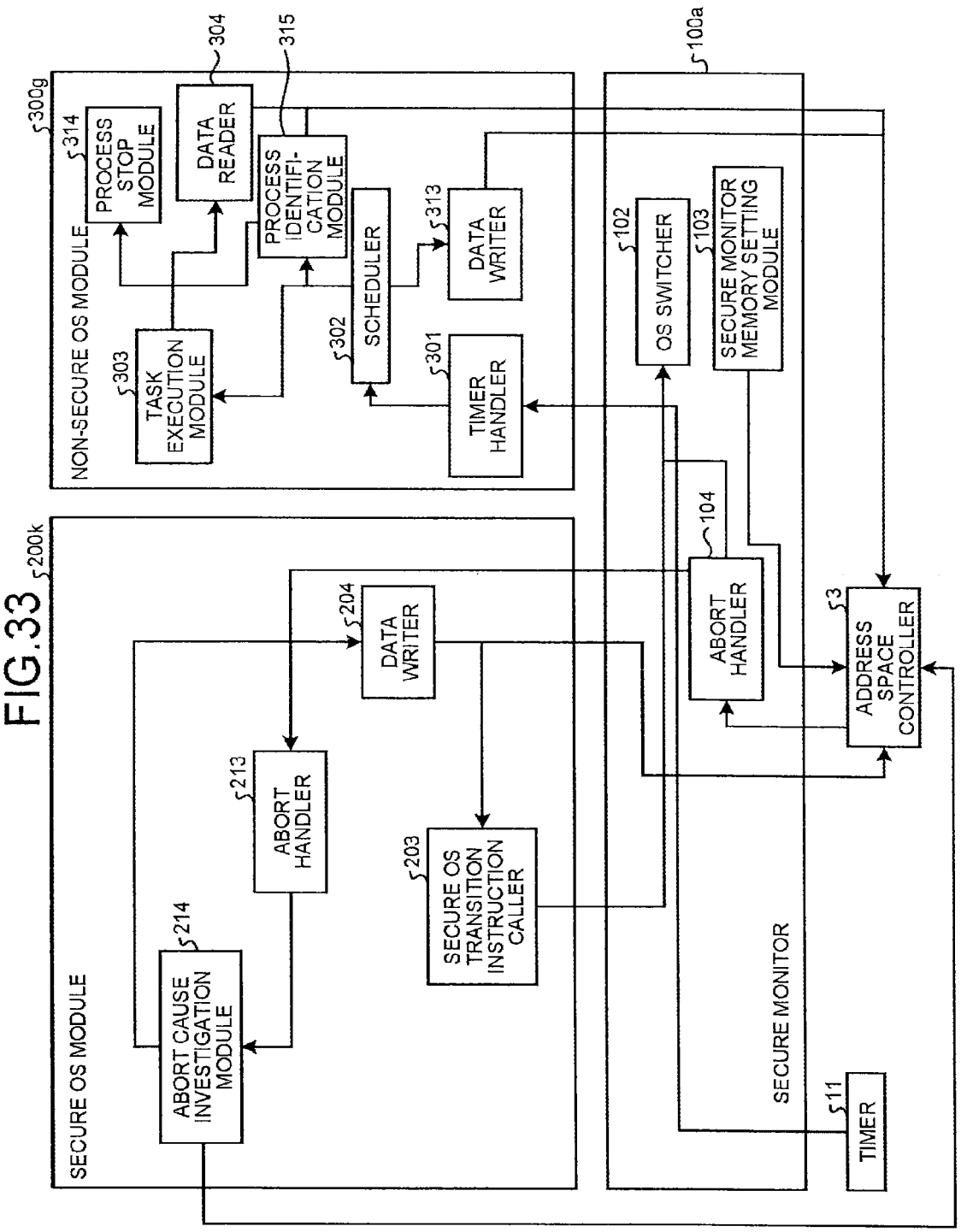
FIG. 33 is a block diagram of the software in another modification of the fourth embodiment.

In the flowchart of FIG. 32, the process identification module 216 running on the secure OS module 200j identifies the process, which causes the occurrence of the abort exception, of the non-secure OS module 300f. This identification may be performed by the non-secure OS module 300f. FIG. 33 illustrates the structure in this case.

The structure illustrated in FIG. 33 differs from that illustrated in FIG. 31 in that a process identification module 315 is included in a non-secure OS module 300g, not in a secure OS module 200k. In the structure, the secure OS module 200k does not identify the process but notifies the non-secure OS module 300g of the address of the instruction causing the occurrence of the abort exception. On the basis of the address, the process identification module 315 of the non-secure OS module 300g identifies the process using the address. The process stop module 314 then stops the process.

Figure 34:
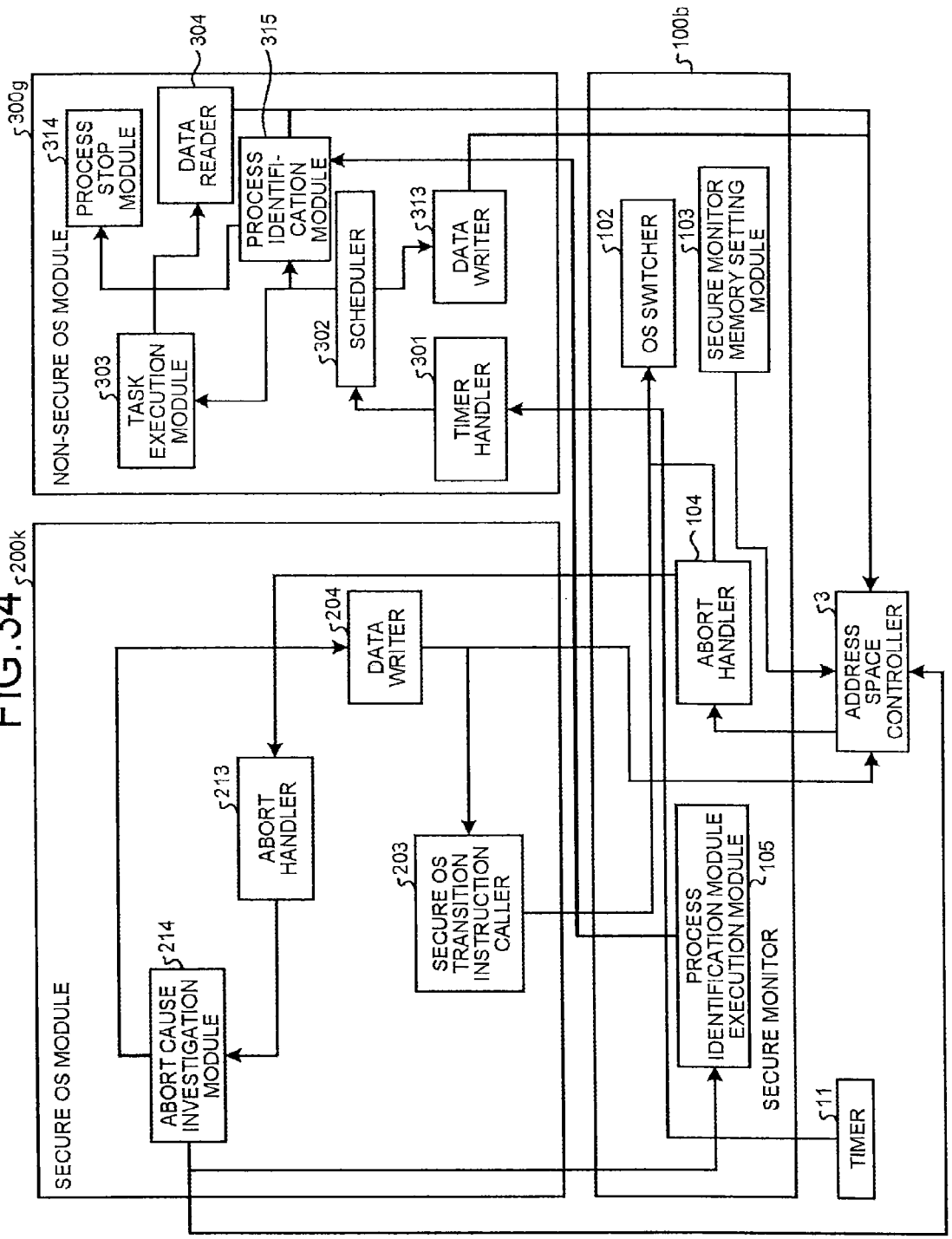
FIG. 34 is a block diagram of the software in another modification of the fourth embodiment.

For another example, the process of the non-secure OS module 300g is stopped without performing the OS transition from the secure OS module 200k to the non-secure OS module 300g. FIG. 34 illustrates the structure in this case. The structure illustrated in FIG. 34 differs from that illustrated in FIG. 33 in that the secure monitor 100b further includes a process identification module execution module 105.

In the structure illustrated in FIG. 33, the process stop module 314 is executed as an application process. In the structure illustrated in FIG. 34, the process stop module 314 and the process identification module 315 are executed in a kernel of the non-secure OS module 300g. The process identification module execution module 105 is a processing module that causes the process identification module 315 of the non-secure OS module 300g to operate. The OS transition processing from the secure OS module 200k to non-secure OS module 300g is not performed. The process identification module 315 and the process stop module 314 of the non-secure OS module 300g are executed, but the context of the non-secure OS is not restored since the non-secure OS is not executed.

Figure 35:
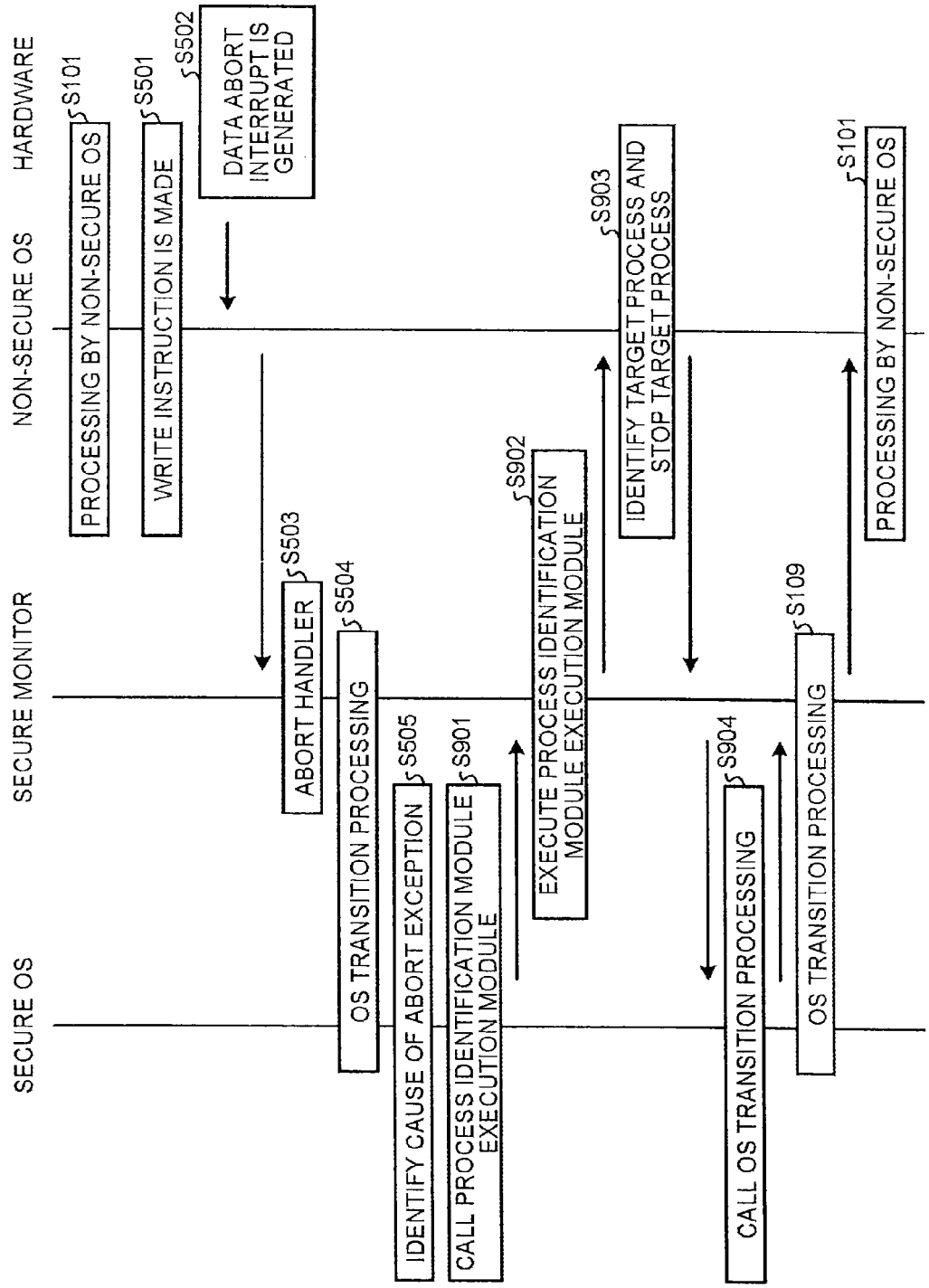
FIG. 35 is a flowchart illustrating processing when the interrupt is generated in the other modification of the fourth embodiment.

FIG. 35 illustrates an exemplary flowchart of the processing operation of the main processor 2 in this structure. The processing from step S101 to step S505 at which the abort cause investigation module 214 collects the investigation result is the same as that illustrated in FIG. 25. Thereafter, the abort cause investigation module 214 of the secure OS module 200k calls the process identification module execution module 105 of the secure monitor 100b (step S901).

The process identification module execution module 105 is executed without performing the OS transition processing (step S902). The process identification module execution module 105 calls the process identification module 315 and the process stop module 314 of the non-secure OS module 300g, and the target process is identified and stopped (step S903). The non-secure OS is not executed. After the identification of the target process to be stopped of the non-secure OS and the stop processing are completed, the processing is returned to the process identification module execution module 105 of the secure monitor 100b while the non-secure OS is not executed. The process identification module execution module 105 returns the processing to the abort cause investigation module 214. The abort cause investigation module 214 then causes the secure OS transition instruction caller 203 to operate (step S904). The processing after step S904 is the same as that in FIG. 25.

Figure 38:
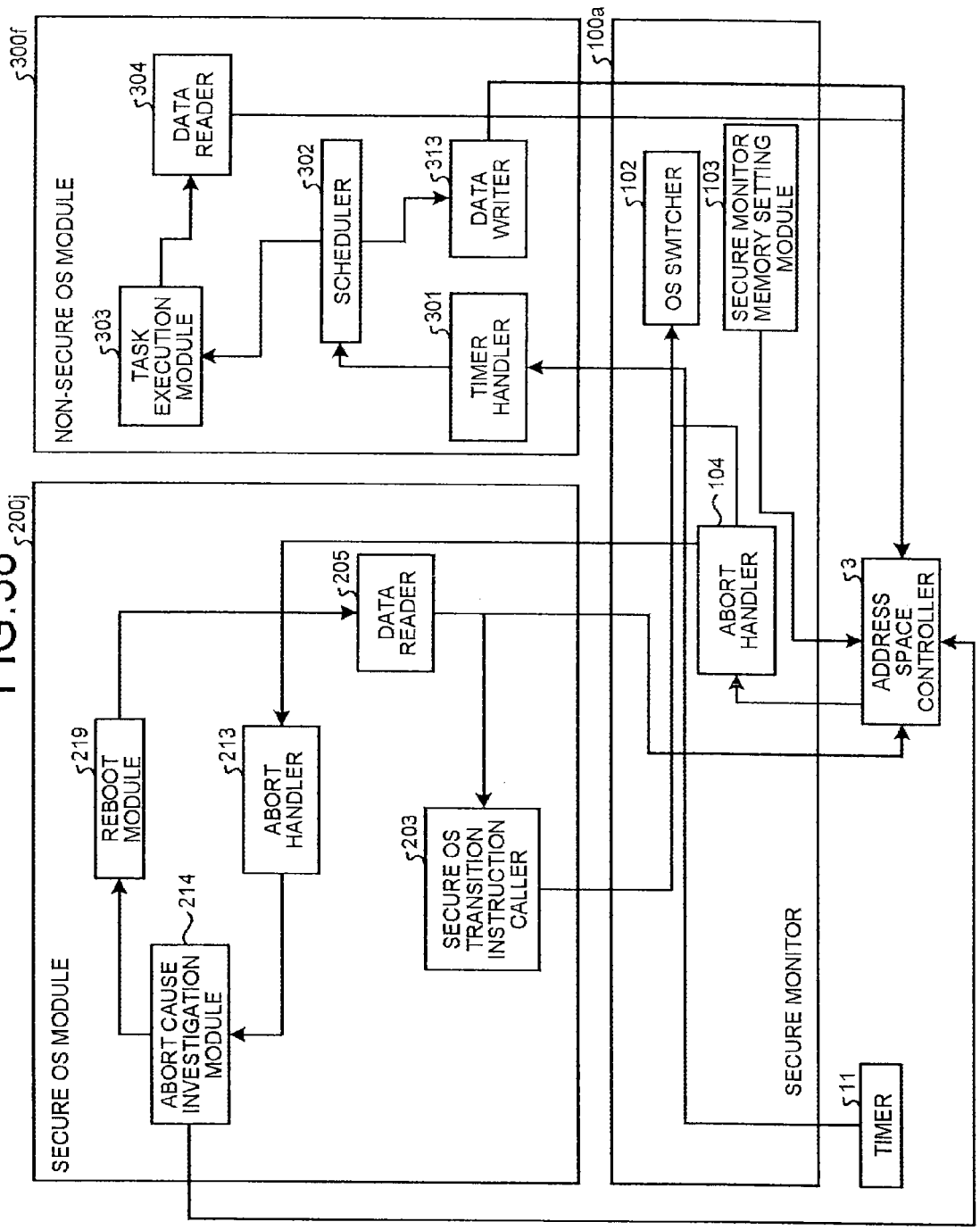
FIG. 38 is a block diagram of the software in another example of the fourth embodiment.

With reference to the structure illustrated in FIG. 24, the way is described in which the log generator 215 records the investigation result collected by the abort cause investigation module 214. On the basis of the investigation result, the information processing apparatus 10 may be stopped or rebooted instead of recording the cause as a log. FIG. 38 illustrates the structure in this case. The structure illustrated in FIG. 38 differs from that illustrated in FIG. 24 in that a reboot module 219 is included instead of the log generator 215. The reboot module 219 is a processing module that executes an instruction to reboot the information processing apparatus 10. The abort cause investigation module 214 is a processing module that identifies the cause of a data abort exception when the data abort exception is generated and instructs the reboot module 219 to reboot the information processing apparatus 10. The reboot module 219 may stop the system instead of rebooting.

Figure 36:
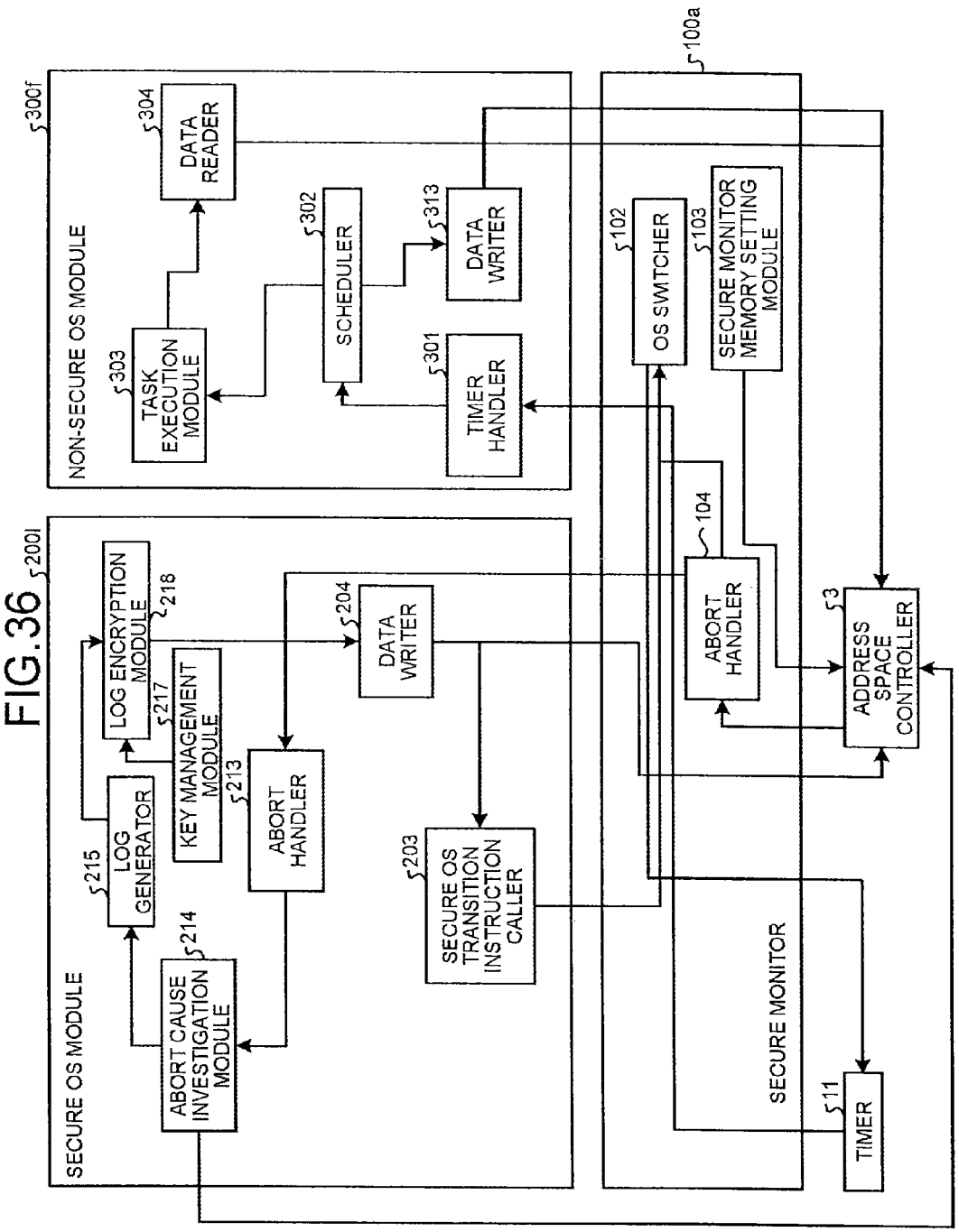
FIG. 36 is a block diagram of the software in another modification of the fourth embodiment.

In the structure illustrated in FIG. 24, the log information is output to the main memory 5 in a plain text form. The log information may be encrypted and thereafter be output. FIG. 36 illustrates the structure in this case. The structure illustrated in FIG. 36 differs from that illustrated in FIG. 24 in that a secure OS module 200l further includes a key management module 217 and a log encryption module 218. The key management module 217 is a processing module that keeps a key used by the log encryption module 218 for encrypting the exception occurrence cause. The log encryption module 218 is a processing module that encrypts the exception occurrence cause investigated by the abort cause investigation module 214 in accordance with an encryption algorithm using the key kept by the key management module 217.

In the fourth embodiment, the operation of the secure OS module 200 is described when the access is made in the non-secure mode to the memory area designated as the area in which the access in the non-secure mode is prohibited. The feature of the embodiment is that when the abort exception is generated, the processing of the non-secure OS module 300 is stopped and the processing is executed by the secure OS module 200.

Fifth Embodiment

In the third embodiment, the way is described in which the area designation module 312 of the non-secure OS module 300 specifies the area and the access right to the address space controller 3 and the area setting module 212 of the secure OS module 200 sets the area and the access right to the address space controller 3. In the third embodiment, the example is described in which the counter value managed by the data updating module 202 of the secure OS module 200 is updated in accordance with the timer interrupt generated by the timer 11. In the fourth embodiment, the operation of the secure OS module 200 is described when the access is made to the memory area designated as the area in which the access in the non-secure mode is prohibited.

Figure 37:
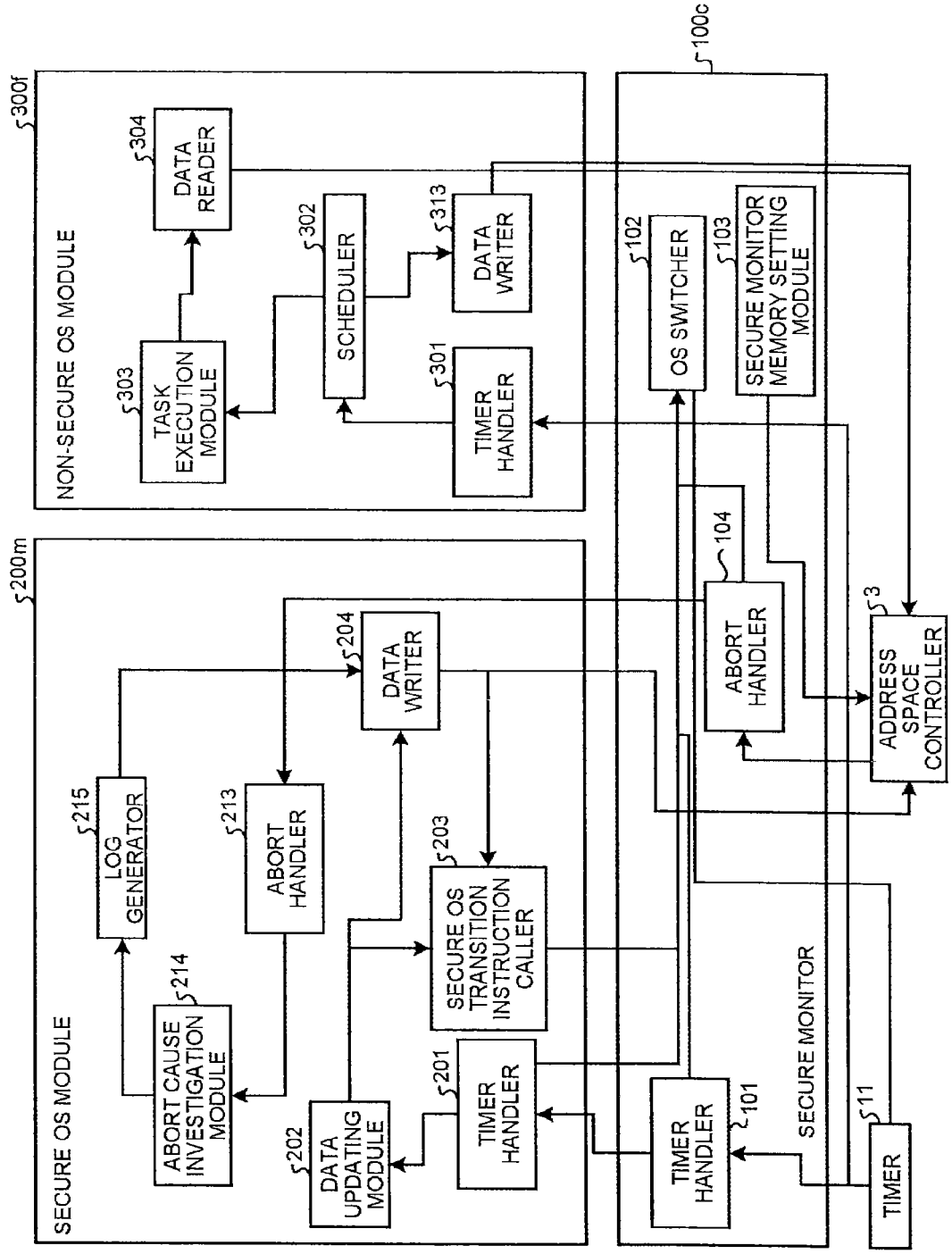
FIG. 37 is a block diagram of software in a fifth embodiment.

In a fifth embodiment, the structure is described that combines the components of the third and the fourth embodiments. FIG. 37 illustrates an exemplary structure of the software running on the main processor 2 of the information processing apparatus 10 in the fifth embodiment. The hardware has the same structure as that of the first embodiment. The structure illustrated in FIG. 37 differs from that illustrated in FIG. 24 in that a secure OS module 200m further includes the data updating module 202 and the timer handler 201 and a secure monitor 100c further includes the timer handler 101.

Sixth Embodiment

In the first embodiment, the way is described in which it is achieved that the secure OS module periodically performs processing independent of the non-secure OS module. In a sixth embodiment, the secure OS module periodically checks whether the non-secure OS module is not stopped, thereby reducing a time period in which the information processing apparatus 10 is stopped. The non-secure OS module is a general-purpose operating system such as a Linux (registered trademark) OS, for example. Thus, there is a risk that a program running in the non-secure mode is stopped due to bugs included in the operating system running in the non-secure mode, a driver, or an application and a mistake in a setting, or other processing cannot be performed due to a program being trapped in an endless loop. The secure OS module therefore periodically checks the state of the non-secure OS module.

Figure 39:
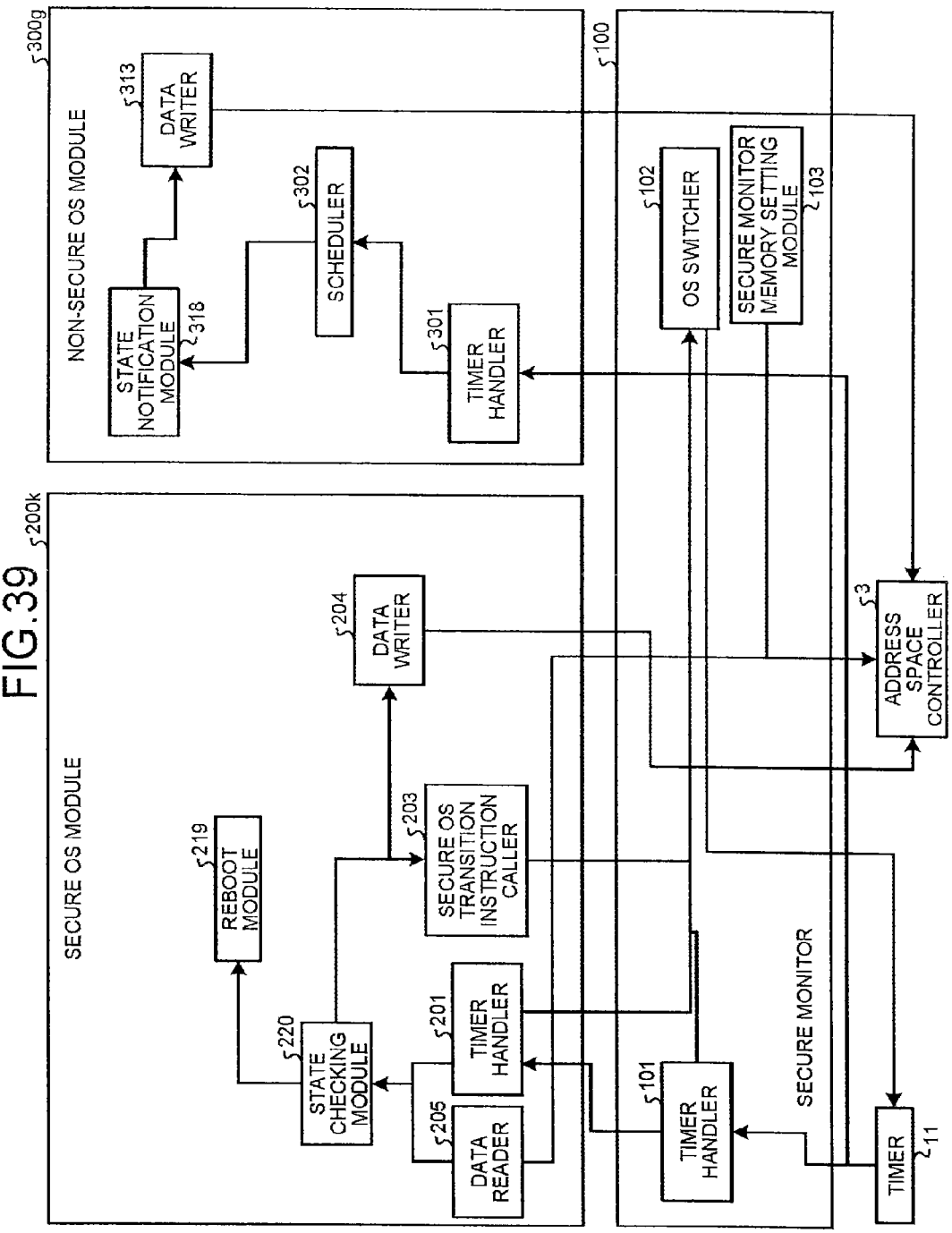
FIG. 39 is a block diagram of software in a sixth embodiment.

FIG. 39 illustrates an exemplary structure of the software running on the main processor 2 of the information processing apparatus 10 in the sixth embodiment. The hardware has the same structure as that of the first embodiment. The structure illustrated in FIG. 39 differs from that illustrated in FIG. 6 in that the non-secure OS module 300g includes a state notification module 318 instead of the task execution module 303 and a data writer 313 instead of the data reader 304, and the secure OS module 200k includes a state checking module 220 instead of the data updating module 202, and the reboot module 219.

In the non-secure OS module 300g, the scheduler 302 causes the state notification module 318 to operate at a constant period. Using the data writer 313, the state notification module 318 writes information indicating that the state notification module 318 is executed into the non-secure area of the main memory 5. The information may be the counter value or a random number.

The reboot module 219 is a processing module that executes an instruction to reboot the information processing apparatus 10. The timer handler 101 of the secure monitor 100 is periodically executed by the timer interrupt of the timer 11. As a result, the state checking module 220 is periodically executed through the timer handler 101 of the secure monitor 100 and the timer handler 201 of the secure OS module 200k. This means that the state checking module 220 is forcibly and periodically executed even though the non-secure OS performs processing, in a similar manner as the first embodiment. When receiving the notification of the timer interrupt from the timer handler 201, the state checking module 220 reads, from the main memory 5, the information written by the state notification module 318 using the data reader 205 and checks whether the information is updated. This checking may be made whether the counter value is updated when the information is the counter value or whether the read value differs from that read previously when the information is a random number. When determining that the information is updated, the state checking module 220 executes the secure OS transition instruction caller 203 to perform the transition of the processing to the non-secure OS module 300g. When determining that the information is not updated, the state checking module 220 determines that the non-secure OS module 300g is in some abnormal state, and calls and causes the reboot module 219 to reboot the information processing apparatus 10. As the way to reboot the information processing apparatus 10, there are two ways. One is to reboot the information processing apparatus 10 and the other is to reboot only the non-secure OS module 300g. When the information processing apparatus 10 is rebooted, the main processor 2 executes a reset instruction. When only the non-secure OS module 300g is rebooted, the context of the non-secure OS module 300g managed by the secure monitor 100 and the context managed by the non-secure OS module 300g are cleared and the booting of the non-secure OS module 300g is executed.

In order to prevent that the state checking module 220 checks whether the information is updated before the state notification module 318 updates the information of the main memory 5, it is preferable that a time interval of checking performed by the state checking module 220 whether the information is updated is longer than that of updating the information in the main memory 5, which is performed by the state notification module 318.

If the non-secure OS module 300g is stopped or trapped in an endless loop due to bugs included in the non-secure OS module 300g, the driver being installed in the non-secure OS module 300g, or applications running on the non-secure OS module 300g, or due to a mistake in a setting, then the scheduler 302 is not called and thus the state notification module 318 is not executed. Hence, when the non-secure OS module 300g is in a normal state, the scheduler 302 will be periodically executed and the state notification module 318 will update the information. In the sixth embodiment, the secure OS module 200k is periodically executed even if the non-secure OS module 300g is stopped. Thus, it can be determined whether the non-secure OS module 300g is in a normal state or in a stop state on the basis of the information updated by the state notification module 318, and the information processing apparatus 10 can be rebooted when the non-secure OS module 300g is stopped, thereby making it possible to reduce the downtime of the non-secure OS module 300g.

Seventh Embodiment

In the first embodiment, the way is described in which it is achieved that the secure OS module periodically performs processing independent of the non-secure OS module. In a seventh embodiment, the secure OS module periodically checks whether the non-secure OS module is tampered with, thereby preventing the non-secure OS module from attacks by an illegitimate program.

Figure 40:
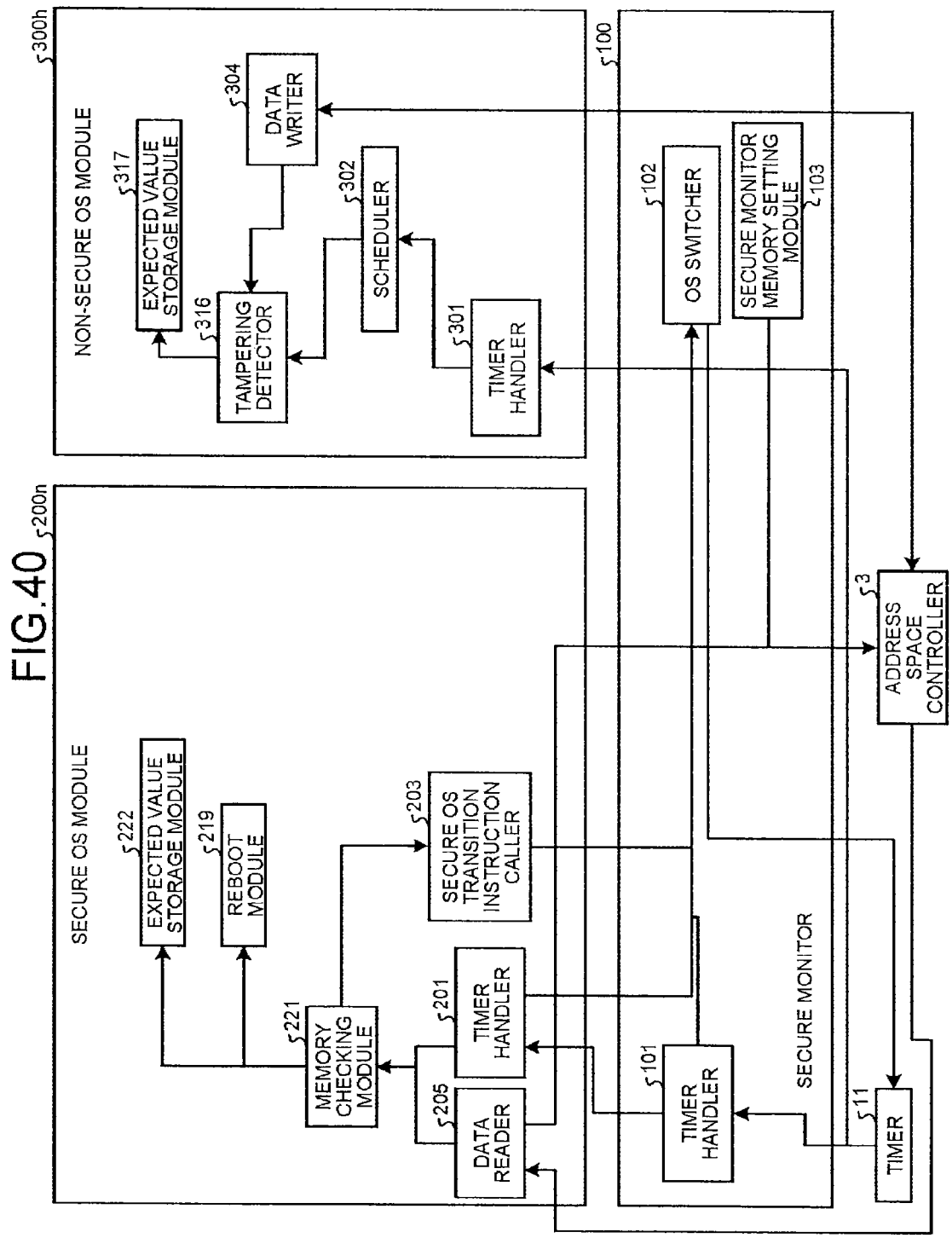
FIG. 40 is a block diagram of software in a seventh embodiment.

FIG. 40 illustrates an exemplary structure of the software running on the main processor 2 of the information processing apparatus 10 in the seventh embodiment. The hardware has the same structure as that of the first embodiment. The structure illustrated in FIG. 40 differs from that illustrated in FIG. 6 in that a non-secure OS module 300h includes a tampering detector 316 instead of the task execution module 303 and an expected value storage module 317 and a secure OS module 200n includes a memory checking module 221 instead of the data updating module 202, the reboot module 219, and an expected value storage module 222, but does not include the data writer 204.

The expected value storage module 317 of the non-secure OS module 300h is a processing module that stores a hash value of the non-secure OS in a normal state (state not being tampered with). The hash value is calculated in advance of the booting of the information processing apparatus 10 and stored. In the non-secure OS module 300h, the scheduler 302 causes the tampering detector 316 to operate at a constant period. The tampering detector 316 periodically checks whether the area in which the non-secure OS module 300h is allocated, i.e., the non-secure OS area, of the main memory 5 is tampered with. This checking is the processing that reads the data of the non-secure OS area and checks whether the data is coincident with the value stored in the expected value storage module 317. It is naturally unnecessary to read all of the data of the non-secure OS area at one time to calculate the hash value. The hash value may be calculated using data read until the time of calculation (intermediate data) and written into the main memory 5 and the calculation may start again by reading the intermediate data from the main memory 5 after the processing determined by the scheduler 302 is completed. In this case, the intermediate data is allocated in the secure area to prevent the data from being tampered with by the non-secure OS module 300*h*.

The expected value storage module 222 of the secure OS module 200*n* is a processing module that stores a hash value of the tampering detector 316 in a normal state (state not being tampered with) of the non-secure OS module 300*h*. The hash value is calculated in advance of the booting of the information processing apparatus 10 and stored.

The reboot module 219 is a processing module that executes the instruction to reboot the information processing apparatus 10. The reboot module 219 is dispensable. The timer handler 101 of the secure monitor 100 is periodically executed by the timer interrupt of the timer 11. As a result, the memory checking module 221 is periodically executed through the timer handler 101 of the secure monitor 100 and the timer handler 201 of the secure OS module 200*n*. This means that the memory checking module 221 is forcibly and periodically executed even though the non-secure OS performs processing, in a similar manner as the first embodiment. When receiving the notification of the timer interrupt from the timer handler 201, the memory checking module 221 reads the area in which the tampering detector 316 is allocated using the data reader 205 and checks whether the read value is coincident with the value stored in the expected value storage module 222 of the secure OS module 200*n*.

When both are coincident with each other, the memory checking module 221 determines that the tampering detector 316 is not tampered with and the secure OS transition instruction caller 203 is called, and thereafter the processing of the non-secure OS module 300*h* is restarted. When both are not coincident with each other, the memory checking module 221 determines that the tampering detector 316 is tampered with and calls the reboot module 219 to reboot the information processing apparatus 10. Besides the rebooting, processing may be performed that transmits a warning message to the non-secure OS module 300*h*. An attacker may tamper with the processing such that the tampering detector 316 does not perform the detection processing of the tampering of the non-secure OS or rewrite the result of the tampering detection processing such that no tampering is consistently reported. In the seventh embodiment, it can be verified that the non-secure OS module 300*h* is not tampered with as follows: the tampering detector 316 of the non-secure OS module 300*h* checks that the non-secure OS module 300*h* is not tampered with and the memory checking module 221 of the secure OS module 200*n* checks that the tampering detector 316 is not tampered with. When the non-secure OS is tampered with by an attacker, the tampering detector 316 can detect the tampering. Furthermore, when the tampering detector 316 is tampered with, the memory checking module 221 can detect the tampering.

Although the secure OS module 200*n* can perform all of the tampering detection processing, it is efficient that the detection is performed in the non-secure OS module 300*h*, for detecting whether the data inherent to the non-secure OS module 300*h* is tampered with, such as the data structure of the non-secure OS module 300*h*. In the embodiment, thus, the detection of the tampering of the non-secure OS module 300*h* is performed by the program running on the non-secure OS, i.e., the driver of the non-secure OS module 300*h* or the application running on the non-secure OS module 300*h*.

The program including the secure OS module and the non-secure module may be provided as a computer program product such as a computer readable medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a main memory;
   a main processor configured to selectively switch between a secure mode and a non-secure mode, and perform certain data processing in the selected mode;
   an address space controller configured to set access rights to the main memory independently for each mode of the main processor, the access rights including read permission and write permission; and
   the main memory stores instructions that, when executed by the main processor, cause the main processor to function as one or more modules comprising:
   a secure monitor module configured to set, to the address space controller, a first memory area from which data is readable in both modes and into which data is writable only in the secure mode, a second memory area from which data is readable and into which data is writable in both modes, and a third memory area from which data is readable and into which data is writable only in the secure mode;
   a non-secure operating system (OS) module configured to run in the non-secure mode, the non-secure OS module being allocated in the second memory area;
   a secure OS module configured to run in the secure mode, the secure OS module being allocated in the third memory area; and
   a timer configured to notify the secure monitor module of an interrupt, wherein
   the secure monitor module is configured to, when switching the mode of the main processor from the non-secure mode to the secure mode, and simultaneously switching from the non-secure OS module to the Secure OS module, instruct the secure OS module to execute the certain data processing when receiving a notification of the interrupt from the timer,
   the secure OS module is configured to perform the certain data processing instructed by the secure monitor module and store data of a result of the processing in the first memory area, and
   when switching from the non-secure OS module to the secure OS module, the secure monitor module is configured to store, in the third memory area, a context of the non-secure OS module before switching from the non-secure OS module to the secure OS module so that the context of the non-secure OS module is restored from the third memory area after switching from the secure OS module to the non-secure OS module.

2. The apparatus according to claim 1, wherein
   the instructions, when executed by the main processor, further cause the main processor to further function as a second timer configured to notify the non-secure OS module of a second interrupt, and the non-secure OS module is configured to execute switching processing of a task running on the non-secure OS module when receiving a notification of the second interrupt from the second timer.

3. The apparatus according to claim 1, wherein the secure OS module executes a data updating module configured to update certain data every time the secure OS module receives an instruction to execute the certain data processing from the secure monitor module having been received the notification of the interruption from the timer.

4. The apparatus according to claim 3, wherein
the secure OS module further executes:
an encryption module configured to encrypt a value of the data updated by the data updating module using a certain key,
a key management module configured to keep the key used by the encryption module, and
a data writing module configured to write, into the first memory area, both of the data updated by the data updating module but not encrypted and the encrypted data.

5. The apparatus according to claim 3, wherein
the non-secure OS module executes a mode setting module configured to set whether a value of the data updated by the data updating module is encrypted and output or the value of the data updated by the data updating module is output without being encrypted, and
the secure OS module further executes an output mode setting module configured to instruct, to the data updating module, whether the data is encrypted on the basis of the setting of the mode setting module.

6. The apparatus according to claim 1, wherein the non-secure OS module executes an area setting module configured to set the address space controller such that data is writable, only in the secure mode, into the area in which the non-secure OS module is allocated after the information processing apparatus is booted.

7. The apparatus according to claim 1, wherein
the non-secure OS module executes an area designation module configured to cause the secure OS module to set the address space controller such that data is writable, only in the secure mode, into the area in which the non-secure OS module is allocated after the information processing apparatus is booted, and
the secure OS module executes a second area setting module configured to set the address space controller such that data is writable, only in the secure mode, into the area in which the non-secure OS module is allocated, on the basis of an instruction from the area designation module.

8. An information processing system comprising:
an information processing apparatus; and
a verification server coupled to the information processing apparatus through a network, wherein
the information processing apparatus includes
a main memory;
a main processor configured to selectively switch between a secure mode and a non-secure mode, and perform certain data processing in the selected mode;
an address space controller configured to set access rights to the main memory independently for each mode of the main processor, the access rights including read permission and write permission; and
the main memory stores instructions that, when executed by the main processor, cause the main processor to function as one or more modules comprising:
a secure monitor module configured to set, to the address space controller, a first memory area from which data is readable in both modes and into which data is writable only in the secure mode, a second memory area from which data is readable and into which data is writable in both modes, and a third memory area from which data is readable and into which data is writable only in the secure mode;
a non-secure operating system (OS) module configured to run in the non-secure mode, the non-secure OS module being allocated in the second memory area;
a secure OS module configured to run in the secure mode, the secure OS module being allocated in the third memory area; and
a timer configured to generate an interrupt to the main processor at a certain period and notify the secure monitor of the interrupt, wherein
the secure monitor module is configured to, when switching the mode of the main processor from the non-secure mode to the secure mode, and simultaneously switching from the non-secure OS module to the Secure OS module, instruct the secure OS module to execute the certain data processing when receiving a notification of the interrupt from the timer,
the secure OS module is configured to perform the certain data processing instructed by the secure monitor module and store data of a result of the processing in the first memory area,
the secure OS module executes a data updating module configured to update certain data every time the secure OS module receives an instruction to execute the certain data processing from the secure monitor module having been received the notification of the interruption from the timer,
the non-secure OS module includes an encrypted data reader configured to read the encrypted data from the first memory area and transmit the read data to the verification server,
the verification server configured to decrypt the data received from the encrypted data reader using a certain key corresponding to a key used for the encryption, and transmit the decrypted data to the encrypted data reader, and
when switching from the non-secure OS module to the secure OS module, the secure monitor module is configured to store, in the third memory area, a context of the non-secure OS module before switching from the non-secure OS module to the secure OS module so that the context of the non-secure OS module is restored from the third memory area after switching from the secure OS module to the non-secure OS module.

9. An information processing apparatus comprising:
a main memory;
a main processor configured to selectively switch between a secure mode and a non-secure mode, and perform certain data processing in the selected mode;
an address space controller configured to set access rights to the main memory independently for each mode of the main processor, the access rights including read permission and write permission; and
the main memory stores instructions that, when executed by the main processor, cause the main processor to function as one or more modules comprising:

a secure monitor module configured to set, to the address space controller, a fourth memory area in which reading and writing of data in the non-secure mode is prohibited and reading and writing of data only in the secure mode is permitted, a fifth memory area from which data is readable and into which data is writable in both modes, and a sixth memory area into which data is writable only in the secure mode, and further perform setting such that a transition of processing to the secure mode is performed when an access in the non-secure mode is made to the sixth memory area;

a non-secure operating system (OS) module configured to run in the non-secure mode, the non-secure OS module being allocated in the sixth memory area; and a secure OS module configured to run in the secure mode, the secure OS module being allocated in the fourth memory area, wherein the secure OS module is configured to investigate an address to which an access is made in the sixth memory area when the access in the non-secure mode is made to the sixth memory area, and the secure OS module is configured to perform processing to stop a system when an access in the non-secure mode has been made to the sixth memory area and the access is determined to have been made to a certain address.

10. A computer program product comprising a non-transitory computer-readable medium containing a program executed by a computer that includes a main memory; a main processor configured to selectively switch between a secure mode and a non-secure mode, and perform certain data processing in the selected mode; and an address space controller configured to set access rights to the main memory independently for each mode of the main processor, the access rights including read permission and write permission, the program causing the main processor to function as one or more modules including:

a secure monitor module configured to set, to the address space controller, a first memory area from which data is readable in both modes and into which data is writable only in the secure mode, a second memory area from which data is readable and into which data is writable in both modes, and a third memory area from which data is readable and into which data is writable only in the secure mode;

a non-secure operating system (OS) module configured to run in the non-secure mode, the non-secure OS module being allocated in the second memory area;

a secure OS module configured to run in the secure mode, the secure OS module being allocated in the third memory area; and a timer configured to generate an interrupt of the non-secure OS module at a certain period and notify the secure monitor module of the interrupt, wherein the secure monitor is configured to, when switching the mode of the main processor from the non-secure mode to the secure mode, and simultaneously switching from the non-secure OS module to the Secure OS module, instruct the secure OS module to execute the certain data processing when receiving a notification of the interrupt from the timer, the secure OS module is configured to perform the certain data processing instructed by the secure monitor module and store data of a result of the processing in the first memory area, and when switching from the non-secure OS module to the secure OS module, the secure monitor module is configured to store, in the third memory area, a context of the non-secure OS module before switching from the non-secure OS module to the secure OS module so that the context of the non-secure OS module is restored from the third memory area after switching from the secure OS module to the non-secure OS module.

* * * * *